(12) United States Patent
Kawamura et al.

(10) Patent No.: US 12,010,045 B2
(45) Date of Patent: Jun. 11, 2024

(54) PACKET PROCESSING DEVICE AND PACKET PROCESSING METHOD

(71) Applicant: Nippon Telegraph and Telephone Corporation, Tokyo (JP)

(72) Inventors: Tomoaki Kawamura, Tokyo (JP); Shoko Oteru, Tokyo (JP); Yuta Ukon, Tokyo (JP); Shuhei Yoshida, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 287 days.

(21) Appl. No.: 17/440,241

(22) PCT Filed: Apr. 8, 2020

(86) PCT No.: PCT/JP2020/015808
§ 371 (c)(1),
(2) Date: Sep. 17, 2021

(87) PCT Pub. No.: WO2020/217990
PCT Pub. Date: Oct. 29, 2020

(65) Prior Publication Data
US 2022/0182340 A1 Jun. 9, 2022

(30) Foreign Application Priority Data
Apr. 23, 2019 (JP) ................. 2019-082030

(51) Int. Cl.
*H04L 49/9057* (2022.01)
*H04L 49/9047* (2022.01)

(52) U.S. Cl.
CPC ...... *H04L 49/9057* (2013.01); *H04L 49/9047* (2013.01)

(58) Field of Classification Search
None
See application file for complete search history.

(56) References Cited

U.S. PATENT DOCUMENTS

| | | | |
|---|---|---|---|
| 6,907,042 B1 * | 6/2005 | Oguchi | H04L 49/9094 709/236 |
| 2006/0104303 A1 * | 5/2006 | Makineni | H04L 45/74 370/463 |

FOREIGN PATENT DOCUMENTS

JP 4468332 B2 5/2010

* cited by examiner

*Primary Examiner* — Farley Abad
*Assistant Examiner* — Dayton Lewis-Taylor
(74) *Attorney, Agent, or Firm* — Slater Matsil, LLP

(57) ABSTRACT

The packet processing apparatus includes a packet memory, a transmission processing unit that writes a plurality of packets to be transmitted to the packet memory to generate a combination packet into which the plurality of packets have been concatenated, a line handling unit that sends packets to a communication line, and a combination packet transfer unit that DMA-transfers the combination packet from the packet memory to the line handling unit. The transmission processing unit writes information on an address in the packet memory of beginning data of an individual packet in the combination packet to a descriptor. The line handling unit separates the DMA-transferred combination packet into a plurality of packets and sends the plurality of packets to the communication line.

14 Claims, 34 Drawing Sheets

PACKET PROCESSING DEVICE AND PACKET PROCESSING METHOD

CROSS-REFERENCE TO RELATED APPLICATIONS

This application is a national phase entry of PCT Application No. PCT/JP2020/015808, filed on Apr. 8, 2020, which claims priority to Japanese Application No. 2019-082030, filed on Apr. 23, 2019, which applications are hereby incorporated herein by reference.

TECHNICAL FIELD

The present invention relates to a packet processing apparatus and a packet processing method, and more particularly to a packet processing apparatus and a packet processing method for performing packet data transfer processing in a communication system.

BACKGROUND

FIG. 27 is a block diagram illustrating a configuration of a packet processing apparatus in a related art. The packet processing apparatus includes a line handling unit 100 that receives packets from a communication line, a packet memory 101 that stores packets received from the communication line, a packet transfer unit 102 that transfers packets received from the communication line to the packet memory 101, a reception processing unit 103 that reads packets from the packet memory 101, and a protocol processing unit 104 that performs protocol processing on packets.

In this packet processing apparatus, the packet transfer unit 102 performs data transfer using direct memory access (DMA) to store a packet in the packet memory 101 when triggered by arrival of the packet at the line handling unit 100 connected to the communication line (not illustrated). At the same time, the packet transfer unit 102 generates a hardware interrupt to notify a processor (not illustrated) of the packet processing apparatus that the packet has been received and issues a request to activate the reception processing unit 103.

The packet transfer unit 102 includes a descriptor 1020 which is a data structure constructed by software executed by the processor of the packet processing apparatus and a DMA controller 1021 which is hardware. FIG. 28 is a diagram illustrating an overview of the descriptor 1020.

The example of FIG. 28 illustrates the case when N packets are stored in the packet memory 101. In this case, the processor of the packet processing apparatus sets addresses and flags corresponding to the N packets in the descriptor 1020. The processor presets in the descriptor 1020 start addresses A #1 to A #N at which to write received packets to the packet memory 101. Usually, the number of addresses that can be set at the same time is predetermined and the order in which the addresses are used is also predetermined.

The processor sets/resets flags AF #1 to AF #N, which indicate whether or not the set addresses A #1 to A #N are valid, in the descriptor 1020. When the processor has set the flags AF #1 to AF #N to valid after setting the addresses A #1 to A #N, packets are allowed to be written to the packet memory 101.

Reception completion flags WF #1 to WF #N indicating whether or not writing of packets to the set addresses A #1 to A #N has been completed and received data sizes L #1 to L #N indicating the packet lengths of packets written to the set addresses A #1 to A #N are also set in the descriptor 1020.

FIG. 29 is a flowchart illustrating operations of the DMA controller 1021. First, the DMA controller 1021 initializes a variable n indicating the order of reading and writing from and to the descriptor 1020 to 1 (step S100 in FIG. 29) and reads an nth (=1st) flag AF #1 from the descriptor 1020 (step S101 in FIG. 29).

When the flag AF #1 indicates that the start address is valid (yes in step S102 in FIG. 29), the DMA controller 1021 reads an nth (=1st) start address A #1 from the descriptor 1020 (step S103 in FIG. 29) and writes a corresponding nth (=1st) packet to an area starting from the start address A #1 in the packet memory 101 (step S104 in FIG. 29).

After completing writing of the packet, the DMA controller 1021 writes a received data size L #1 indicating the packet length of the nth (=1st) packet and the reception completion flag WF #1 indicating that writing of the packet has been completed to the descriptor 1020 (step S105 in FIG. 29).

Further, the DMA controller 1021 generates a hardware interrupt to notify the processor (not illustrated) of the packet processing apparatus that writing of the packet has been completed and issues a request to activate the reception processing unit 103.

Then, the DMA controller 1021 determines whether or not the variable n is equal to N (step S106 in FIG. 29). When the variable n has not reached N (no in step S106), the DMA controller 1021 increments the variable n by 1 (step S107 in FIG. 29) and returns to step S101. When the variable n has reached N (yes in step S106), the DMA controller 1021 returns to step S100. In this way, N packets are sequentially transferred to the packet memory 101.

Next, the activated reception processing unit 103 passes the received packet transferred to the packet memory 101 to the protocol processing unit 104. At the same time, the reception processing unit 103 secures a new area for the packet memory 101 in the memory of the packet processing apparatus in order to replenish the portion of the packet memory passed to the protocol processing unit 104.

The protocol processing unit 104 to which the received packet has been passed releases the area of the packet memory 101 when necessary protocol processing has been completed.

In the general reception processing as described above, it is known especially that when small packets arrive frequently, the number of hardware interrupts increases, such that load on the processor of the packet processing apparatus increases and the reception performance is lowered. It is also known that the reception performance is lowered due to an overhead associated with DMA transfer control because the number of times a DMA transfer is activated increases.

In order to deal with such a problem, a technique has been proposed in which a plurality of small packets are grouped into one large combination packet until a threshold set in the line handling unit is reached and the combination packet is DMA-transferred collectively to a packet memory when triggered by the size of the combination packet reaching the threshold (see Patent Literature 1).

Use of such a DMA transfer method (hereinafter referred to as collective DMA transfer) in which a plurality of small packets are transferred collectively as one combination packet can reduce the number of hardware interrupts even when small packets arrive at the packet processing apparatus and reduce the overhead of DMA transfer, enabling high-speed reception processing.

FIG. 30 is a block diagram illustrating a configuration of a packet processing apparatus of the related art disclosed in Patent Literature 1. This packet processing apparatus includes a line handling unit 100, a packet memory 101, a combination packet transfer unit 102a, a reception processing unit 103, a protocol processing unit 104, a reception buffer 105, a packet combining unit 106, and a combining threshold control unit 107.

In the packet processing apparatus illustrated in FIG. 30, the packet combining unit 106 transfers a packet received by the line handling unit 100 to the reception buffer 105 for packet combining. At this time, the packet combining unit 106 stores the packet received by the line handling unit 100 in the reception buffer 105 such that the received packet and packets already stored in the reception buffer 105 are combined into one combination packet. Then, when the size of the combination packet in the reception buffer 105 has exceeded a threshold preset in the combining threshold control unit 107, the packet combining unit 106 issues a request to transfer the combination packet to the packet memory 101.

Similar to the case of FIG. 27, the combination packet transfer unit 102a includes a descriptor 1020a and a DMA controller 1021a. FIG. 31 is a diagram illustrating an outline of the descriptor 1020a. An example of FIG. 31 illustrates the case where N combination packets are stored in the packet memory 101. In this case, the processor of the packet processing apparatus sets addresses and flags corresponding to the N combination packets in the descriptor 1020a.

The processor presets in the descriptor 1020a start addresses AD #1 to AD #N at which to write combination packets to the packet memory 101. Usually, the number of addresses that can be set at the same time is predetermined and the order in which the addresses are used is also predetermined.

The processor sets/resets flags ADF #1 to ADF #N, which indicate whether or not the set addresses AD #1 to AD #N are valid, in the descriptor 1020a. When the processor has set the flags ADF #1 to ADF #N to valid after setting the addresses AD #1 to AD #N, combination packets are allowed to be written to the packet memory 101.

Reception completion flags WDF #1 to WDF #N indicating whether or not writing of combination packets to the set addresses AD #1 to AD #N has been completed and received data sizes LD #1 to LD #N indicating the lengths (the sums of packet lengths of packets combined) of combination packets written to the set addresses A #1 to A #N are also set in the descriptor 1020a.

FIG. 32 is a flowchart illustrating operations of the DMA controller 1021a. First, the DMA controller 1021a initializes a variable n indicating the order of reading and writing from and to the descriptor 1020a to 1 (step S200 in FIG. 32) and reads an nth (=1st) flag ADF #1 from the descriptor 1020a (step S201 in FIG. 32).

When the flag ADF #1 indicates that the start address is valid (yes in step S202 in FIG. 32), the DMA controller 1021a reads an nth (=1st) start address AD #1 from the descriptor 1020a (step S203 in FIG. 32) and writes a corresponding nth (=1st) combination packet to an area starting from the start address AD #1 in the packet memory 101 (step S204 in FIG. 32).

After completing writing of the combination packet, the DMA controller 1021a writes a received data size LD #1 indicating the length of the nth (=1st) combination packet and the reception completion flag WDF #1 indicating that writing of the combination packet has been completed to the descriptor 1020a (step S205 in FIG. 32).

Further, the DMA controller 1021a generates a hardware interrupt to notify the processor (not illustrated) of the packet processing apparatus that writing of the combination packet has been completed and issues a request to activate the reception processing unit 103.

Then, the DMA controller 1021a determines whether or not the variable n is equal to N (step S206 in FIG. 32). When the variable n has not reached N (no in step S206), the DMA controller 1021a increments the variable n by 1 (step S207 in FIG. 32) and returns to step S201. When the variable n has reached N (yes in step S206), the DMA controller 1021a returns to step S200. In this way, N combination packets are sequentially transferred to the packet memory 101.

The reception processing unit 103 activated in response to an activation request from the combination packet transfer unit 102a (the DMA controller 1021a) passes the combination packet transferred to the packet memory 101 to the protocol processing unit 104.

According to the configuration illustrated in FIG. 30, because a request to activate reception processing is issued every time a combination packet into which a plurality of packets have been combined is transferred, the number of times the reception processing unit 103 is activated is reduced and the load on the processor of the packet processing apparatus is reduced. Further, because the number of times DMA transfer control is performed is also reduced, the overhead ratio is lowered and high reception performance can be exhibited.

However, in the configuration illustrated in FIG. 30, it is necessary for the protocol processing unit 104 to restore a plurality of original packets from a combination packet. When this restoration processing is realized by hardware of the protocol processing unit 104, it is necessary to provide means for the packet combining unit 106 to notify the protocol processing unit 104 of information required for the restoration processing (the number of packets combined and the size of each packet), which causes a problem of increasing the scale of hardware of the packet combining unit 106 or the like. It is also necessary to hold information required for the restoration processing in the packet memory 101 or the like.

The restoration processing can also be realized by software of the reception processing unit 103 or the like. However, similar to the above, it is necessary to provide means for the packet combining unit 106 to notify the reception processing unit 103 of information required for the restoration processing (the number of packets combined and the size of each packet), which causes a problem of increasing the scale of hardware of the packet combining unit 106 or the like. Further, because the restoration processing is performed by software, there is more software-based processing and the load on the processor increases, and as a result, there is a problem that the improvement of reception performance by the collective DMA transfer is limited.

Patent Literature 1 does not describe a configuration for increasing the speed of packet transmission when it is necessary to transmit a packet to the line handling unit 100 after performing protocol processing or the like. Even when the speed of the receiving side has been increased as in the packet processing apparatus of the related art disclosed in Patent Literature 1, transmission may become a bottleneck and performance improvement of the packet processing apparatus may fail if the transmitting side is slow. Thus, it is desirable that the speed of the transmitting side be increased as high as that of the receiving side.

FIG. 33 is a block diagram illustrating another configuration of a packet processing apparatus. In this packet processing apparatus, a combination packet separation unit 108 that restores a plurality of original packets from a combination packet is inserted between the reception processing unit 103 and the protocol processing unit 104 of the packet processing apparatus of FIG. 30.

Similar to when the packet restoration processing is realized by hardware of the protocol processing unit 104, when the combination packet separation unit 108 is realized by hardware, it is necessary to provide means for the packet combining unit 106 to notify the combination packet separation unit 108 of information required for the restoration processing (the number of packets combined and the size of each packet), which causes a problem of increasing the scale of hardware of the packet combining unit 106 or the like.

The restoration processing can also be realized by software of the combination packet separation unit 108 or the like. However, similar to the above, it is necessary to provide means for the packet combining unit 106 to notify the combination packet separation unit 108 of information required for the restoration processing (the number of packets combined and the size of each packet), which causes a problem of increasing the scale of hardware of the packet combining unit 106 or the like. Further, because the restoration processing is performed by software, there is more software-based processing and the load on the processor increases, and as a result, there is a problem that the improvement of reception performance by the collective DMA transfer is limited.

Also, when it is necessary to transmit a packet to the line handling unit 100 after performing protocol processing or the like in the packet processing apparatus illustrated in FIG. 33, transmission may become a bottleneck and performance improvement of the packet processing apparatus may fail if the transmitting side is slow even when the speed of the receiving side has been increased. Thus, it is desirable that the speed of the transmitting side be increased as high as that of the receiving side.

FIG. 34 is a block diagram illustrating another configuration of the packet processing apparatus. This packet processing apparatus is obtained by replacing the combination packet transfer unit 102a in the packet processing apparatuses of FIGS. 30 and 33 with a combination packet writing unit 109 implemented by software. The packet processing apparatus which does not use DMA transfer may improve the effective throughput of writing to the packet memory 101 by collectively writing a plurality of packets to the packet memory 101 (hereinafter referred to as collectively writing) by software in some cases (such as when the packet memory 101 is made of a DRAM). The packet processing apparatus that performs collective writing in this way also has problems similar to the above when restoring a plurality of original packets from a combination packet.

Further, when the entire processing of FIG. 34 (excluding hardware processing in the packet memory 101 and the line handling unit 100) is performed by software, it is necessary to store information required for the restoration processing (the number of packets combined and the size of each packet) in the packet memory 101 or the like and there is a problem that it is necessary to increase the capacity (the number of writable bits) of the packet memory 101 or the like as compared to when collective writing is not performed.

Also, when it is necessary to transmit a packet to the line handling unit 100 after performing protocol processing or the like in the packet processing apparatus illustrated in FIG. 34, transmission may become a bottleneck and performance improvement of the packet processing apparatus may fail if the transmitting side is slow even when the speed of the receiving side has been increased. Thus, it is desirable that the speed of the transmitting side be increased as high as that of the receiving side.

CITATION LIST

Patent Literature

Patent Literature 1: JP 4468332 B.

SUMMARY

Technical Problem

The present disclosure is realized for solving the problems of the technique in a related art described above, and an object of the present disclosure is to provide a technique enabling implementation of high transmission performance according to effects of collective DMA transfer or collective writing by reducing the scale of hardware required for a process of restoring a combined packet into a plurality of original packets, in a packet processing apparatus using collective DMA transfer using hardware or collective reading and collective writing using software.

Means for Solving the Problem

A packet processing apparatus of embodiments of the present invention includes a first packet memory configured to store a packet to be transmitted, a first packet combining unit configured to write a plurality of packets to be transmitted to the first packet memory to generate a first combination packet into which the plurality of packets have been concatenated, a first line handling unit configured to send a packet to be transmitted to a communication line, and a first combination packet transfer unit configured to DMA-transfer the first combination packet generated by the first packet combining unit from the first packet memory to the first line handling unit or read the first combination packet from the first packet memory and write the read first combination packet to the first line handling unit through a processor, wherein the first packet combining unit is configured to write information on an address in the first packet memory of beginning data of an individual packet in the first combination packet to a first descriptor that is a predetermined data area in a memory, and the first line handling unit is configured to separate the first combination packet DMA-transferred or written by the first combination packet transfer unit into a plurality of packets and send the plurality of packets to the communication line.

In one exemplary configuration of the packet processing apparatus of embodiments of the present invention, the first packet combining unit is configured to notify the first combination packet transfer unit of information on packets constituting the first combination packet, the first combination packet transfer unit is configured to DMA-transfer the first combination packet from the first packet memory to the first line handling unit or read the first combination packet from the first packet memory and write the read first combination packet to the first line handling unit through a processor and notify the first line handling unit of information on packets constituting the first combination packet based on information of which the first packet combining unit has notified and information of the address written to the first descriptor, and the first line handling unit is configured to separate the first combination packet DMA-transferred or written by the first combination packet transfer unit into a plurality of packets based on information of which the first combination packet transfer unit has notified and send the plurality of packets to the communication line.

In one exemplary configuration of the packet processing apparatus of embodiments of the present invention, information of which the first packet combining unit notifies the first combination packet transfer unit includes information on the number of packets constituting the first combination packet and a data size of the first combination packet, and information of which the first combination packet transfer unit notifies the first line handling unit includes information on the number of packets constituting the first combination packet, the data size of the first combination packet, and addresses in the first packet memory of beginning data of the packets constituting the combination packet.

One exemplary configuration of the packet processing apparatus of embodiments of the present invention further includes a second line handling unit configured to receive a packet from the communication line, a second packet combining unit configured to concatenate a plurality of packets received from the communication line to generate a second combination packet, a second packet memory configured to store a packet received from the communication line, and a second combination packet transfer unit configured to DMA-transfer the second combination packet generated by the second packet combining unit to the second packet memory or write the second combination packet to the second packet memory through a processor, wherein the second combination packet transfer unit is configured to write information on an address in the second packet memory of beginning data of an individual packet in the second combination packet to a second descriptor that is a predetermined data area in a memory.

One exemplary configuration of the packet processing apparatus of embodiments of the present invention further includes a processing unit configured to read a packet stored in the second packet memory, wherein the processing unit is configured to read a packet from the second packet memory based on information written to the second descriptor and perform processing on the read packet.

A packet processing method of embodiments of the present invention includes a first step of writing a plurality of packets to be transmitted to a first packet memory to generate a first combination packet into which the plurality of packets have been concatenated, a second step of writing information on an address in the first packet memory of beginning data of an individual packet in the first combination packet to a first descriptor that is a predetermined data area in a memory, a third step of DMA-transferring the first combination packet generated in the first step from the first packet memory to a line handling unit or reading the first combination packet from the first packet memory and writing the read first combination packet to the first line handling unit through a processor, and a fourth step of separating the first combination packet DMA-transferred or written through the third step into a plurality of packets and sending the plurality of packets from the line handling unit to a communication line.

One exemplary configuration of the packet processing method of embodiments of the present invention further includes a fifth step of concatenating a plurality of packets received from the communication line to generate a second combination packet, a sixth step of DMA-transferring the second combination packet to a second packet memory, from which packet reading is performed by a processing unit that performs processing on a packet received from the communication line, or writing the second combination packet to the second packet memory through a processor, and a seventh step of writing information on an address in the second packet memory of beginning data of an individual packet in the second combination packet to a second descriptor that is a predetermined data area in a memory.

Effects of Embodiments of the Invention

According to embodiments of the present invention, the first combination packet transfer unit DMA-transfers a first combination packet generated by the first packet combining unit to the first line handling unit or reads the first combination packet from the first packet memory and writes the read first combination packet to the first line handling unit through a processor, reads information on the address in the first packet memory of beginning data of each packet in the first combination packet from the first descriptor that is a predetermined data area in a memory, and notifies the first line handling unit of the read information. The packet processing apparatus including the first combination packet transfer unit of embodiments of the present invention can realize high transmission performance due to the effects of collective DMA transfer or collective reading and collective writing.

In addition, according to embodiments of the present invention, the second combination packet transfer unit DMA-transfers a second combination packet generated by the second packet combining unit to the second packet memory or writes the second combination packet to the second packet memory through a processor, and writes information on the address in the second packet memory of beginning data of each packet in the second combination packet to the second descriptor that is a predetermined data area in a memory. Compared to the configurations of the related art, the packet processing apparatus including the second combination packet transfer unit of embodiments of the present invention can reduce the scale of hardware required for the processing of restoring a plurality of original packets from a second combination packet into which the plurality of packets have been combined and can also realize high reception performance due to the effects of collective DMA transfer or collective writing.

Further, when the processing of restoring a plurality of original packets from a second combination packet into which the plurality of packets have been combined is implemented by hardware in the configuration of embodiments of the present invention, there is an advantage that the reception performance is improved (the number of packets that can be processed per unit time increases) because the processing of the processor required to process one packet becomes lighter as compared to when the processing of restoring a plurality of original packets from a second combination packet into which the plurality of packets have been combined is implemented by software in the configuration of the related art of FIG. 33 or 34. Also, there is an advantage that power consumption of the processor required to process one packet is reduced.

DETAILED DESCRIPTION OF ILLUSTRATIVE EMBODIMENTS

First Embodiment

Figure 1:
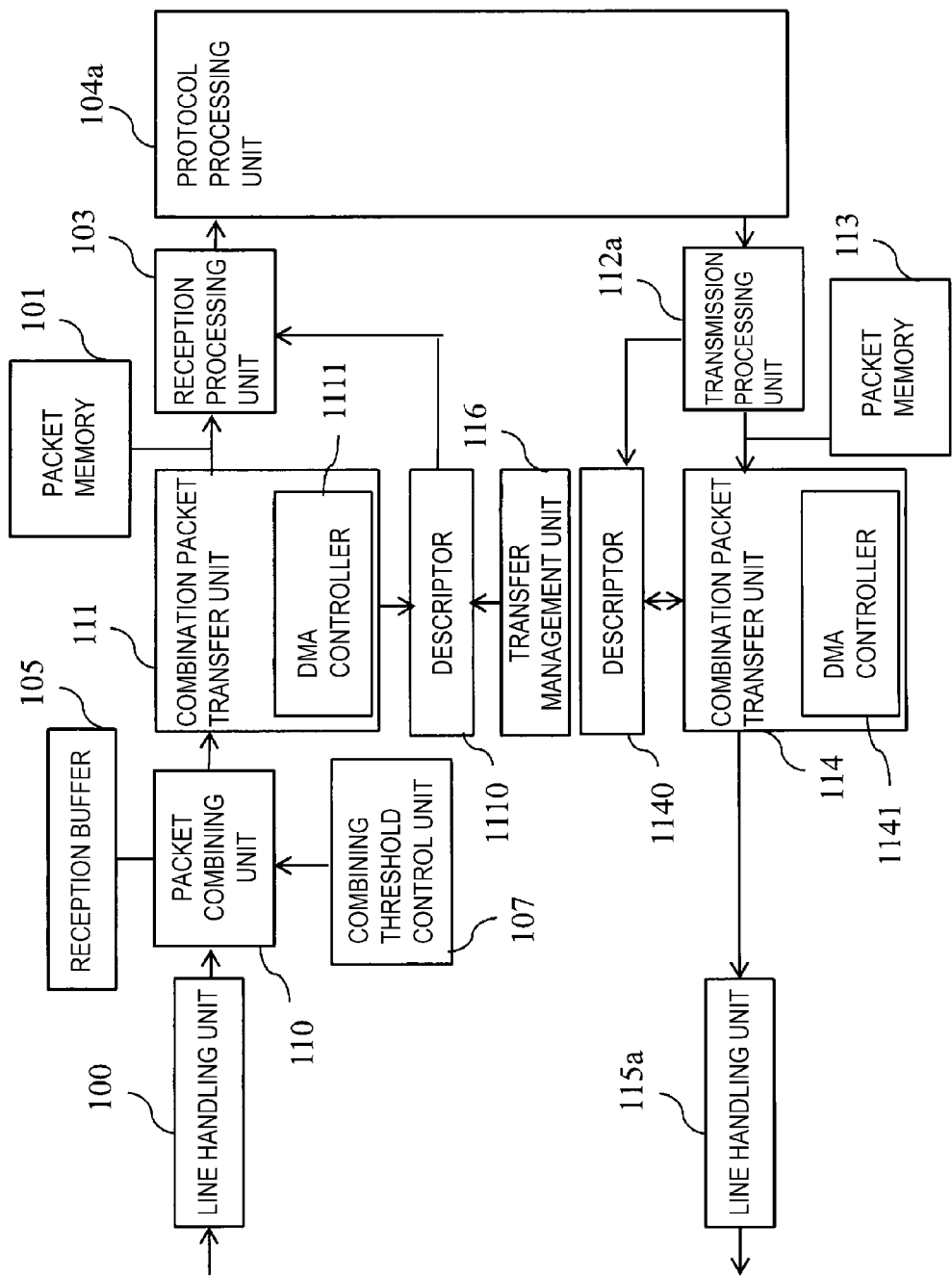
FIG. 1 is a block diagram illustrating a configuration of a packet processing apparatus according to a first embodiment of the present invention.

Hereinafter, embodiments on which the present invention is based will be described. In all drawings for explaining the examples and embodiments, those having the same function are denoted by the same reference signs and repeated description thereof will be omitted. FIG. 1 is a block diagram illustrating a configuration of a packet processing apparatus according to a first embodiment of the present disclosure.

The packet processing apparatus of FIG. 1 is connected to a communication line (not illustrated) and includes a line handling unit 100 (a second line handling unit), a packet memory 101, a reception processing unit 103, a protocol processing unit 104a, a reception buffer 105, a combining threshold control unit 107, a packet combining unit 110 (a second packet combining unit), a combination packet transfer unit 11 (a second combination packet transfer unit), a packet memory 113 (a first packet memory), a transmission processing unit 112a (a first packet combining unit), a combination packet transfer unit 114 (a first combination packet transfer unit), a line handling unit 115a (a first line handling unit), and a transfer management unit 116. The line handling unit 100 (the second line handing unit) receives data from the communication line. The packet memory 101 stores packets received from the communication line. The reception processing unit 103 passes packets stored in the packet memory 101 to the protocol processing unit 104a. The protocol processing unit 104a performs protocol processing of packets. The reception buffer 105 is for packet combining. A threshold for regulating the size of each combination packet is preset in the combining threshold control unit 107. The packet combining unit 110 (the second packet combining unit) concatenates a plurality of packets received from the communication line in the reception buffer 105 to generate one combination packet (second combination packet). The combination packet transfer unit 11 (the second combination packet transfer unit) DMA-transfers the combination packet generated by the packet combining unit 110 to the packet memory 101. The packet memory 113 (the first packet memory) stores packets to be transmitted. The transmission processing unit 112a (the first packet combining unit) writes a plurality of packets to be transmitted to the packet memory 113 to generate a combination packet (a first combination packet) into which the plurality of packets have been concatenated. The combination packet transfer unit 114 (the first combination packet transfer unit) performs a DMA transfer to transfer the combination packet generated by the transmission processing unit 112a from the packet memory 113 to the line handling unit 115a which will be described later. The line handling unit 115a (the first line handling unit) sends packets to be transmitted to the communication line. The transfer management unit 116 performs initial settings of the descriptors 1110 and 1140 that are predetermined data areas in the memory. The transfer management unit 116 may be configured as a part of the reception processing unit 103.

Figure 30:
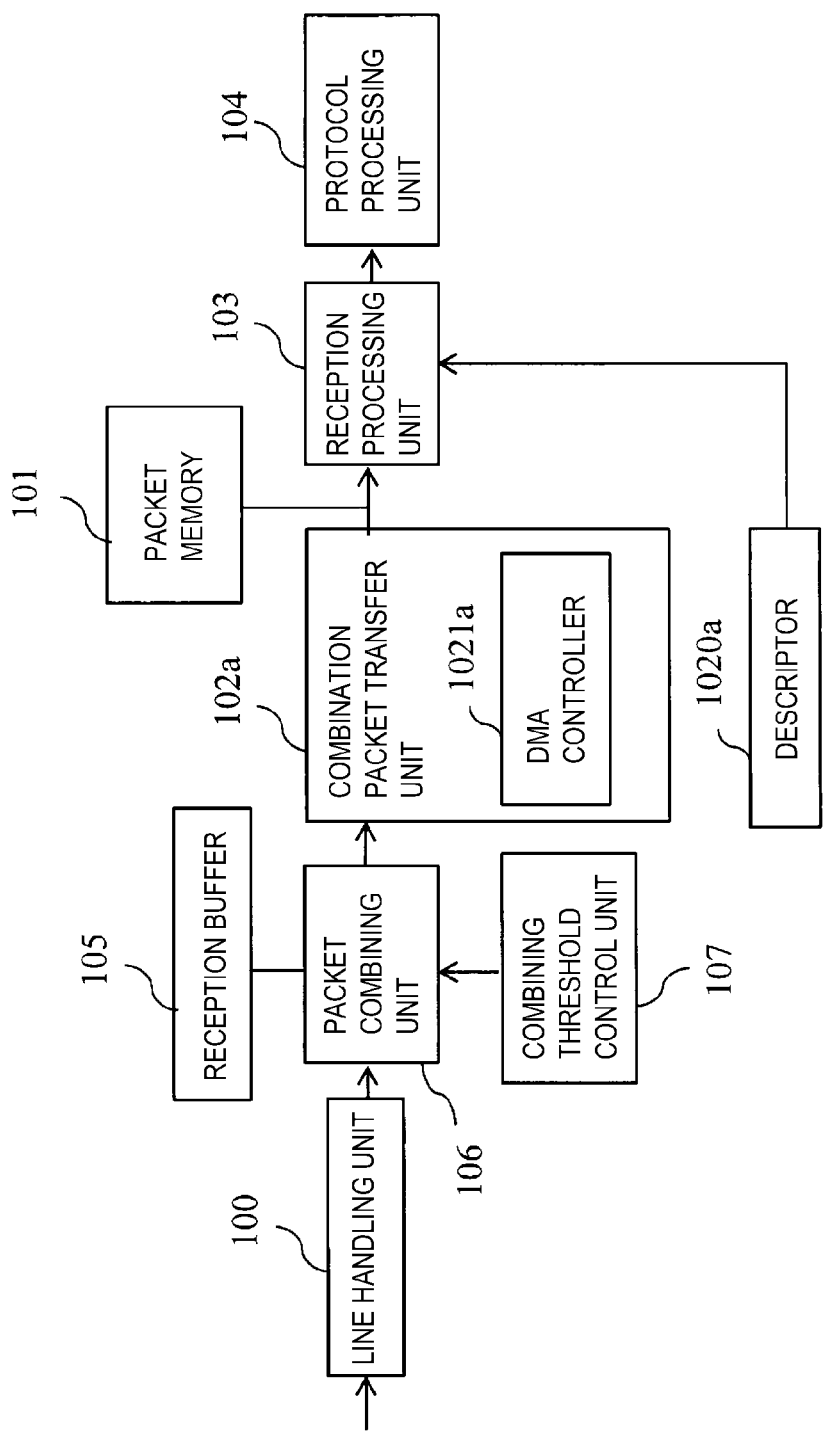
FIG. 30 is a block diagram illustrating another configuration of a packet processing apparatus of the related art.
Figure 31:
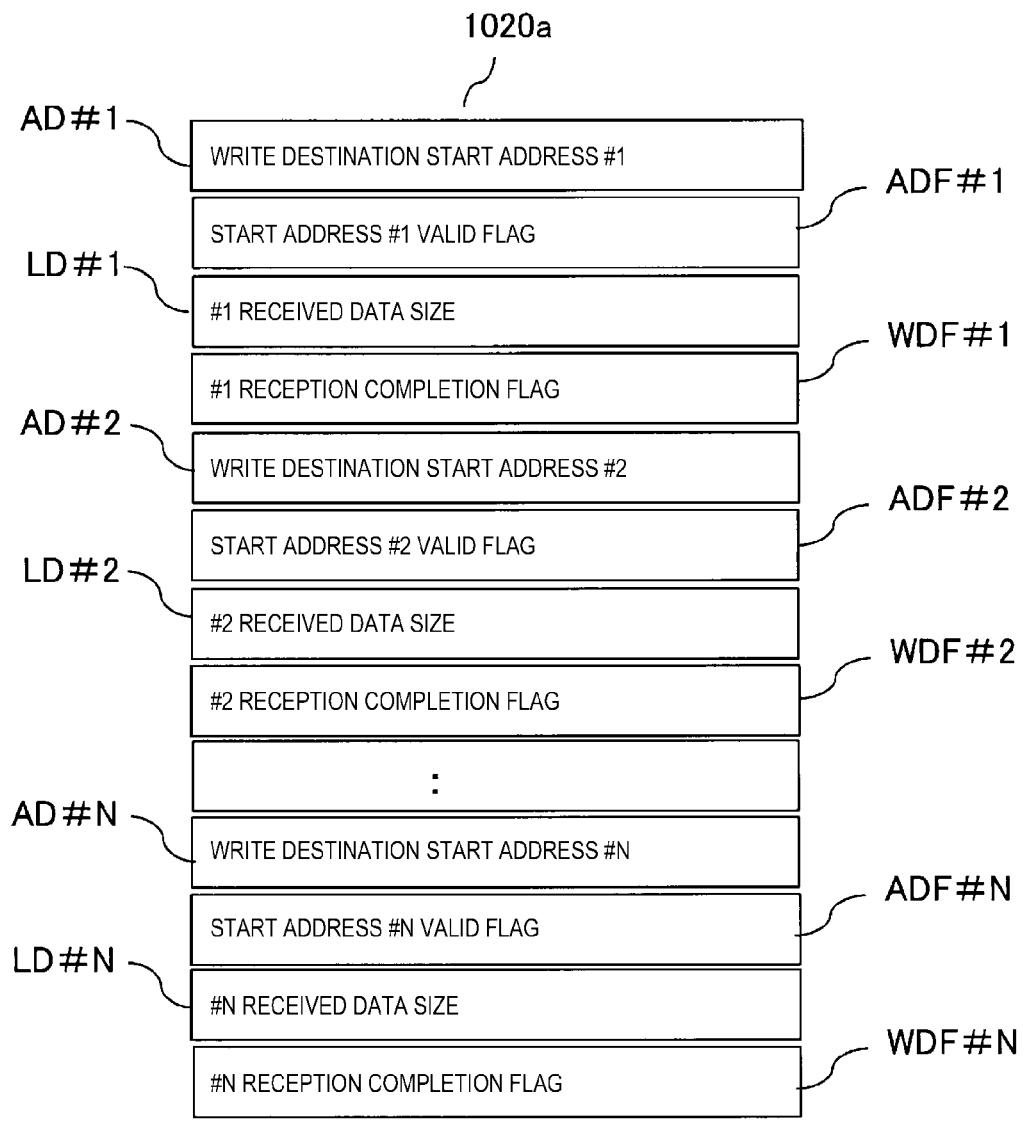
FIG. 31 is a diagram illustrating an outline of a descriptor for the packet processing apparatus of FIG. 30.
Figure 32:
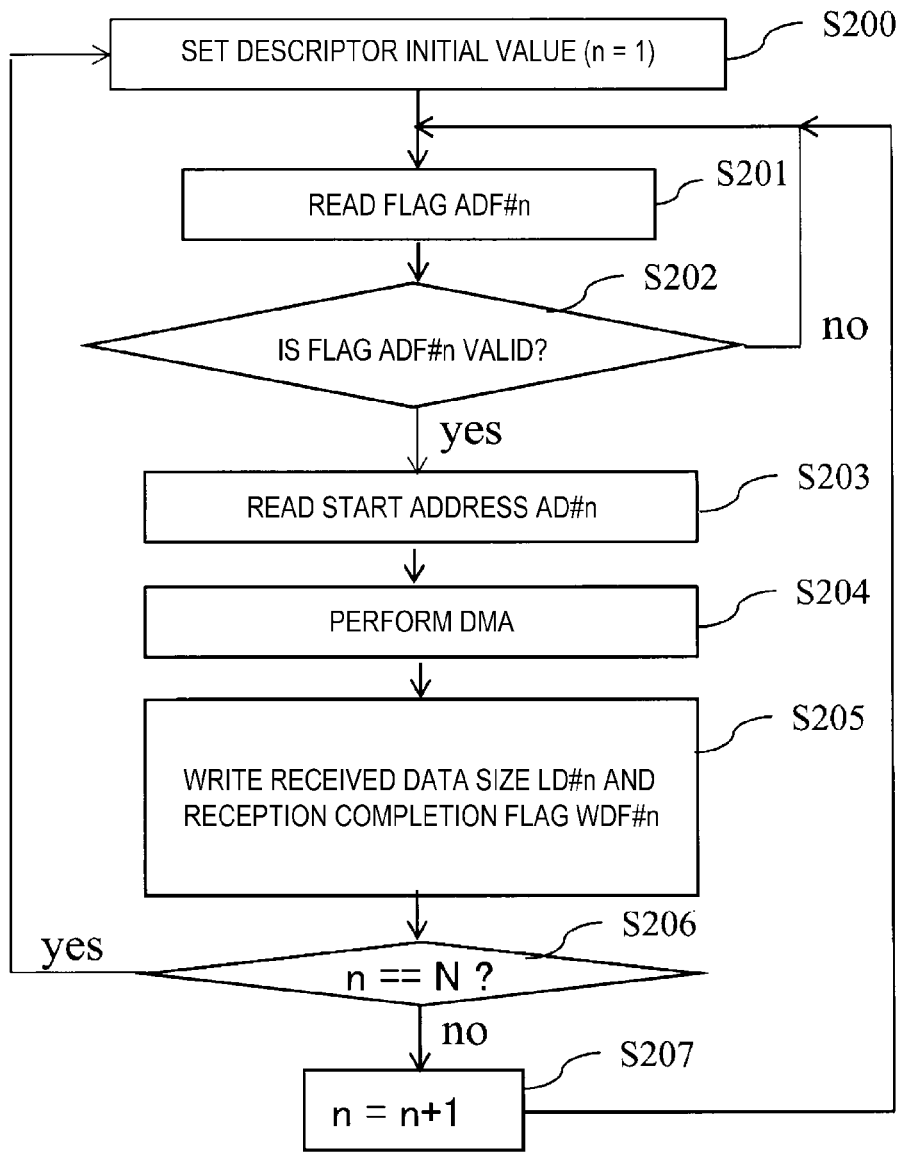
FIG. 32 is a flowchart illustrating an operation of a DMA controller in the packet processing apparatus of FIG. 30.

Of these components, the line handling unit 100, the reception buffer 105 for packet combining, and the combining threshold control unit 107 are equivalent to those in the configuration of FIG. 30.

The packet combining unit 110 transfers a packet received by the line handling unit 100 to the reception buffer 105 for packet combining. At this time, the packet combining unit 110 stores a packet received by the line handling unit 100 in the reception buffer 105 such that the received packet and packets already stored in the reception buffer 105 are concatenated into one combination packet. Then, when the size of the combination packet in the reception buffer 105 has exceeded the threshold set in the combining threshold control unit 107, the packet combining unit 110 issues a request to transfer the combination packet to the packet memory 101.

Here, the packet combining unit 110 may also issue a transfer request when a timeout has occurred (such as when the reception interval between packets has exceeded a predetermined period) before the size of the combination packet in the reception buffer 105 has exceeded the threshold.

The packet combining unit 110 records the number of packets combined in the reception buffer 105 and the size of each packet and notifies the combination packet transfer unit 11 of the number of packets combined and the size of each packet when issuing a request to transfer the combination packet.

The combination packet transfer unit 11 includes a DMA controller 1111. The combination packet transfer unit 11 transfers the combination packet to the packet memory 101 through one DMA transfer, generates a hardware interrupt, and issues a request to activate the reception processing unit 103.

Here, the combination packet transfer unit 11 may not generate a hardware interrupt to the processor (not illustrated) of the packet processing apparatus.

The combination packet transfer unit 111 writes the size of each packet and the like to the descriptor 1110 which has been prepared for each packet by the transfer management unit 116 (software executed by the processor) using information on the number of packets combined and the size of each packet of which the packet combining unit 110 has notified. Details of the configuration of the descriptor 1110 and the operation of the combination packet transfer unit 111 will be described later.

Upon detecting an activation request, the reception processing unit 103 reads a packet from the packet memory 101 based on address information and size information written to the descriptor 1110 prepared for each packet and passes the packet to the protocol processing unit 104a. The operation of the reception processing unit 103 is equivalent to the operation of the configuration illustrated in FIG. 27.

The protocol processing unit 104a performs necessary protocol processing on the packet received from the reception processing unit 103. Then, when the necessary protocol processing has been completed, the protocol processing unit 104a releases an area of the packet memory 101 in which the packet passed from the reception processing unit 103 is stored. The operation of the protocol processing unit 104a is equivalent to the operation of the protocol processing unit 104 illustrated in FIG. 27. When the necessary protocol processing has been completed and the area of the packet memory 101 in which the packet passed from the reception processing unit 103 is stored has been released, it is determined that processing in S503 of FIG. 6 which will be described later has been completed. However, the protocol processing unit 104a of the present embodiment performs not only processing of received packets but also processing of transmission packets (packets to be transmitted).

Upon detecting a packet transmission request from the protocol processing unit 104a, the transmission processing unit 112a writes packet data to the packet memory 113 and constructs, in the packet memory 113, a combination packet into which a plurality of packets have been combined according to the sizes of the packets to be transmitted. Details of the operation of the transmission processing unit 112a will be described later.

The combination packet transfer unit 114 includes a DMA controller 1141. The combination packet transfer unit 114 transfers the combination packet in the packet memory 113 to the line handling unit 115a through one DMA transfer. Further, the combination packet transfer unit 114 notifies the line handling unit 115a of the number of packets combined and the size of each packet. Details of the operation of the combination packet transfer unit 114 will be described later.

The line handling unit 115a separates the combination packet transferred by the combination packet transfer unit 114 into a plurality of transmission packets using information on the number of packets combined and the size of each packet of which the combination packet transfer unit 114 has notified and sends the plurality of transmission packets to the communication line. Details of the operation of the line handling unit 115a will be described later.

The reception processing unit 103, the protocol processing unit 104a, and the transfer management unit 116 can be realized by software that runs on a general-purpose personal computer or a workstation or can be realized by hardware such as a field programmable gate array (FPGA) that runs in cooperation with a program.

The packet memory 101 and the packet memory 113 can be configured as a memory on a personal computer, a communication device, or a communication board.

The line handling unit 100, the combining threshold control unit 107, and the packet combining unit no can be made of an FPGA or the like on a communication device or a communication board.

The reception buffer 105 can be made of a storage area included in an FPGA or the like on a communication device or a communication board or a storage circuit such as a first-in first-out (FIFO).

Figure 2:
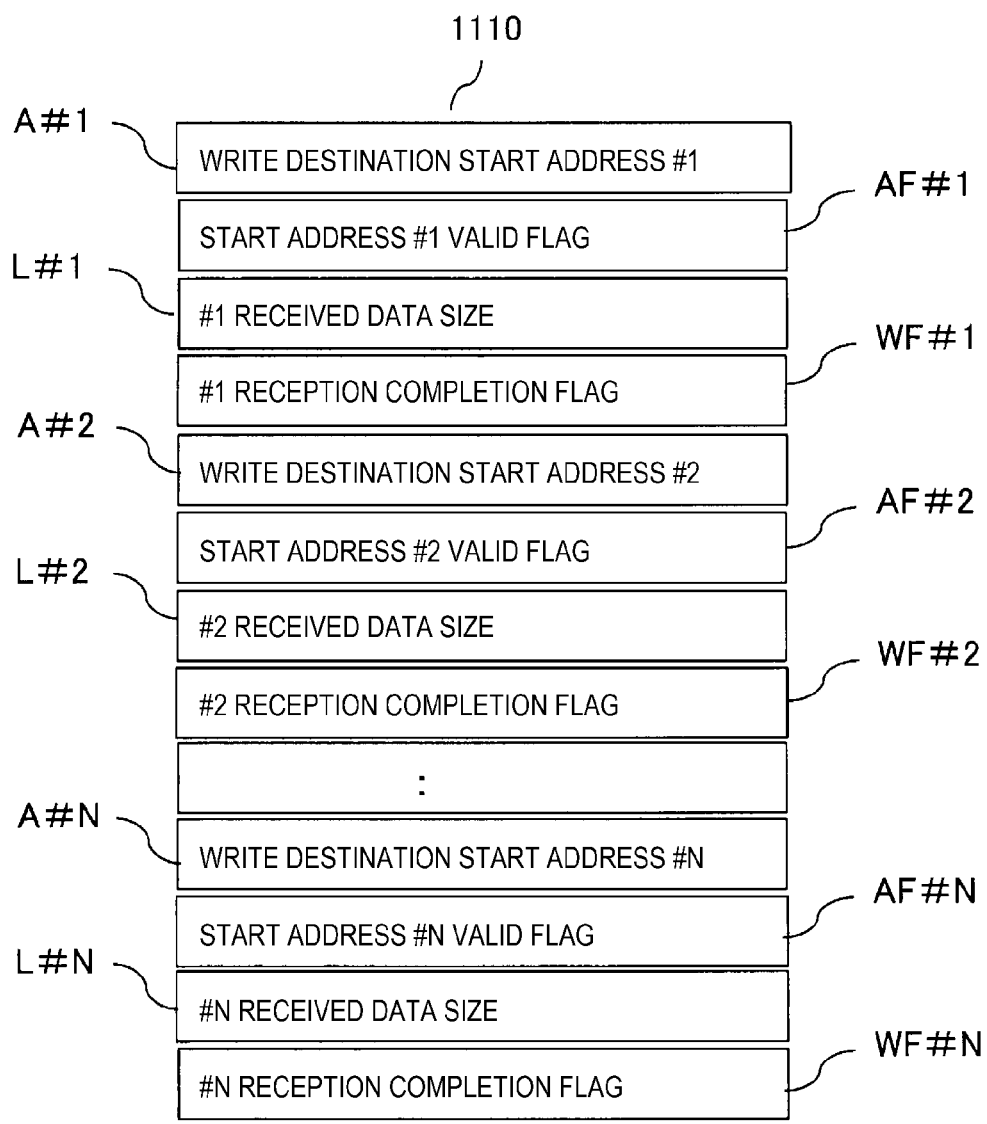
FIG. 2 is a diagram illustrating an outline of a descriptor for reception in the packet processing apparatus according to the first embodiment of the present invention.

FIG. 2 illustrates an exemplary configuration of the descriptor 1110 for reception used by the combination packet transfer unit in of the present embodiment. Generally, a data structure that records the addresses and the like of the packet memory 101 for reception processing is called a descriptor 1110. The example of FIG. 2 illustrates the case when N reception packets are stored in the packet memory 101.

The descriptor 1110 of FIG. 2 is a data structure in which a plurality (N sets) of start addresses A #1 to A #N of the write destinations of received packets, valid flags AF #1 to AF #N indicating whether or not the start addresses A #1 to A #N are valid, received data sizes L #1 to L #N indicating the packet lengths of reception packets written to the start addresses A #1 to A #N, and reception completion flags WF #1 to WF #N indicating whether or not the writing of reception packets to the start addresses A #1 to A #N has been completed can be written. The configuration of the descriptor 1110 is equivalent to that of the descriptor 1020 for reception processing generally used in the configuration of FIG. 27.

The descriptor 1110 is actually arranged in a memory on a personal computer, a communication device, or a communication board, similar to the packet memory 101.

The descriptor 1110 can be arranged in the same memory as the packet memory 101, in which case the purpose can be distinguished by the address in the memory.

Figure 28:
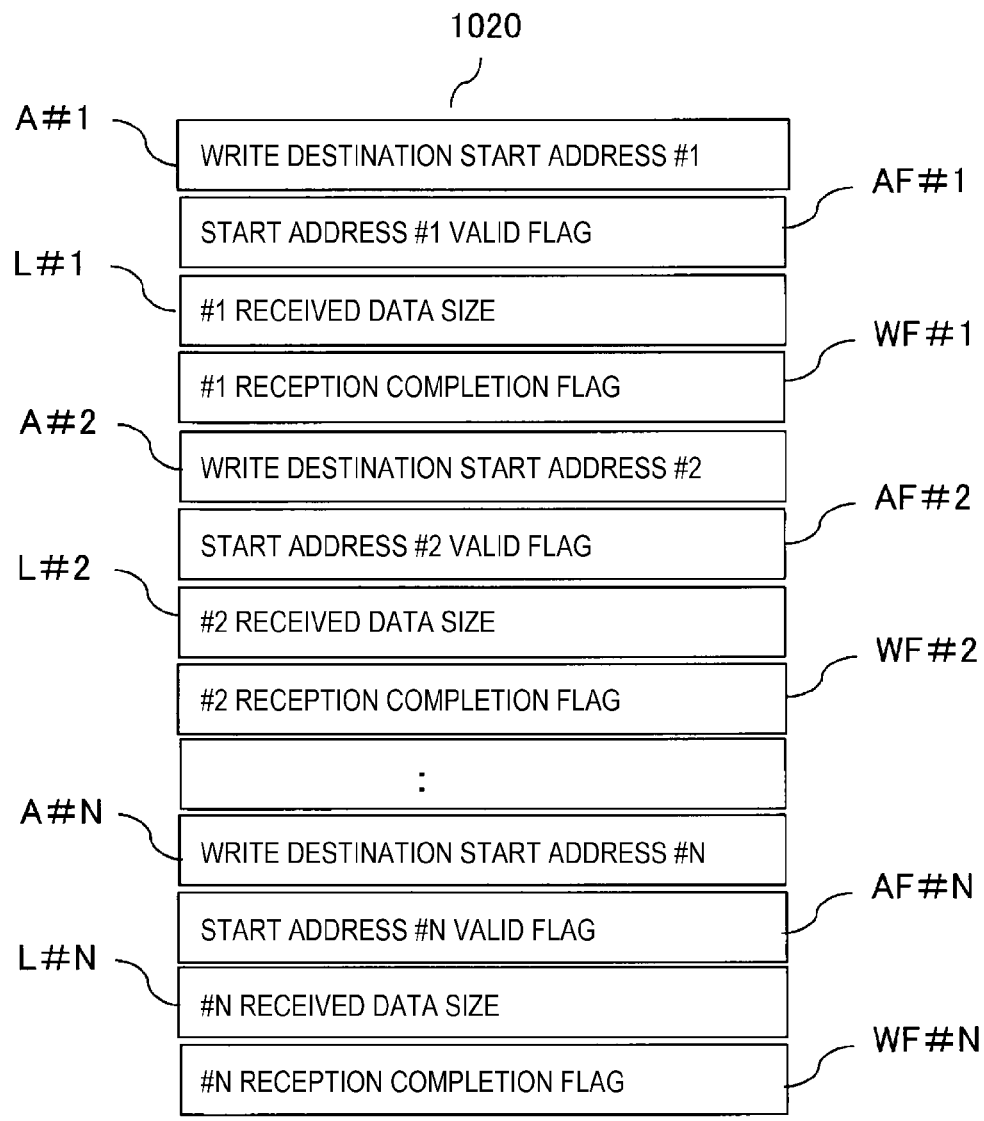
FIG. 28 is a diagram illustrating an outline of a descriptor for the packet processing apparatus of FIG. 27.

Here, an exemplary operation of DMA transfer of the related art using the descriptor 1020 of the related art will be described in detail again with reference to FIGS. 28 and 29.

First, the processor of the packet processing apparatus determines and writes start addresses A #1 to A #N of the write destinations of packets to the descriptor 1020 and further rewrites valid flags AF #1 to AF #N indicating whether or not the start addresses A #1 to A #N are valid from "invalid" to "valid".

The descriptor 1020 has N sets of areas for writing information such as the start addresses, while the order of writing to the areas is predetermined. For example, in the example of FIG. 28, the processor writes the start addresses in the order of the first start address A #1, the second start address A #2, . . . , and the Nth start address A #N.

When it becomes possible to transfer the first packet again after all start addresses are written, starts addresses are written to the descriptor 1020 in order from the first start address A #1. Whether or not a start address A #n (where n is 1 to N) can be written may be determined, for example, such that it is determined that the start address A #n can be written if a valid flag AF #n corresponding to the start address A #n is "invalid".

Figure 29:
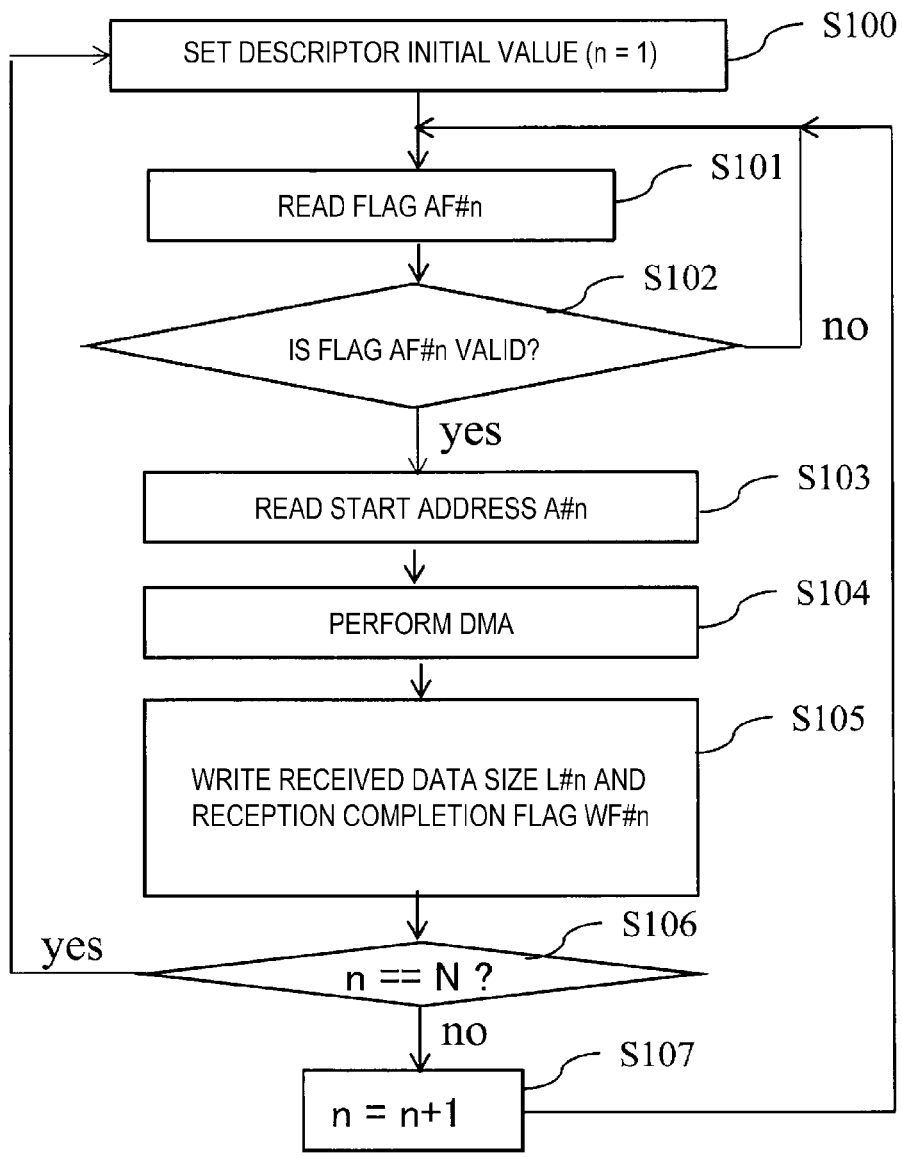
FIG. 29 is a flowchart illustrating an operation of a DMA controller in the packet processing apparatus of FIG. 27.

Next, the DMA controller 1021 checks a valid flag AF #n in the descriptor 1020, and when the valid flag AF #n indicates that a start address A #n is "valid" (yes in FIG. 29 step S102), reads the start address A #n from the descriptor 1020 (step S103 in FIG. 29), and writes a corresponding nth packet to an area starting from the start address A #n in the packet memory 101 (step S104 in FIG. 29).

After completing this DMA transfer, the DMA controller 1021 writes a received data size L #n indicating the packet length of the nth packet to the descriptor 1020 and rewrites a reception completion flag WF #n set in the descriptor 1020 indicating that writing of the nth packet has been completed from "not completed" to "completed" (step S105 in FIG. 29).

As described above, the descriptor 1020 has (a set of) N areas of valid flags AF #1 to AF #N, while the order in which the valid flags AF #1 to AF #N are checked is predetermined. For example, in the examples of FIGS. 28 and 29, the DMA controller 1021 checks the valid flags in the order of the first valid flag AF #1, the second valid flag AF #2, . . . , and the Nth valid flag AF #N. After checking all valid flags, the DMA controller 1021 checks again the valid flags in order from the first valid flag AF #1.

The descriptor 1020 also has N sets of prepared areas for writing the received data sizes L #1 to L #N and the reception completion flags WF #1 to WF #N. The DMA controller 1021 writes a reception data size L #n and a reception completion flag WF #n to areas of a number corresponding to an nth valid flag AF #n which has been confirmed as indicating that an nth start address A #n is "valid".

Next, the processor of the packet processing apparatus periodically checks the reception completion flags WF #n in the descriptor 1020, and when a reception completion flag WF #n indicates "completed", reads an nth packet from the packet memory 101 using information on a corresponding nth start address A #n and a corresponding nth received data size L #n and performs necessary processing (for example, protocol processing) on the read nth packet.

Then, the processor rewrites an nth valid flag AF #n in the descriptor 1020 corresponding to the nth packet for which the processing has been completed from "valid" to "invalid" and rewrites the nth reception completion flag WF #n in the descriptor 1020 from "completed" to "not completed".

The descriptor 1020 has (a set of) N areas of reception completion flags WF #1 to WF #N, while the order in which the reception completion flags WF #1 to WF #N are checked is predetermined. For example, in the example illustrated in FIGS. 28 and 29, the processor checks the reception completion flags in a sequence of a first reception completion flag WF #1, a second reception completion flag WF #2, . . . , an N-th reception completion flag WF #N. After checking all reception completion flags, the processor checks the reception completion flags again in order from the first reception completion flag WF #1.

In the above operation, the DMA controller 1021 may issue an interrupt processing request to the processor after completing a DMA transfer and check reception completion flags WF #1 to WF #N upon receiving the interrupt processing request from the DMA controller 1021 instead of the processor periodically checking the reception completion flags WF #1 to WF #N.

Figure 3:
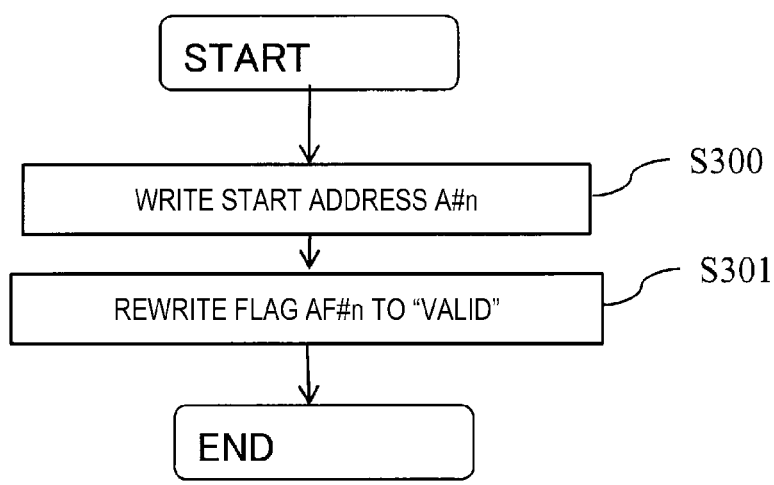
FIG. 3 is a flowchart illustrating an operation of a transfer management unit in the packet processing apparatus according to the first embodiment of the present invention.
Figure 4:
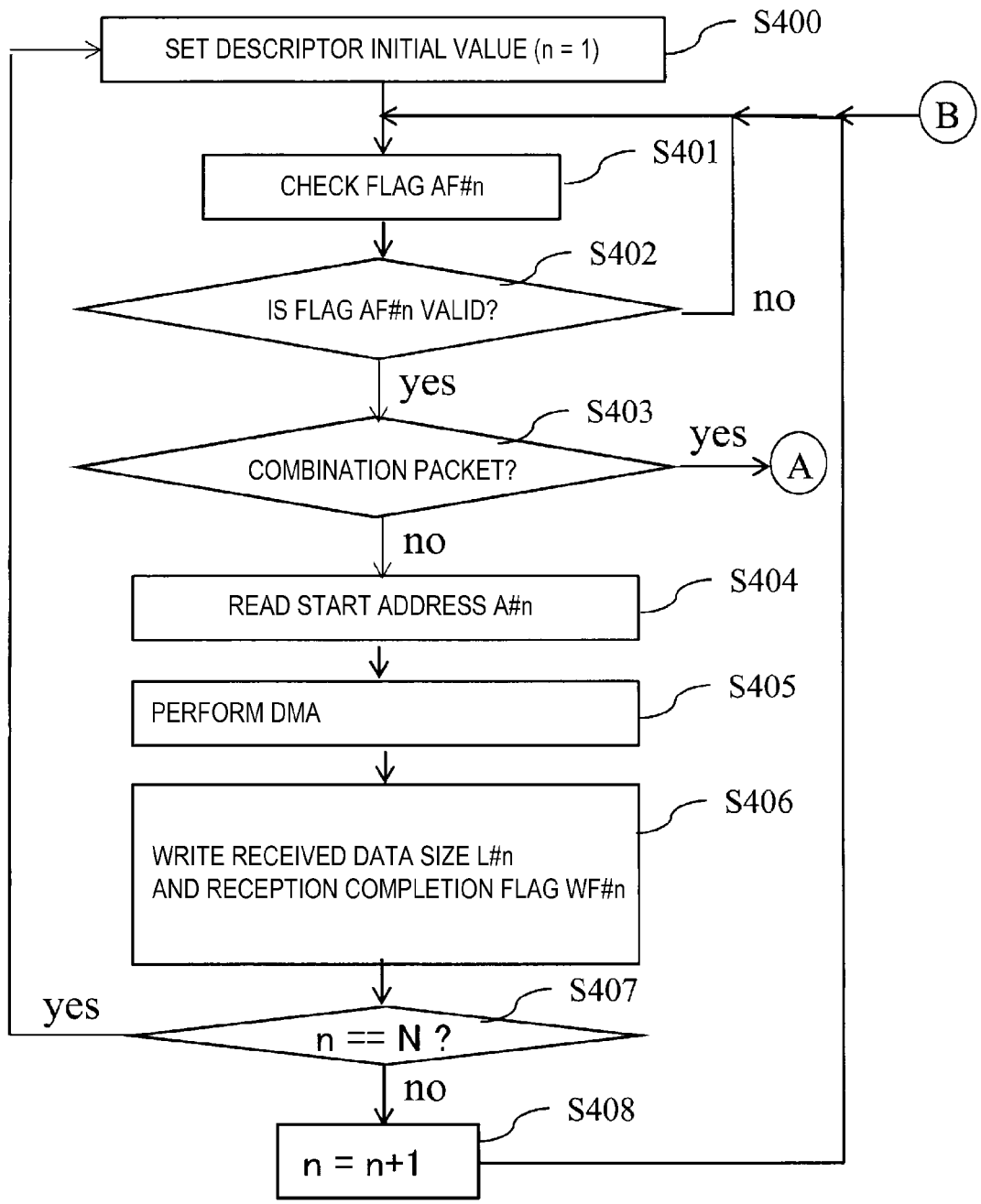
FIG. 4 is a flowchart illustrating an operation of a DMA controller for reception in the packet processing apparatus according to the first embodiment of the present invention.
Figure 5:
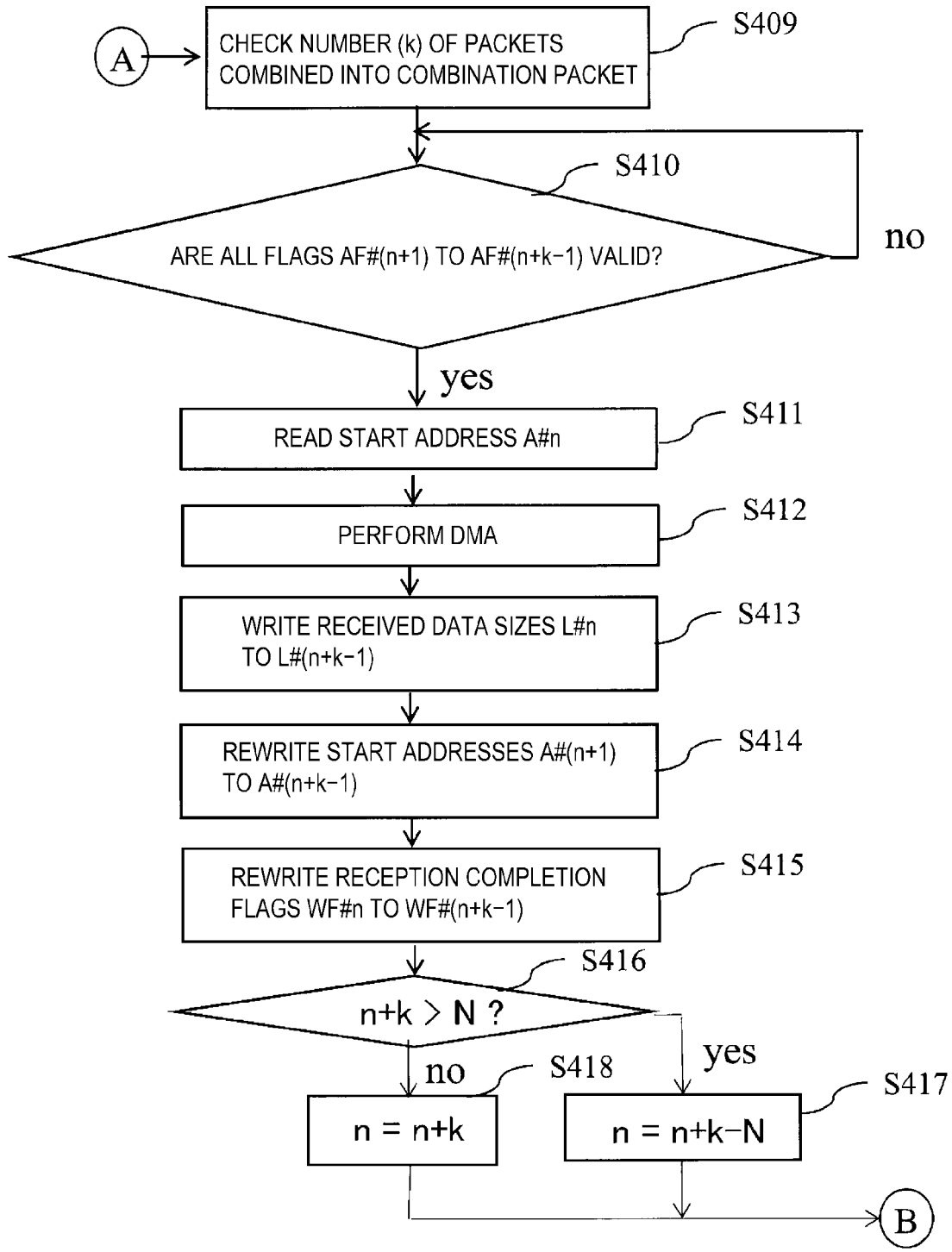
FIG. 5 is a flowchart illustrating an operation of the DMA controller for reception in the packet processing apparatus according to the first embodiment of the present invention.
Figure 6:
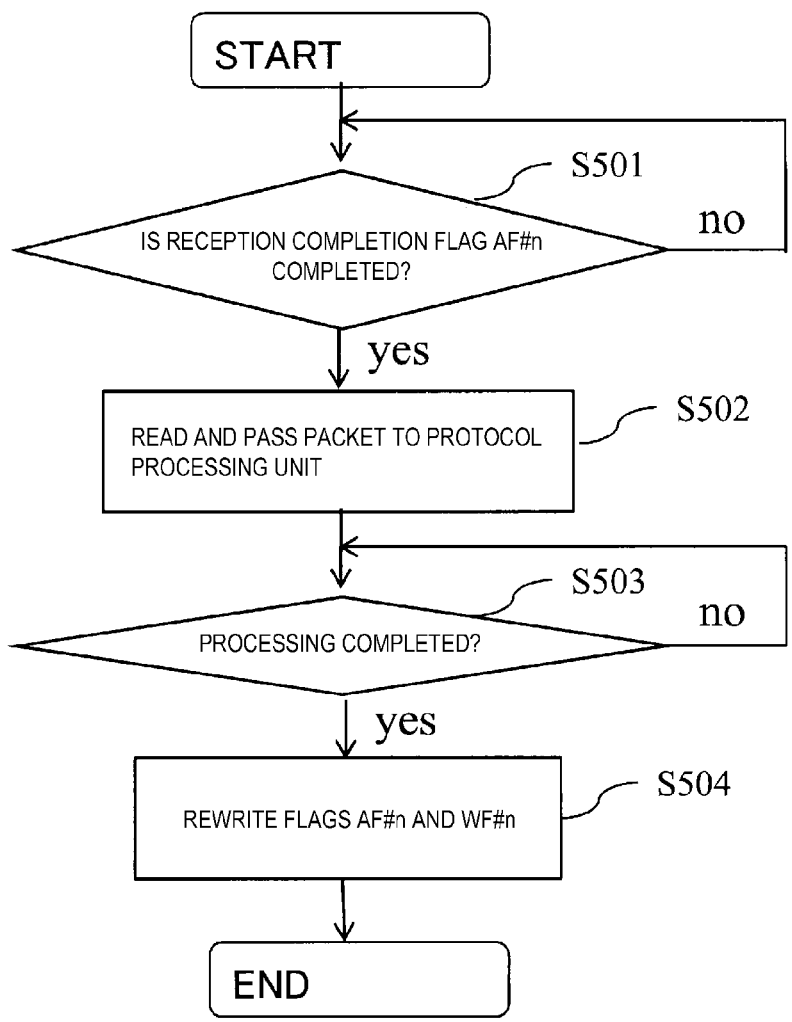
FIG. 6 is a flowchart illustrating an operation of a reception processing unit in the packet processing apparatus according to the first embodiment of the present invention.

Next, an exemplary operation of the present embodiment using the descriptor 1110 having the configuration of FIG. 2 will be described with reference to FIGS. 1 to 6. FIG. 3 is a flowchart illustrating an operation of the transfer management unit 116, FIGS. 4 and 5 are flowcharts illustrating operations of the DMA controller 1111, and FIG. 6 is a flowchart illustrating an operation of the reception processing unit 103.

First, the transfer management unit 116 (software executed by the processor) determines addresses of beginning data of N packets in the packet memory 101, that is, start addresses A #n (where n is 1 to N) of write destinations of the packets, and writes the determined addresses to the descriptor 1020 as an initial setting of the packet processing apparatus (step S300 in FIG. 3). Further, the transfer management unit 116 rewrites the valid flags AF #n indicating whether or not the start addresses A #n are valid from "invalid" to "valid" (step S301 in FIG. 3).

The descriptor 1110 has N sets of prepared areas for writing information such as the start addresses, while the order of writing to the areas is predetermined. For example, in the example of FIG. 2, the transfer management unit 116 writes the start addresses in the order of the first start address A #1, the second start address A #2, . . . , and the Nth start address A #N.

When it becomes possible to transfer the first reception packet again after all start addresses are written, starts addresses are written to the descriptor 1110 in order from the first start address A #1. Whether or not a start address A #n can be written may be determined, for example, such that it is determined that the start address A #n can be written if a valid flag AF #n corresponding to the start address A #n is "invalid". This operation is equivalent to that of the related art.

First, the DMA controller 1111 in the combination packet transfer unit 11 initializes a variable n indicating the order of reading and writing from and to the descriptor 1110 to 1 (step S400 in FIG. 4).

Then, when the packet combining unit 110 has issued a transfer request, the DMA controller 1111 checks an nth valid flag AF #n in the descriptor 1110 (step S401 in FIG. 4).

When the valid flag AF #n indicates that the nth start address A #n is "valid" (yes in step S402 of FIG. 4), the DMA controller 1111 checks information from the packet combining unit 110 (the number of packets combined and the size of each packet) and checks whether data to be transferred to the packet memory 101 is a single packet which has not been combined or a combination packet (step S403 in FIG. 4).

When the data to be transferred to the packet memory 101 is not a combination packet (when the number of packets combined is 1), the DMA controller 1111 reads the nth start address A #n confirmed as "valid" by the corresponding valid flag AF #n from the descriptor 1110 (step S404 in FIG. 4). Then, the DMA controller 1111 performs DMA transfer to write the corresponding nth packet into the area starting from the start address A #n of the packet memory 101 (step S405 in FIG. 4).

After completing this DMA transfer, the DMA controller 1111 writes a received data size L #n indicating the packet length of the nth packet to the descriptor 1110 and rewrites a reception completion flag WF #n set in the descriptor 1110 indicating that writing of the nth reception packet has been completed from "not completed" to "completed" (step S406 in FIG. 4).

The DMA controller 1111 determines whether or not the variable n is equal to N (step S407 in FIG. 4). When the variable n has not reached N (no in step S407), the DMA controller 1111 increments the variable n by 1 (step S408 in FIG. 4) and returns to step S401. When the variable n has reached N (yes in step S407), the DMA controller 1111 returns to step S400.

As described above, the descriptor 1110 has (a set of) N prepared areas of valid flags AF #1 to AF #N, while the order in which the valid flags AF #1 to AF #N are checked is predetermined. For example, in the examples of FIGS. 2 and 4, the DMA controller 1111 checks the valid flags in the order of the first valid flag AF #1, the second valid flag AF #2, . . . , and the Nth valid flag AF #N. After checking all valid flags, the DMA controller 1111 initializes the variable n to 1 (step S400) and checks again the valid flags in order from the first valid flag AF #1.

The descriptor 1110 also has N sets of prepared areas for writing the received data sizes L #1 to L #N and the reception completion flags WF #1 to WF #N. The DMA controller 1111 writes a reception data size L #n and a reception completion flag WF #n to areas of a number corresponding to an nth valid flag AF #n which has been confirmed as indicating that an nth start address A #n is "valid".

On the other hand, when the data to be transferred to the packet memory 101 is a combination packet (when the number k of reception packets combined is 2 or more), the DMA controller 1111 checks the number k of reception packets combined (step S409 in FIG. 5) and checks "k−1" valid flags AF #(n+1) to AF #(n+k−1) in the descriptor 1110 (step S410 in FIG. 5). Here, the reason for checking the "k−1" valid flags is that the nth valid flag AF #n has already been checked in step S402.

When n=N, the DMA controller 1111 checks the valid flags AF #1 to AF #(k−1). When n<N and n+k−1>N, the DMA controller 1111 checks the valid flags AF #(n+1) to AF #N and AF #1 to AF #(k−1−(N−n)).

When all k valid flags checked in the processing of steps S402 and S410 are "valid" (yes in step S410), the DMA controller 1111 reads an nth start address A #n corresponding to the first valid flag AF #n among the k checked valid flags from the descriptor 1110 (step S411 in FIG. 5). Then, the DMA controller 1111 performs DMA transfer to write tje corresponding packet into the area starting from the start address A #n of the packet memory 101 (step S412 in FIG. 5).

After completing this DMA transfer, the DMA controller 1111 writes to the descriptor 1110 received data sizes L #n to L #(n+k−1) indicating the packet lengths of reception packets constituting the combination packet DMA-transferred to the packet memory 101 based on information of which the packet combining unit 110 has notified (the size of each reception packet combined) (step S413 in FIG. 5).

When n=N, the DMA controller 1111 writes the received data sizes L #n and L #1 to L #(k−1) to the descriptor 1110. When n<N and n+k−1>N, the DMA controller 1111 writes the received data sizes L #n, L #(n+1) to L #N, and L #1 to L #(k−1−(N−n)) to the descriptor 1110.

Subsequently, the DMA controller 1111 rewrites "k−1" start addresses A #(n+1) to A #(n+k−1) in the descriptor 1110 according to the packet lengths of the first "k−1" reception packets among the k reception packets constituting the combination packet (step S414 in FIG. 5).

Specifically, the DMA controller 1111 rewrites the start address A #(n+1) to a value obtained by adding the start address A #n and the packet length of the first reception packet among the k reception packets constituting the combination packet (a value indicated by the received data size L #n). Further, the DMA controller 1111 rewrites the start address A #(n+k−1) to a value obtained by adding the start address A #(n+k−2) and the packet length of the "k−1" th reception packet among the k reception packets constituting the combination packet (a value indicated by the received data size L #(n+k−2)).

In this way, the DMA controller 1111 rewrites a start address A #1 to a value obtained by adding an immediately previous start address A #(i−1) and the packet length of an "i−1" th reception packet among the reception packets constituting the combination packet.

Next, the DMA controller 1111 rewrites reception completion flags WF #n to WF #(n+k−1) corresponding to the reception packets constituting the combination packet DMA-transferred to the packet memory 101 from "not completed" to "completed" (step S415 in FIG. 5).

When n=N, the DMA controller 1111 rewrites the reception completion flags WF #n and WF #1 to WF #(k−1) from "not completed" to "completed". When n<N and n+k−1>N, the DMA controller 1111 rewrites the reception completion flags WF #n, WF #(n+1) to WF #N, and WF #1 to WF #(k−1−(N−n)) to "completed".

Then, the DMA controller 1111 checks whether or not n+k>N is satisfied (step S416 in FIG. 5), and when n+k is larger than N, sets the variable n such that n=n+k−N (step S417 in FIG. 5) and returns to step S401. When n+k is N or less, the DMA controller 1111 sets the variable n such that n=n+k (step S418 in FIG. 5) and returns to step S401.

In the DMA transfer of the present embodiment, a combination packet into which k reception packets have been concatenated is collectively transferred to the packet memory 101 and information on start addresses in the descriptor 1110 is partially rewritten in the above manner, thereby notifying the processor of the packet processing apparatus (the reception processing unit 103 and the protocol processing unit 104a) of addresses where the beginnings of the reception packets have been written.

The reception processing unit 103 (software executed by the processor) periodically checks the reception completion flags WF #n (where n is 1 to N) of the descriptor 1110, and when a reception completion flag WF #n indicates "completed" (yes in step S501 in FIG. 6), reads an nth packet from the packet memory 101 based on information on a corresponding nth start address A #n and a corresponding received data size L #n and passes the read nth reception packet to the protocol processing unit 104a (step S502 in FIG. 6).

After necessary processing has been performed by the protocol processing unit 104a (yes in step S503 in FIG. 6), the reception processing unit 103 (software executed by the processor) rewrites an nth valid flag AF #n in the descriptor 1110 corresponding to the nth reception packet for which the protocol processing has been completed from "valid" to "invalid" and rewrites the nth reception completion flag WF #n in the descriptor 1110 from "completed" to "not completed" (step S504 in FIG. 6).

The descriptor 1110 has (a set of) N areas of reception completion flags WF #1 to WF #N, while the order in which the reception completion flags WF #1 to WF #N are checked is predetermined. For example, the reception processing unit 103 (software executed by the processor) checks the reception completion flags in the order of the first reception completion flag WF #1, the second reception completion flag WF #2, . . . , and the Nth reception completion flag WF #N. After checking all reception completion flags, the reception processing unit 103 checks again the reception completion flags in order from the first reception completion flag WF #1.

Instead of periodically checking the reception completion flags WF #n in the descriptor 1110, the DMA controller 1111 may issue an interrupt processing request to the processor after completion of a DMA transfer and the reception processing unit 103 (software executed by the processor) may check the reception completion flags WF #n (where n is 1 to N) of the descriptor 1110 in response to the interrupt processing request.

Figure 27:
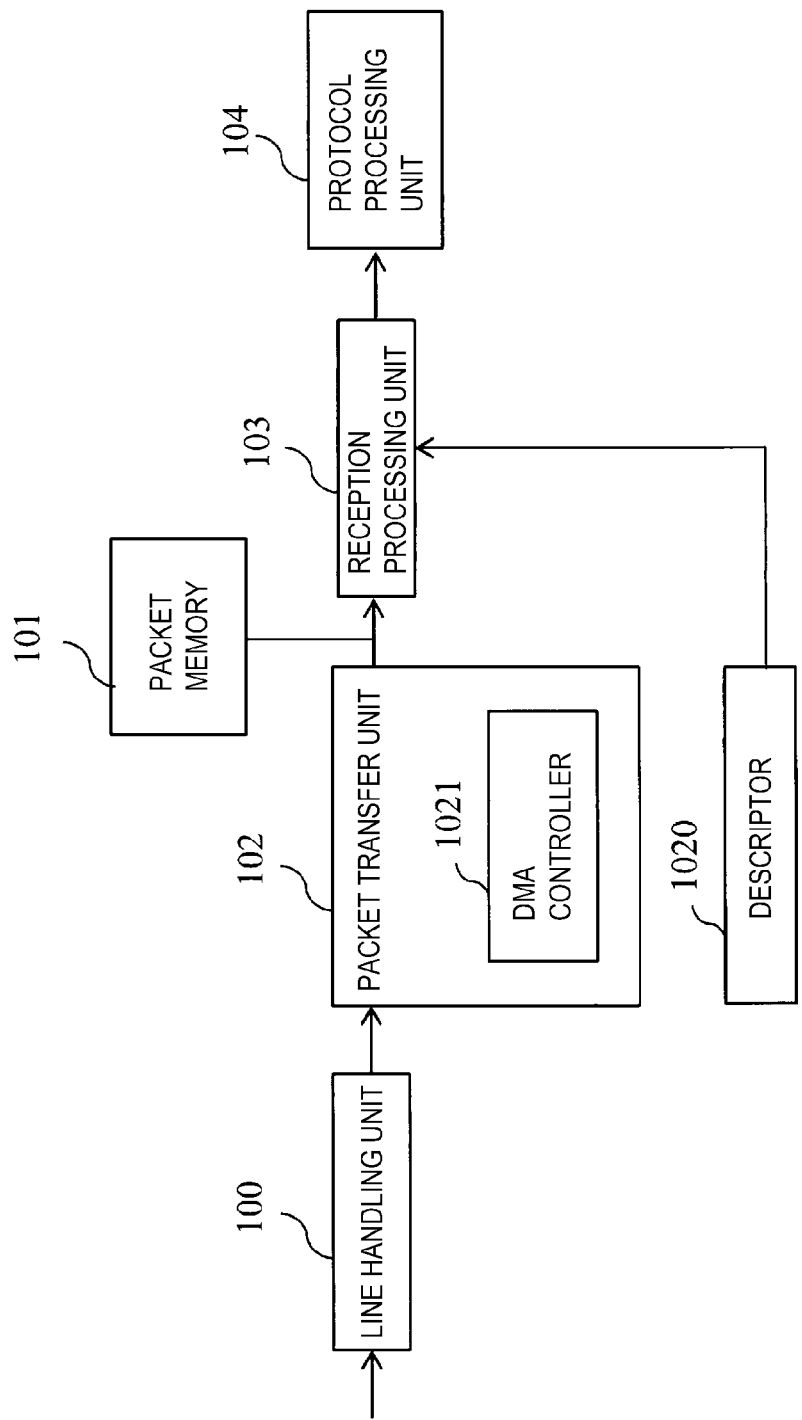
FIG. 27 is a block diagram illustrating a configuration of a packet processing apparatus of the related art.

The above operation of the processor (software) is equivalent to the operation of the processor (software) of the related art having the configuration of FIG. 27 and it is not necessary to realize the processing of restoring a plurality of original received packets from a combination packet by software for reception processing. That is, the reception processing unit 103 and the protocol processing unit 104a may perform the same processing as in the related art even when a combination packet is written to the packet memory 101 as in the present embodiment.

Figure 7:
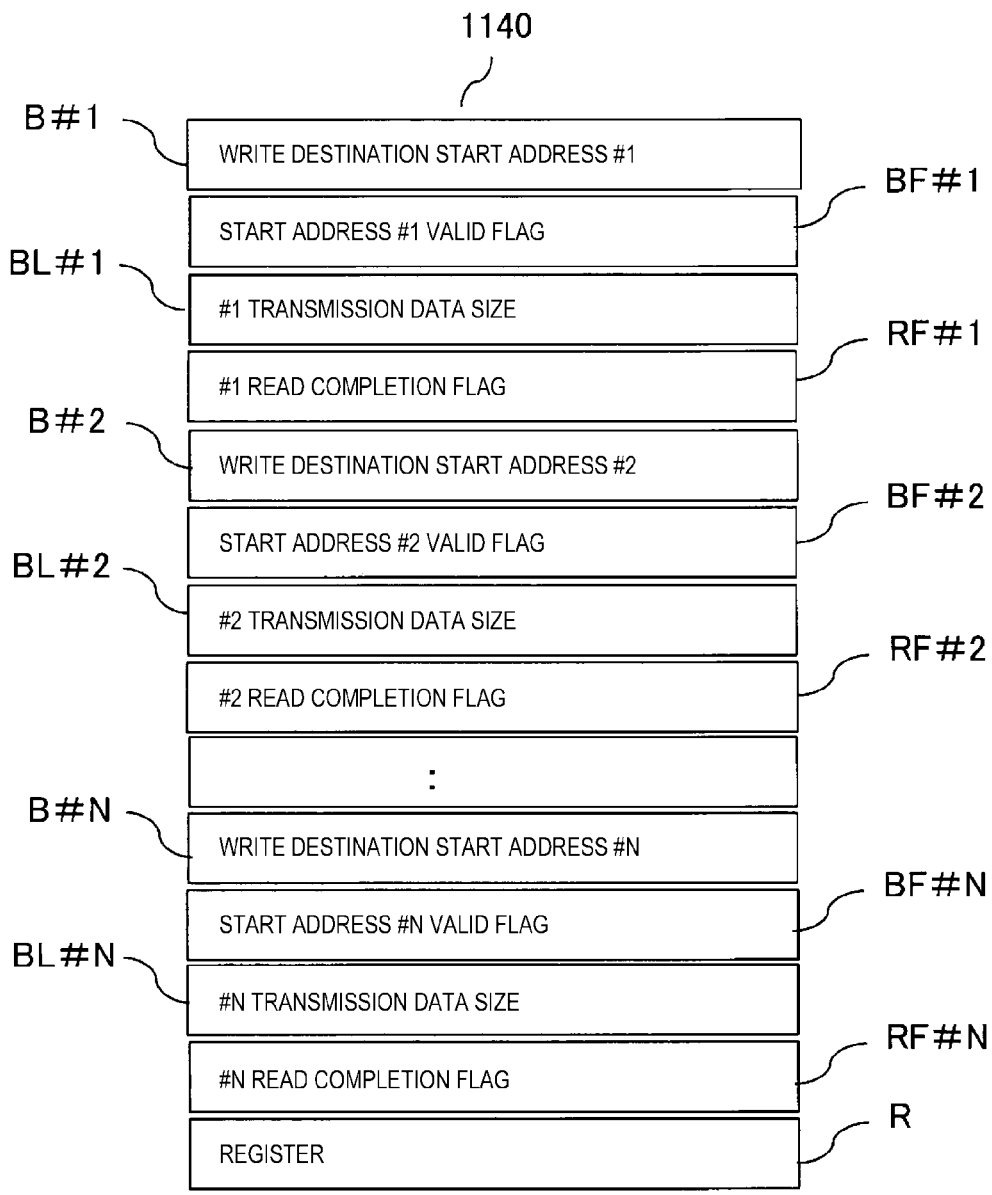
FIG. 7 is a diagram illustrating an outline of a descriptor for transmission in the packet processing apparatus according to the first embodiment of the present invention.

Next, the configuration and operation of the transmitting side will be described. FIG. 7 illustrates an exemplary configuration of the descriptor 1140 for transmission which is used by the transmission processing unit 112a and the like of the present embodiment. The descriptor 1140 of FIG. 7 is a data structure in which a plurality (N sets) of start addresses B #1 to B #N of the write destinations of transmission packets, valid flags BF #1 to BF #N indicating whether or not the start addresses B #1 to B #N are valid, transmission data sizes BL #1 to BL #N indicating the packet lengths of packets written to the start addresses B #1 to B #N, and read completion flags RF #1 to RF #N indicating whether or not reading of packets indicated by the start addresses B #1 to B #N from the packet memory 113 has been completed can be written. The descriptor 1140 further includes a register R where the number j of packets combined and the data size DS of the combination packet can be written.

The descriptor 1140 is actually arranged in a memory on a personal computer, a communication device, or a communication board, similar to the packet memories 101 and 113.

The descriptor 1140 can be arranged in the same memory as the packet memory 101 or 113, in which case the purpose can be distinguished by the address in the memory.

This configuration of the descriptor 1140 of FIG. 7 is equivalent to the configuration of the descriptor for transmission processing which is generally used in a configuration (of FIG. 8) which is the configuration of FIG. 27 with the processing for transmission added. Thus, an exemplary operation of the DMA transfer for transmission of the related art using the descriptor 1140 having the configuration of FIG. 7 will be described with reference to FIGS. 7 and 9 to 11.

Figure 8:
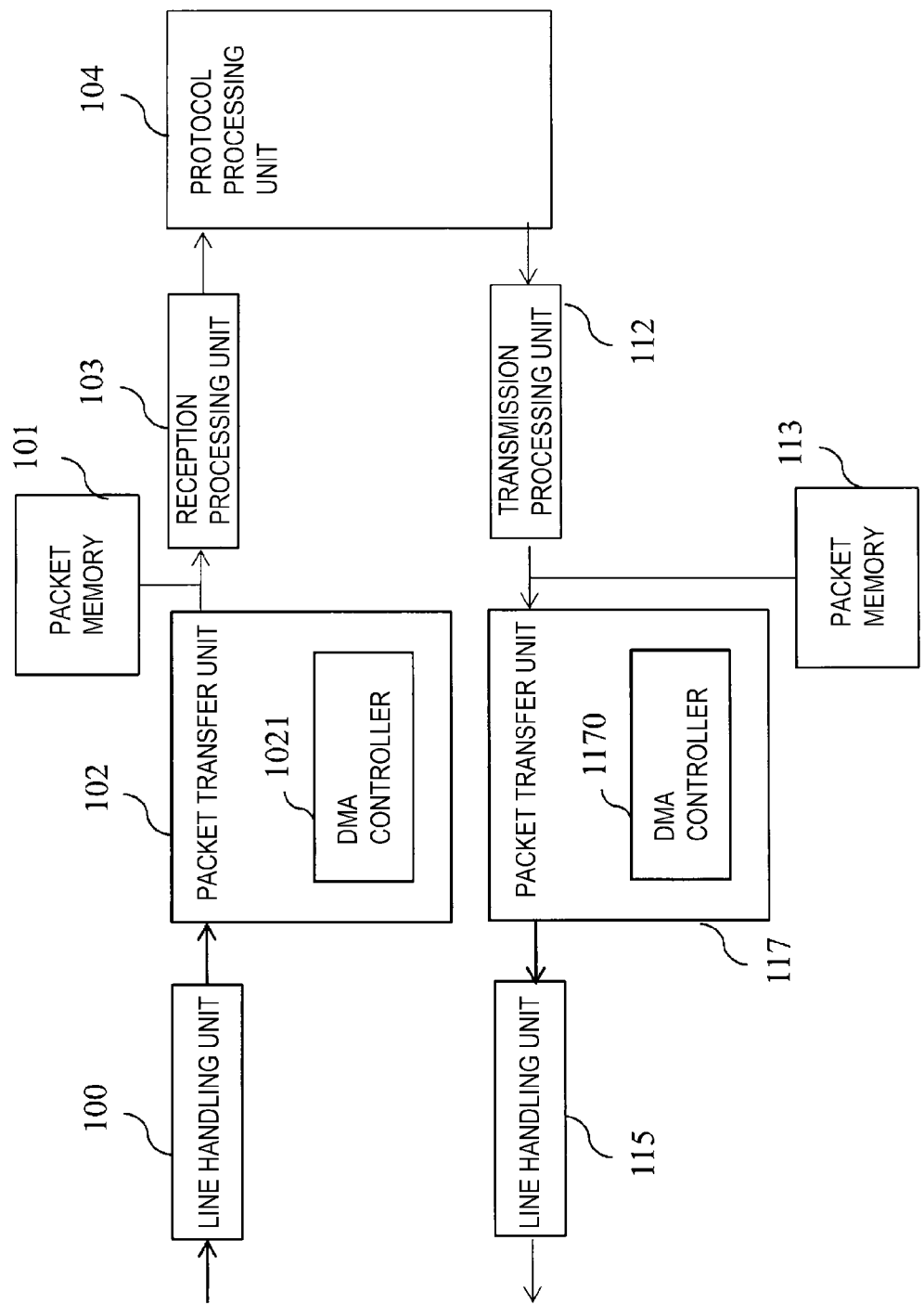
FIG. 8 is a block diagram illustrating a configuration of a packet processing apparatus of the related art.
Figure 9:
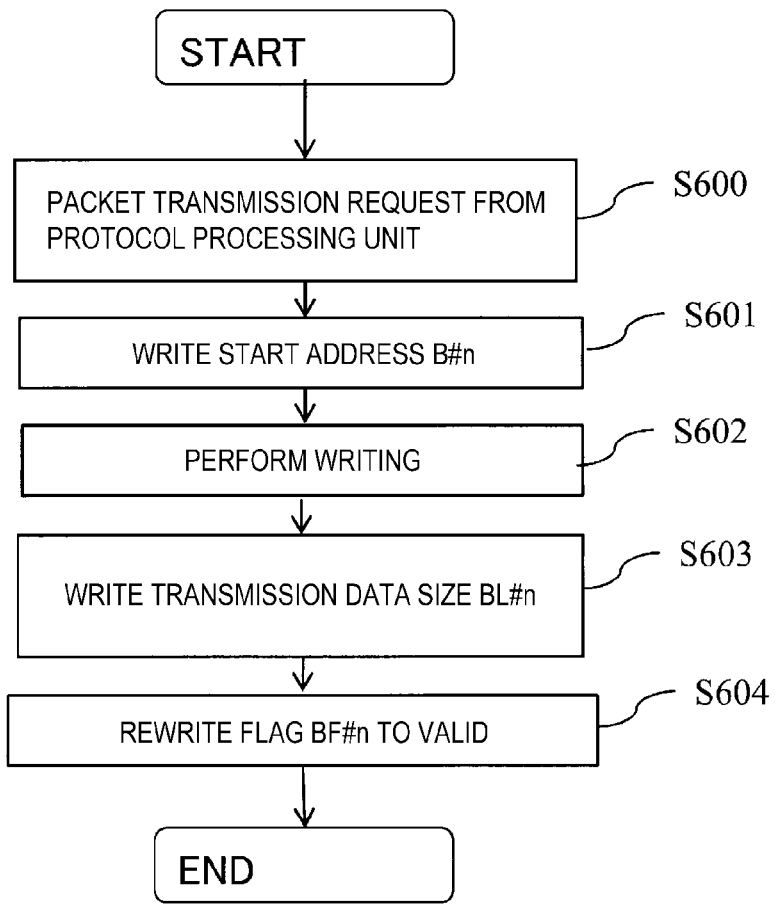
FIG. 9 is a flowchart illustrating an operation of a transmission processing unit in the packet processing apparatus of FIG. 8.

Upon confirming a packet transmission request from the protocol processing unit 104 (step S600 in FIG. 9), the transmission processing unit 112 of FIG. 8 determines a start address B #n (where n is 1 to N) of the write destination of a packet and writes the start address B #n to the descriptor 1140 (step S601 in FIG. 9). The transmission processing unit 112 writes an nth packet received from the protocol processing unit 104 to an area starting from the start address B #n in the packet memory 113 (step S602 of FIG. 9).

The transmission processing unit 112 writes a transmission data size BL #n indicating the packet length of the nth packet written to the packet memory 113 to the descriptor 1140 (step S603 in FIG. 9). Further, the transmission processing unit 112a rewrites a valid flag BF #n (which is initially "invalid") set in the descriptor 1140, which indicates whether or not the start address B #n is valid, from "invalid" to "valid" (step S604 in FIG. 9).

The descriptor 1140 has N sets of areas for writing information such as the start addresses, while the order of writing to the areas is predetermined. For example, in the example of FIG. 7, the transmission processing unit 112 writes the start addresses in the order of the first start address B #1, the second start address B #2, . . . , and the Nth start address B #N.

When it becomes possible to write the first packet again after all start addresses are written, starts addresses are written to the descriptor 1140 in order from the first start address B #1. Whether or not a start address B #n (where n is 1 to N) can be written may be determined, for example, such that it is determined that the start address B #n can be written if a valid flag BF #n corresponding to the start address B #n is "invalid".

Figure 10:
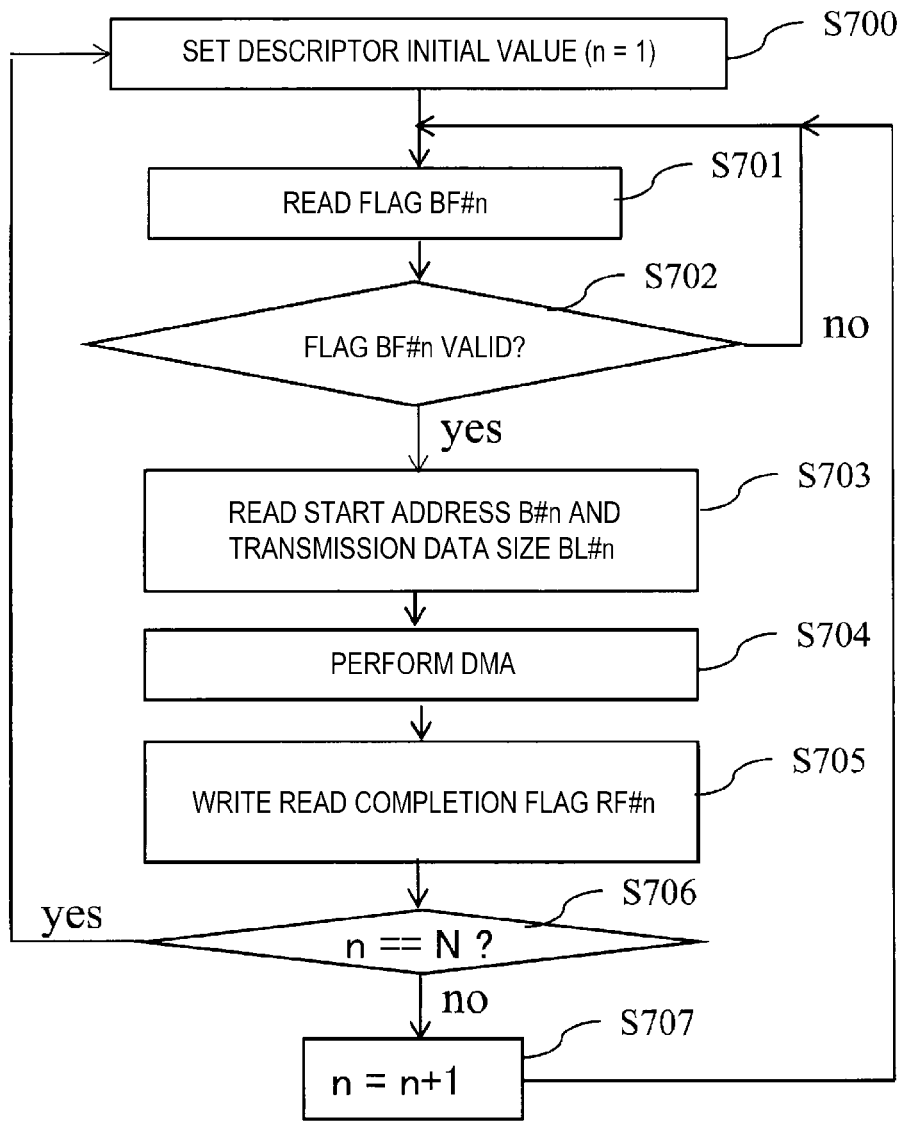
FIG. 10 is a flowchart illustrating an operation of a DMA controller for transmission in the packet processing apparatus of FIG. 8.

The DMA controller 1170 in the packet transfer unit 117 for transmission in FIG. 8 first initializes a variable n indicating the order of reading and writing from and to the descriptor 1140 to 1 (step S700 in FIG. 10) and reads an nth (=1st) flag BF #1 from the descriptor 1140 (step S701 in FIG. 10).

When the flag BF #1 indicates that the start address is valid (yes in step S702 in FIG. 10), the DMA controller 1170 reads an nth (=1st) start address B #1 and a transmission data size BL #1 from the descriptor 1140 (step S703 of FIG. 10). Then, the DMA controller 1170 performs a DMA transfer to transfer an nth (=1st) packet having a length indicated by the transmission data size BL #1 from an area starting from the start address B #1 in the packet memory 113 to the line handling unit 115*a* (step S704 in FIG. 10).

After completing the DMA transfer, the DMA controller 1170 rewrites a read completion flag RF #n set in the descriptor 1140, which indicates that reading of the nth (=1st) packet has been completed, from "not completed" to "completed" (step S705 in FIG. 10).

The DMA controller 1170 determines whether or not the variable n is equal to N (step S706 in FIG. 10). When the variable n has not reached N (no in step S706), the DMA controller 1170 increments the variable n by 1 (step S707 in FIG. 10) and returns to step S701. When the variable n has reached N (yes in step S706), the DMA controller 1170 returns to step S700.

As described above, the descriptor 1140 has (a set of) N areas of valid flags BF #1 to BF #N, while the order in which the valid flags BF #1 to BF #N are checked is predetermined. For example, in the examples of FIGS. 7 and 29, the DMA controller 1170 checks the valid flags in the order of the first valid flag BF #1, the second valid flag BF #2, . . . , and the Nth valid flag BF #N. After checking all valid flags, the DMA controller 1170 checks the valid flags again in order from the first valid flag BF #1.

The descriptor 1140 also has a set of N prepared areas for writing the read completion flags RF #1 to RF #N. The DMA controller 1140 writes a read completion flag RF #n to an area of a number corresponding to an nth valid flag BF #n which has been confirmed as indicating that an nth start address B #n is "valid".

Figure 11:
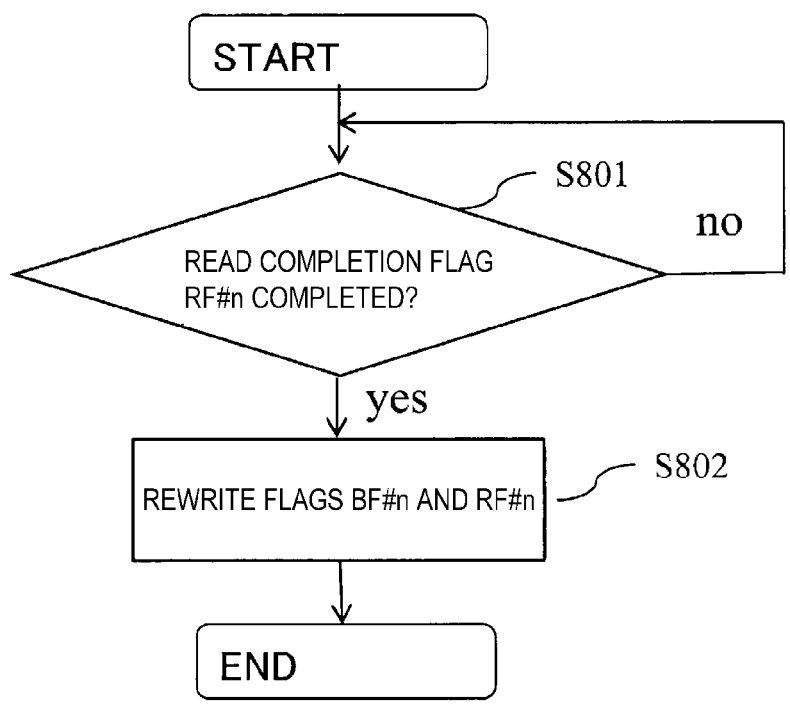
FIG. 11 is a flowchart illustrating an operation of the transmission processing unit in the packet processing apparatus of FIG. 8.

The transmission processing unit 112 periodically checks the read completion flags RF #n (where n is 1 to N) in the descriptor 1140, and when a read completion flag RF #n indicates "completed" (yes in step S801 in FIG. 11), rewrites a valid flag BF #n in the descriptor 1140 corresponding to the nth read completion flag RF #n from "valid" to "invalid" and rewrites the nth read completion flag RF #n in the descriptor 1140 from "completed" to "not completed" (step S802 in FIG. 11).

The descriptor 1140 has the (set of) N areas of read completion flags RF #1 to RF #N, while the order in which the read completion flags RF #1 to RF #N are checked is predetermined. For example, the transmission processing unit 112 checks the read completion flags in the order of the first read completion flag RF #1, the second read completion flag RF #2, . . . , and the Nth read completion flag RF #N. After checking all read completion flags, the transmission processing unit 112 checks the read completion flags again in order from the first read completion flag RF #1.

Instead of periodically checking the read completion flags RF #n in the descriptor 1140, the DMA controller 1170 may issue an interrupt processing request to the processor after completion of a DMA transfer and the transmission processing unit 112 may check the read completion flags RF #n (where n is 1 to N) of the descriptor 1140 in response to the interrupt processing request.

While it is possible to increase the speed of packet transmission by installing a DMA function on the transmitting side, the packet processing apparatus illustrated in FIG. 8 has a problem that the transmission performance deteriorates when there are many packets having short packet lengths because transmission is performed for each packet in the DMA transfer of the related art.

Figure 12:
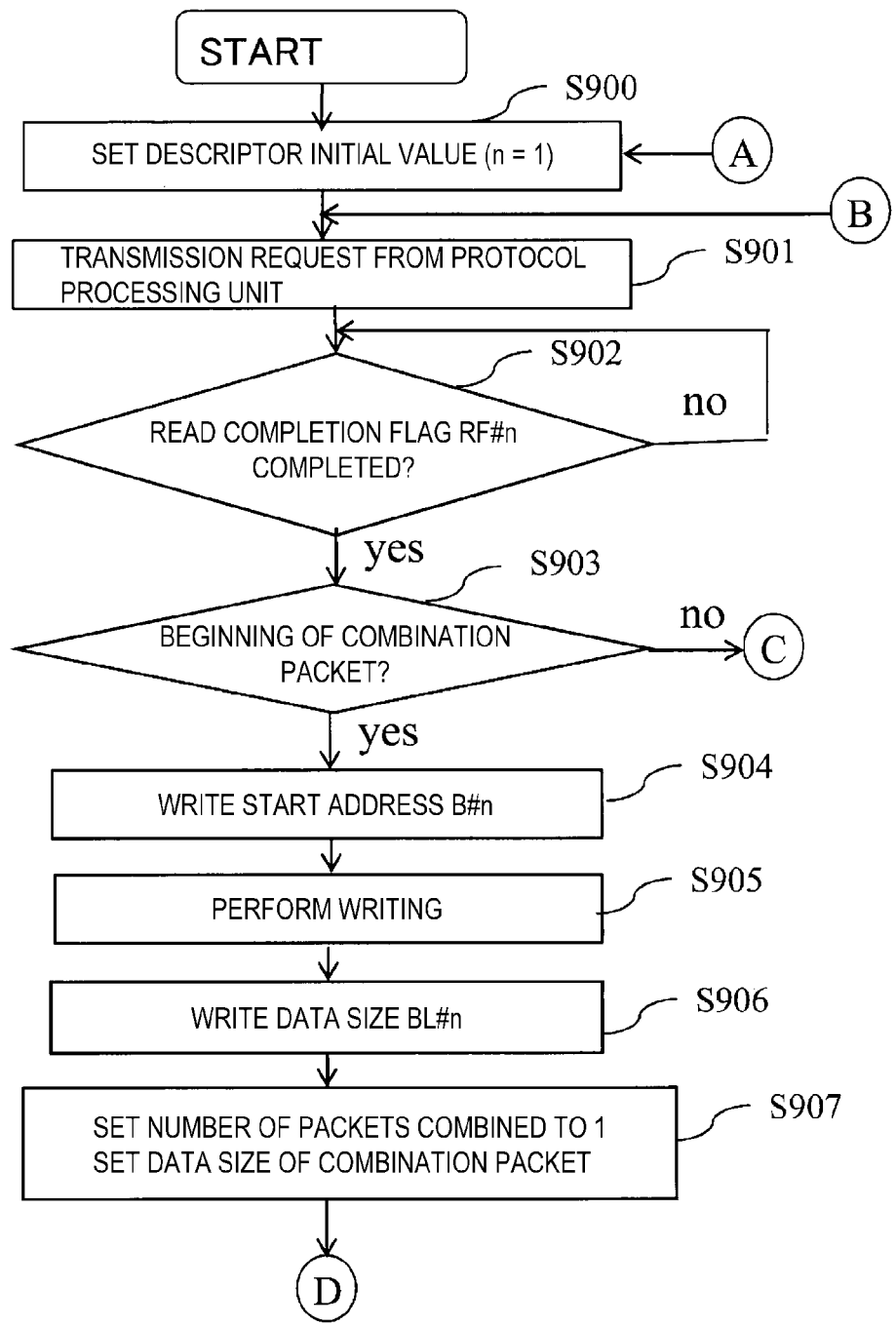
FIG. 12 is a flowchart illustrating an operation of a transmission processing unit in the packet processing apparatus according to the first embodiment of the present invention.
Figure 13:
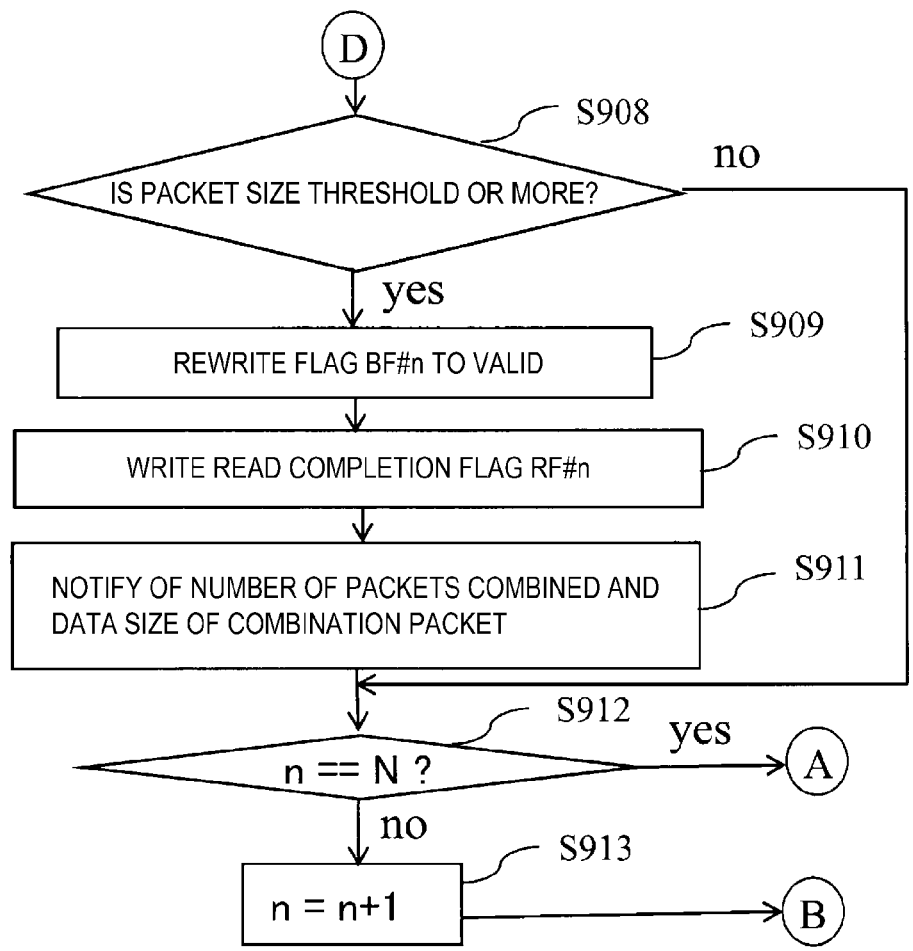
FIG. 13 is a flowchart illustrating an operation of the transmission processing unit in the packet processing apparatus according to the first embodiment of the present invention.
Figure 14:
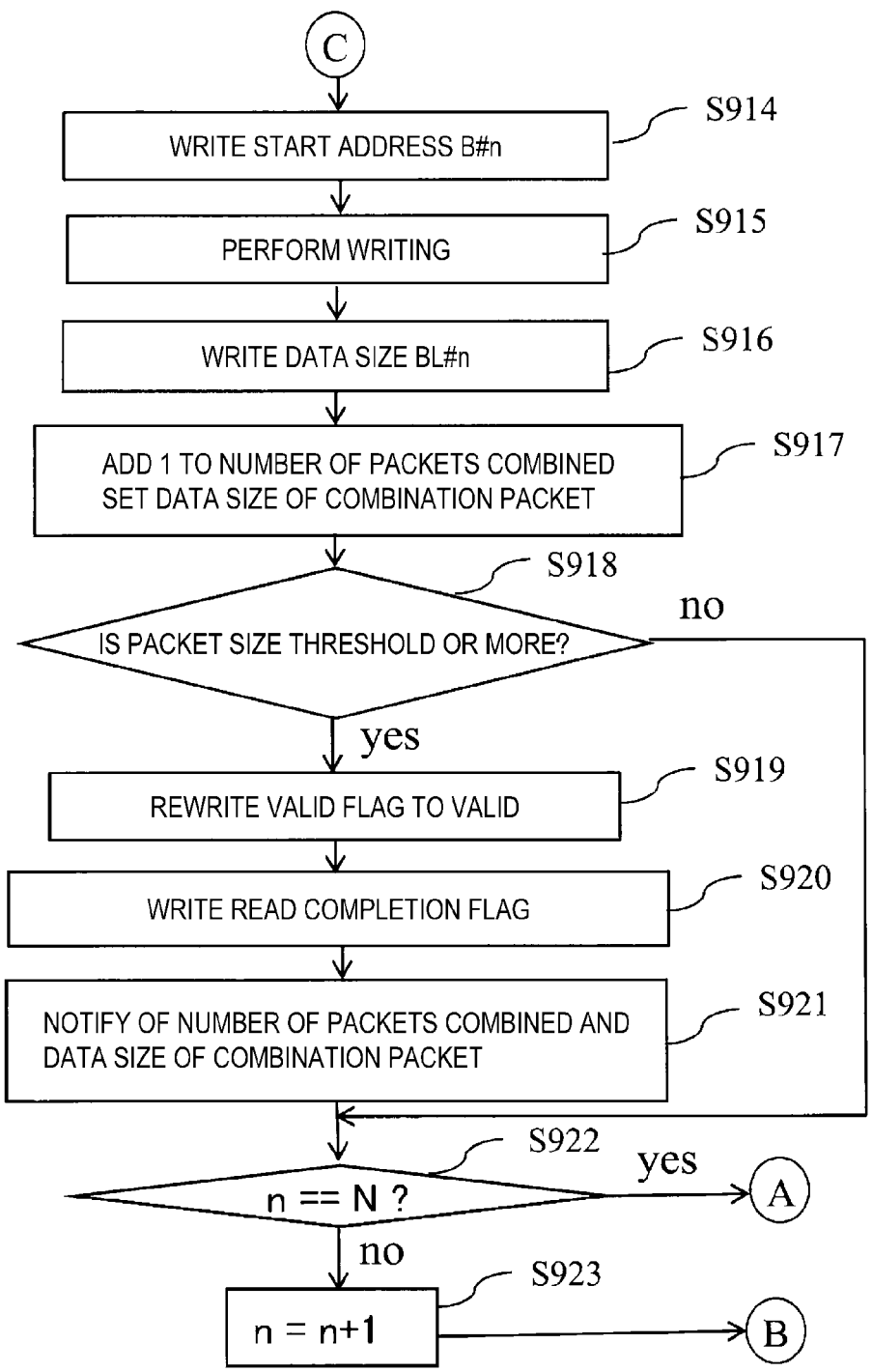
FIG. 14 is a flowchart illustrating an operation of the transmission processing unit in the packet processing apparatus according to the first embodiment of the present invention.
Figure 15:
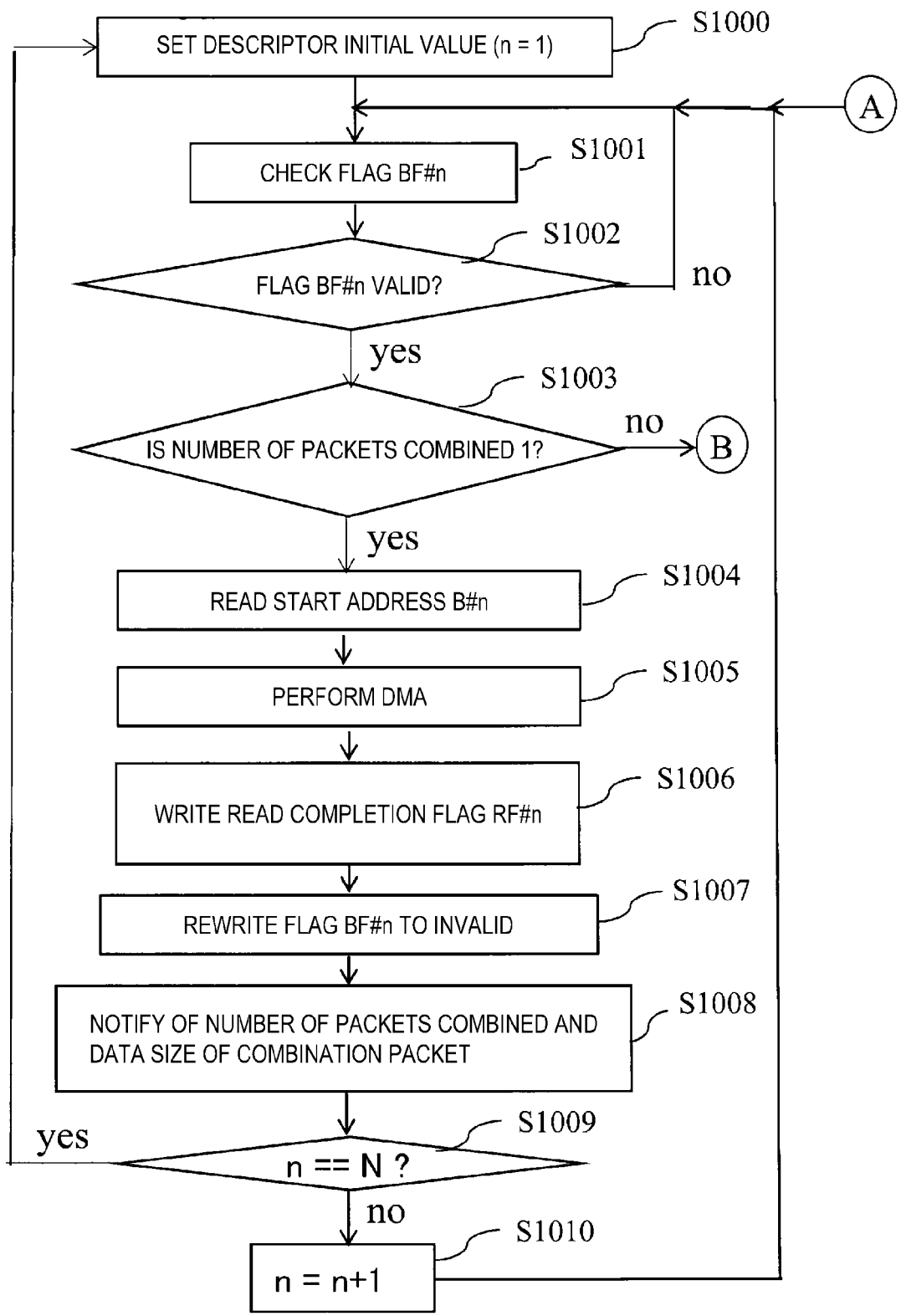
FIG. 15 is a flowchart illustrating an operation of a DMA controller for transmission in the packet processing apparatus according to the first embodiment of the present invention.
Figure 16:
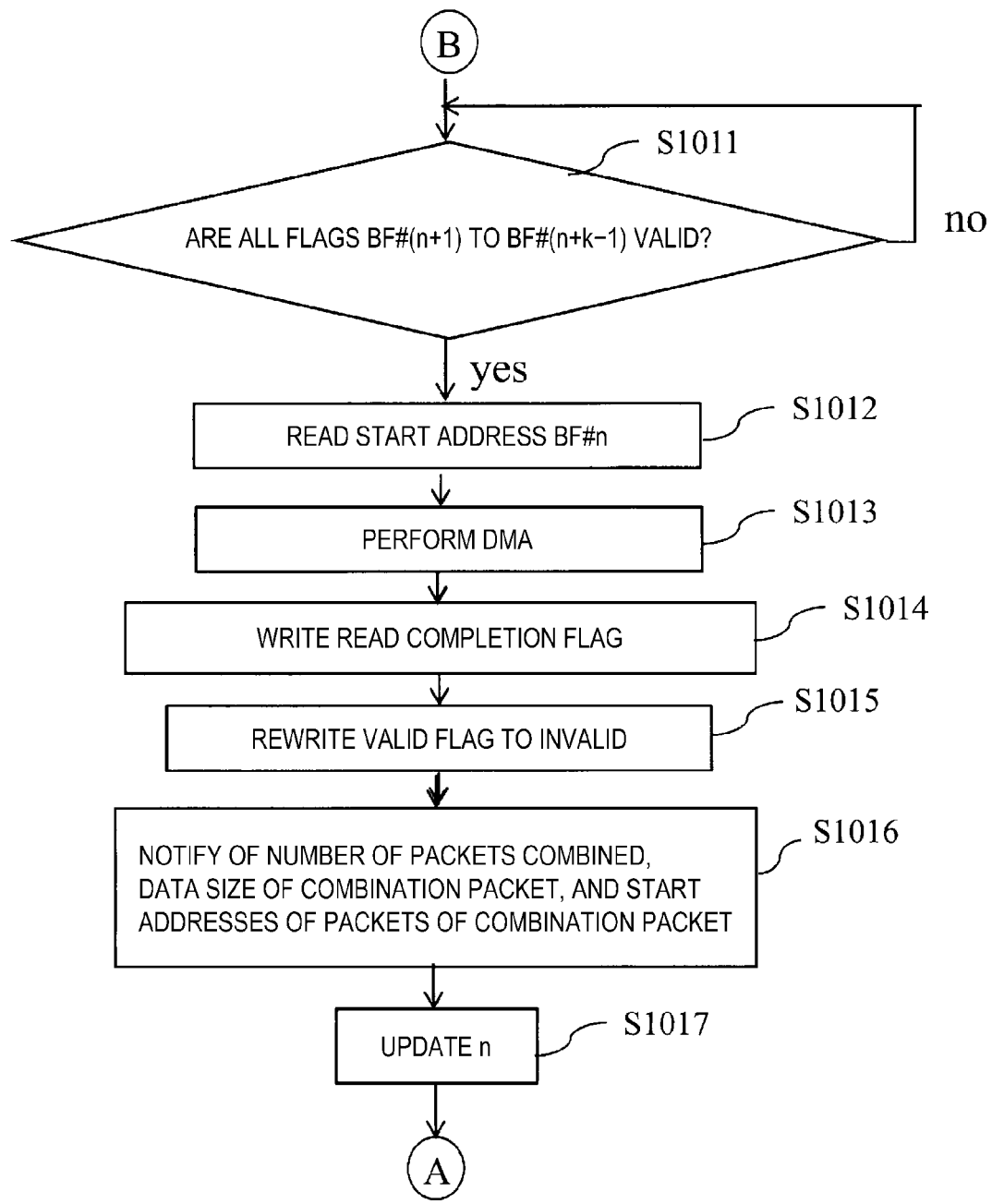
FIG. 16 is a flowchart illustrating an operation of the DMA controller for transmission in the packet processing apparatus according to the first embodiment of the present invention.
Figure 17:
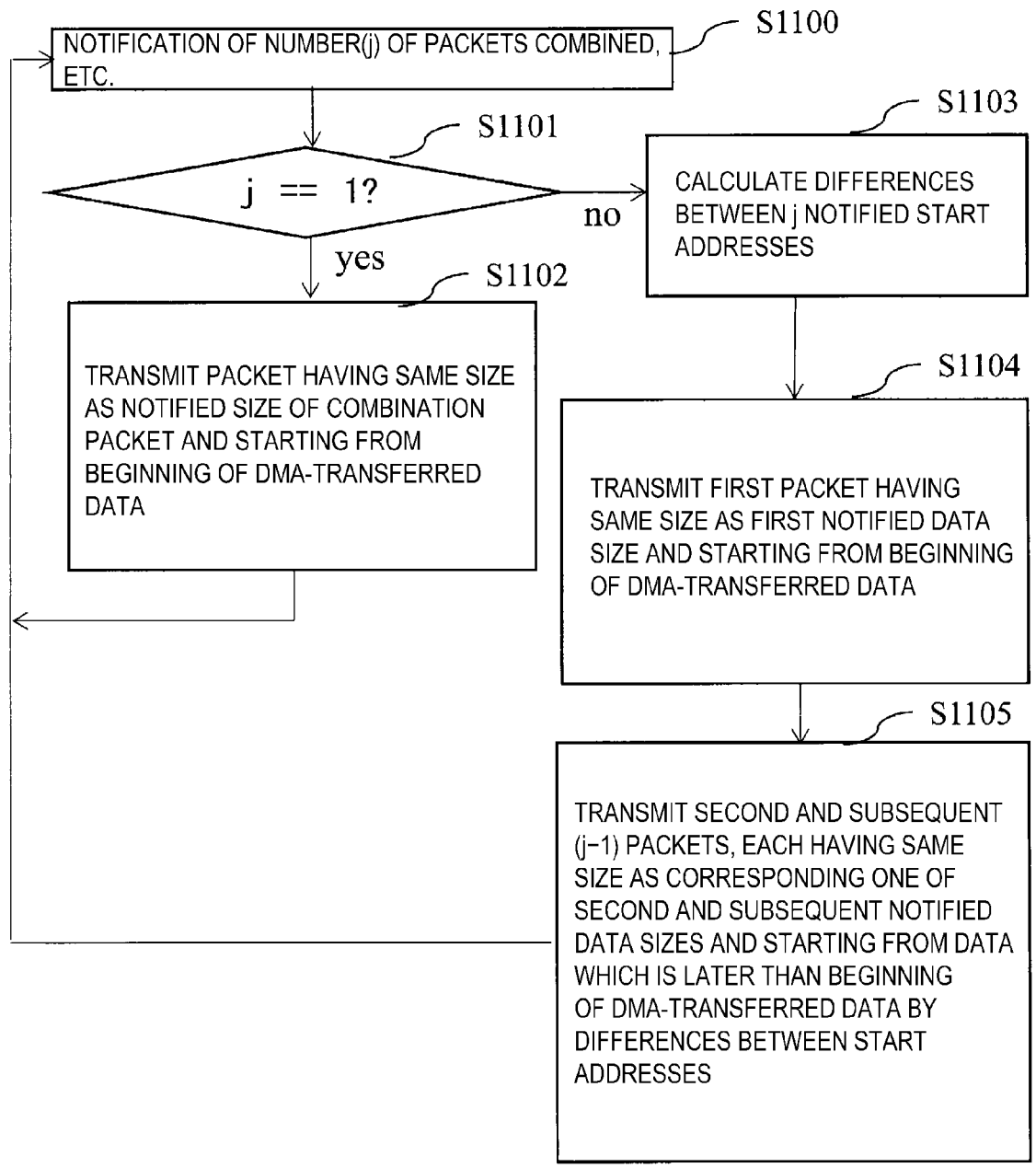
FIG. 17 is a flowchart illustrating an operation of a line handling unit for transmission in the packet processing apparatus according to the first embodiment of the present invention.

Next, an exemplary operation of the present embodiment using the descriptor 1140 having the configuration of FIG. 7 will be described with reference to FIGS. 12 to 17. FIGS. 12 to 14 are flowcharts illustrating operations of the transmission processing unit 112*a*, FIGS. 15 and 16 are flowcharts illustrating operations of the DMA controller 1141, and FIG. 17 is a flowchart illustrating an operation of the line handling unit 115*a*.

The transmission processing unit 112*a* of the present embodiment first initializes a variable n indicating the order of reading and writing from and to the descriptor 1140 to 1 (step S900 in FIG. 12). The variable n in FIGS. 12 to 14 is a variable that the transmission processing unit 112*a* independently counts and is different from the variable n that the DMA controller 1111 in the combination packet transfer unit 11 independently counts.

Upon confirming a packet transmission request from the protocol processing unit 104*a* (step S901 in FIG. 12), the transmission processing unit 112*a* checks a read completion flag RF #n in the descriptor 1140, and when the read completion flag RF #n indicates "completed" (yes in step S902 of FIG. 12), checks whether or not an nth packet corresponding to the read completion flag RF #n is the beginning of a combination packet into which a plurality of packets have been combined (step S903 of FIG. 12).

Specifically, for example, the transmission processing unit 112*a* determines that the nth packet is not the beginning of a combination packet when the data size DS of a combination packet at the time of an immediately preceding packet transmission request is larger than 0 and smaller than a predetermined threshold TH and determines that the nth packet is the beginning of a combination packet when the data size DS of the combination packet is 0 (which is an initial value) or the threshold TH or more.

When the nth packet corresponding to the read completion flag RF #n is the beginning of a combination packet (yes in step S903), the transmission processing unit 112*a* determines a start address B #n of the write destination of this packet and writes the determined start address B #n to the descriptor 1140 (step S904 in FIG. 12). Then, the transmission processing unit 112*a* writes the nth packet received from the protocol processing unit 104*a* to an area starting from the start address B #n in the packet memory 113 (step S905 in FIG. 12).

The transmission processing unit 112*a* writes a transmission data size BL #n indicating the packet length of the nth packet written to the packet memory 113 to the descriptor 1140 (step S906 in FIG. 12). Further, the transmission processing unit 112*a* sets the number j=1 of packets combined in the register R of the descriptor 1140 and sets the packet length of the nth packet written to the packet memory 113 in the register R in the descriptor 1140 as the data size DS of the combination packet (step S907 in FIG. 12).

As described above, the descriptor 1140 has (a set of) N areas of read completion flags RF #1 to RF #N, while the order in which the read completion flags RF #1 to RF #N are checked is predetermined. For example, the transmission processing unit 112a checks the read completion flags in the order of the first read completion flag RF #1, the second read completion flag RF #2, . . . , and the Nth read completion flag RF #N. After checking all read completion flags, the transmission processing unit 112a checks the read completion flags again in order from the first read completion flag RF #1.

Next, the transmission processing unit 112a determines whether or not the data size DS of the combination packet set in the register R of the descriptor 1140 is the predetermined threshold TH or more (step S908 in FIG. 13). When the data size DS of the combination packet is the threshold TH or more (yes in step S908), the transmission processing unit 112a rewrites a valid flag BF #n of the nth packet set in the descriptor 1140 (which is initially "invalid") from "invalid" to "valid" in order to allow transfer of the nth packet written to the packet memory 113 (step S909 in FIG. 13).

Subsequently, the transmission processing unit 112a rewrites the read completion flag RF #n of the nth packet set in the descriptor 1140 from "completed" to "not completed" (step S910 in FIG. 13). Further, the transmission processing unit 112a notifies the combination packet transfer unit 114 of the number j of packets combined and the data size DS of the combination packet (step S911 in FIG. 13). Specifically, the transmission processing unit 112a records the number j of packets combined and the data size DS of the combination packet in a FIFO or the like. For each of a plurality of combination packets, the number j of packets combined and the data size DS of the combination packet may be recorded in a FIFO or the like.

The transmission processing unit 112a determines whether or not the variable n is equal to N (step S912 in FIG. 13). When the variable n has not reached N (no in step S912), the transmission processing unit 112a increments the variable n by 1 (step S913 in FIG. 13), returns to step S901, and awaits the next packet transmission request from the protocol processing unit 104a. When the variable n has reached N (yes in step S912), the transmission processing unit 112a returns to step S900, initializes the variable n to 1, and awaits the next packet transmission request from the protocol processing unit 104a.

When the data size DS of the combination packet set in the register R of the descriptor 1140 is less than the threshold TH (no in step S908), the transmission processing unit 112a proceeds to step S912 without performing the processing of steps S909 to S911 in order not to allow transfer of the nth packet written to the packet memory 113, and awaits the next packet transmission request from the protocol processing unit 104a.

When the nth packet is not the beginning of a combination packet (no in step S903), the transmission processing unit 112a determines a value not less than a value obtained by adding the data size of an (n−1)th packet written immediately before to a start address B #(n−1) of the write destination of the (n−1)th packet written immediately before as a start address B #n of the write destination of the nth packet and writes the determined start address B #n to the descriptor 1140 (step S914 in FIG. 14). The transmission processing unit 112a writes the nth packet received from the protocol processing unit 104a to an area starting from the start address B #n in the packet memory 113 (step S915 of FIG. 14).

The transmission processing unit 112a writes a transmission data size BL #n indicating the packet length of the nth packet written to the packet memory 113 to the descriptor 1140 (step S916 in FIG. 14). Further, the transmission processing unit 112a increments the number j of packets combined set in the register R of the descriptor 1140 by 1. Further, the transmission processing unit 112a sets a value obtained by adding 1 to a value obtained by subtracting the start address of the write destination of the combination packet (the start address of the write destination of the beginning packet of the combination packet) from a value obtained by adding the transmission data size of the nth packet to the start address B #n of the write destination of the nth packet in the register R of the descriptor 1140 as the data size DS of the combination packet (step S917 in FIG. 14).

The subsequent operation differs depending on whether or not the data size DS of the combination packet set here is the threshold TH or more. The transmission processing unit 112a determines whether or not the data size DS of the combination packet set in the register R of the descriptor 1140 is the predetermined threshold TH or more (step S918 in FIG. 14). When the data size DS of the combination packet is the threshold TH or more (yes in step S918), the transmission processing unit 112a rewrites valid flags of packets constituting the combination packet (valid flags from a valid flag of the beginning packet of the combination packet to a valid flag of the nth packet) set in the descriptor 1140 from "invalid" to "valid" in order to allow collective transfer of the packets corresponding to the combination packet written to the packet memory 113 (step S919 in FIG. 14).

Subsequently, the transmission processing unit 112a rewrites read completion flags of the packets constituting the combination packet (read completion flags from a read completion flag of the beginning packet of the combination packet to a read completion flag of the nth packet) set in the descriptor 1140 from "completed" to "not completed" (step S920 in FIG. 14). Further, the transmission processing unit 112a notifies the combination packet transfer unit 114 of the number j of packets combined (the number of packets from the beginning packet of the combination packet to the nth packet) and the data size DS of the combination packet (step S921 in FIG. 14). As described above, the transmission processing unit 112a records the number j of packets combined and the data size DS of the combination packet in the FIFO or the like. For each of a plurality of combination packets, the number j of packets combined and the data size DS of the combination packet may be recorded in a FIFO or the like.

The transmission processing unit 112a determines whether or not the variable n is equal to N (step S922 in FIG. 14). When the variable n has not reached N (no in step S922), the transmission processing unit 112a increments the variable n by 1 (step S923 in FIG. 14), returns to step S901, and awaits the next packet transmission request from the protocol processing unit 104a. When the variable n has reached N (yes in step S922), the transmission processing unit 112a returns to step S900, initializes the variable n to 1, and awaits the next packet transmission request from the protocol processing unit 104a.

When the data size DS of the combination packet set in the register R of the descriptor 1140 is less than the threshold TH (no in step S918), the transmission processing unit 112a proceeds to step S922 without performing the processing of steps S919 to S921 in order not to allow transfer of the combination packet, and awaits the next packet transmission request from the protocol processing unit 104a.

Next, the DMA controller 1141 in the combination packet transfer unit 114 initializes the variable n indicating the order of reading and writing from and to the descriptor 1140 to 1 (step S1000 in FIG. 15). The variable n in FIGS. 15 and 16 is a variable that the DMA controller 1141 in the combination packet transfer unit 114 independently counts and is different from the variable n that the DMA controller 1111 in the combination packet transfer unit 111 independently counts and the variable n that the transmission processing unit 112a independently counts.

The DMA controller 1141 checks an nth valid flag BF #n in the descriptor 1140 (step S1001 in FIG. 15). When the valid flag BF #n indicates that an nth start address B #n is "valid" (yes in step S1002 of FIG. 15), the DMA controller 1141 reads information (the number j of packets combined and the data size DS of the combination packet) provided from the transmission processing unit 112a from the FIFO or the like and checks whether or not the number j of packets combined is 1 (step S1003 in FIG. 15).

When the number j of packets combined is 1 (yes in step S1003), the DMA controller 1141 reads the nth start address B #n confirmed as "valid" by the corresponding valid flag BF #n from the descriptor 1140 (step S1004 in FIG. 15). Then, the DMA controller 1141 performs a DMA transfer to transfer an nth packet having a length indicated by the data size DS of the combination packet (information provided from the transmission processing unit 112a) from an area starting from the start address B #n in the packet memory 113 to the line handling unit 115a (step S1005 in FIG. 15).

After completing the DMA transfer, the DMA controller 1141 rewrites a read completion flag RF #n set in the descriptor 1140, which indicates that reading of the nth packet has been completed, from "not completed" to "completed" (step S1006 in FIG. 15). Then, the DMA controller 1141 rewrites the valid flag BF #n of the nth packet set in the descriptor 1140 from "valid" to "invalid" (step S1007 in FIG. 15).

As described above, the descriptor 1140 has (a set of) N areas of valid flags BF #1 to BF #N, while the order in which the valid flags BF #1 to BF #N are checked is predetermined. For example, in the examples of FIGS. 7 and 15, the DMA controller 1141 checks the valid flags in the order of the first valid flag BF #1, the second valid flag BF #2, . . . , and the Nth valid flag BF #N. After checking all valid flags, the DMA controller 1141 checks the valid flags again in order from the first valid flag BF #1.

The descriptor 1140 also has a set of N prepared areas for writing the read completion flags RF #1 to RF #N. The DMA controller 1141 writes a read completion flag RF #n to an area of a number corresponding to an nth valid flag BF #n which has been confirmed as indicating that an nth start address B #n is "valid".

The DMA controller 1141 also notifies the line handling unit 115a of information provided from the transmission processing unit 112a (the number j of packets combined ("1" in this case) and the data size DS of the combination packet) (step S1008 in FIG. 15). Specifically, the DMA controller 1141 records the number j of packets combined and the data size DS of the combination packet in the FIFO or the like.

The DMA controller 1141 determines whether or not the variable n is equal to N (step S1009 in FIG. 15). When the variable n has not reached N (no in step S1009), the DMA controller 1141 increments the variable n by 1 (step S1010 in FIG. 15) and returns to step S1001. When the variable n has reached N (yes in step S1009), the DMA controller 1141 returns to step S1000.

When the number j of packets combined is other than 1 (no in step S1003), the DMA controller 1141 checks "j−1" valid flags BF #(n+1) to BF #(n+j−1) in the descriptor 1140 (step S1011 in FIG. 16). Here, the reason for checking the "j−1" valid flags is that the nth valid flag BF #n has already been checked in step S1002.

When n=N, the DMA controller 1141 checks the valid flags BF #N and BF #1 to BF #(j−1). When n<N and n+j−1>N, the DMA controller 1141 checks the valid flags BF #(n+1) to BF #N and BF #1 to BF #(j−1−(N−n)).

When all j valid flags checked in the processing of steps S1002 and S1011 are "valid" (yes in step S1011), the DMA controller 1141 reads an nth start address B #n corresponding to the first valid flag BF #n among the j checked valid flags from the descriptor 1140 (step S1012 in FIG. 16). Then, the DMA controller 1141 performs a DMA transfer to transfer a combination packet having a length indicated by the data size DS of the combination packet (information provided from the transmission processing unit 112a) from an area starting from the start address B #n in the packet memory 113 to the line handling unit 115a (step S1013 in FIG. 16).

After completing the DMA transfer, the DMA controller 1141 rewrites read completion flags of the packets constituting the combination packet (read completion flags from a read completion flag of the beginning packet of the combination packet (the nth packet) to a read completion flag of the (n+j−1)th packet) set in the descriptor 1140 from "not completed" to "completed" (step S1014 in FIG. 16). Then, the DMA controller 1141 rewrites valid flags of packets constituting the combination packet (valid flags from a valid flag of the beginning packet of the combination packet (the nth packet) to a valid flag of the (n+j−1)th packet) set in the descriptor 1140 from "valid" to "invalid" (step S1015 in FIG. 16).

When n=N, the DMA controller 1141 rewrites read completion flags RF #N and RF #1 to RF #(j−1) and valid flags BF #N and BF #1 to BF #(j−1). When n<N and n+j−1>N, the DMA controller 1141 rewrites read completion flags RF #n, RF #(n+1) to RF #N, and RF #1 to RF #(j−1−(N−n)) and valid flags BF #n, BF #(n+1) to BF #N, and BF #1 to BF #(j−1−(N−n)).

As described above, the descriptor 1140 has (a set of) N areas of valid flags BF #1 to BF #N, while the order in which the valid flags BF #1 to BF #N are checked is predetermined. For example, in the examples of FIGS. 7 and 15, the DMA controller 1141 checks the valid flags in the order of the first valid flag BF #1, the second valid flag BF #2, . . . , and the Nth valid flag BF #N. After checking all valid flags, the DMA controller 1141 checks the valid flags again in order from the first valid flag BF #1.

The descriptor 1140 also has a set of N prepared areas for writing the read completion flags RF #1 to RF #N. The DMA controller 1141 writes a read completion flag to an area of a number corresponding to a valid flag which has been confirmed as indicating that a start address is "valid".

The DMA controller 1141 also notifies the line handling unit 115a of the number j of packets combined, the data size (packet length) of each packet of the combination packet, and the start address of each packet of the combination packet (step S1016 in FIG. 16). Specifically, the DMA controller 1141 records the number j of packets combined, the data size of each packet of the combination packet, and the start address of each packet of the combination packet in the FIFO or the like.

Thus, when the number j of packets combined is other than 1 (2 or more), the DMA controller 1141 collectively transfers the combination packet into which a plurality of packets have been combined to the line handling unit 115a and notifies the line handling unit 115a of the data size (packet length) of each packet.

The DMA controller 1141 updates the variable n (step S1017 in FIG. 16). At this time, the DMA controller 1141 updates the variable n to n+j when n+j≤N and updates the variable n to n+j−N when n+j>N. Then, the DMA controller 1141 returns to step S1001.

Next, upon detecting that the remaining amount of the FIFA for notification from the DMA controller 1141 of the combination packet transfer unit 114 has changed from 0 to 1 or more, the line handling unit 115a checks information provided from the DMA controller 1141 (the number j of packets combined, the data size DS of the combination packet, the data size of each packet of the combination packet, and the start address of each packet of the combination packet) (step S1100 in FIG. 17) and checks whether or not the number j of packets combined is 1 (step S1101 in FIG. 17).

When the number j of packets combined is 1 (yes in step S1101), the line handling unit 115a sends data starting from the beginning of the DMA-transferred data and having the same length as the data size DS of the combination packet of which the DMA controller 1141 has notified (which is the same as the packet size in this case) to the communication line as a transmission packet having the same packet length as the notified data size DS of the combination packet (step S1102 in FIG. 17).

When the number j of packets combined is other than 1 (2 or more), the beginning of each transmission packet is determined as follows using information on the start address and the like of which the DMA controller 1141 has notified, while the size of each transmission packet is the data size of each packet of the combination packet of which the DMA controller 1141 has notified.

That is, the line handling unit 115a sends data starting from the beginning of the DMA-transferred data and having the same length as the data size of the beginning packet of the combination packet to the communication line as a first, initial transmission packet starting from the beginning of the DMA-transferred data (step S1104 in FIG. 17).

Further, the line handling unit 115a sends data that has the same length as the data size of the mth of the packets constituting the combination packet (where m is an integer from 2 to j) and starts from a position later than the beginning of the DMA-transferred data, specifically, a position that is later than the beginning of the DMA-transferred data by a value obtained by subtracting the start address of the beginning packet of the combination packet from the start address of the mth packet, to the communication line as an mth transmission packet starting from that position (step S1105 in FIG. 17). The line handling unit 115a sequentially performs the processing of step S1105 for each mth packet of the combination packet. The line handling unit 115a returns to step S1100 after the processing of step S1105 is completed.

In the above operation, the DMA controller 1141 may issue an interrupt processing request to the software (the processor) after completing a DMA transfer and the transmission processing unit 112a may check read completion flags RF #1 to RF #N upon receiving the interrupt processing request from the DMA controller 1141 instead of periodically checking the read completion flags RF #1 to RF #N.

As explained above, the packet processing apparatus according to the present embodiment includes a combination packet transfer unit 11 which is capable of implementing the collective DMA transfer and incorporates a unit (DMA controller 1111) for writing into the descriptor 1110, information for restoring the combined packet to the plurality of original packets. Because the DMA controller ii can be implemented by hardware, it is not necessary to execute the restoration processing by software and it is possible to achieve high reception performance due to the effects of collective DMA transfer.

Figure 33:
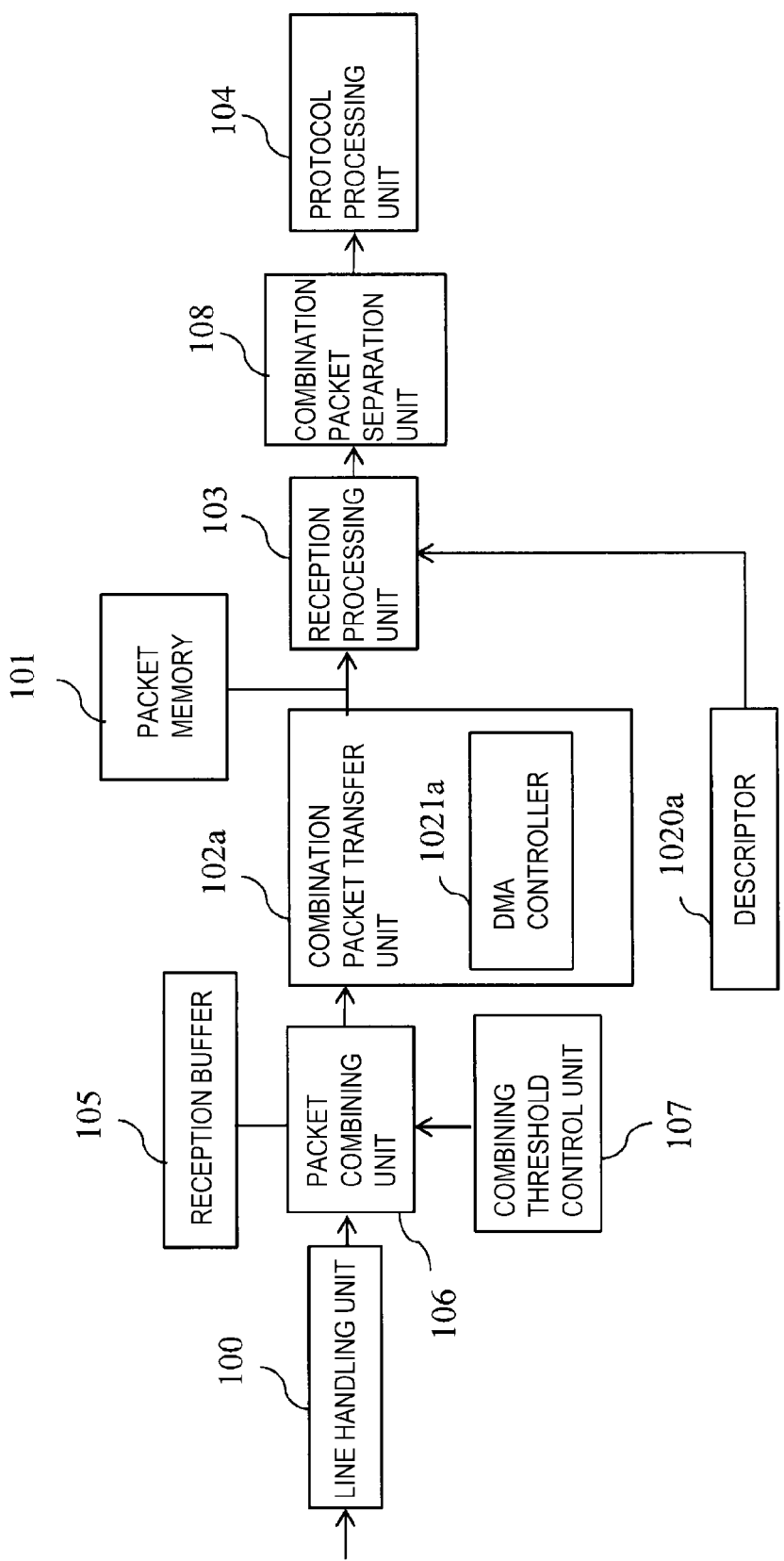
FIG. 33 is a block diagram illustrating another configuration of a packet processing apparatus of the related art.

Compared to when the processor (software) executes the processing of restoring a plurality of original packets from a combination packet in the packet processing apparatus of the related art having the configuration of FIG. 30 or the configuration of FIG. 33, the present embodiment has advantages that the processing of the processor required to process one packet becomes lighter and the reception performance is improved (the number of packets that can be processed per unit time increases) because the restoration processing does not need to be performed by the processor (software). In addition, in the present embodiment, there is also an effect of decreasing the power consumption of the processor that is required for processing one packet.

Further, in the present embodiment, the software for the reception processing unit 103 in the configuration of FIG. 27 can be used as it is in the packet processing apparatus of the present embodiment. This indicates that the improvement of the reception performance through collective DMA can be achieved simply by changing the hardware (DMA controller 1111).

Meanwhile, in the present embodiment, an addressed area in the packet memory 101 prepared by the processor (software) is shared by a plurality of packets, such that the addressed area cannot be reused until the reception processing (transfer to the protocol processing unit 104a) of all shared packets is completed.

The transfer management unit 116 (software executed by the processor) needs to prepare and set in the descriptor 1110 an addressed area having a size that allows writing of a maximum size of combination packet. The maximum size of a combination packet is a value obtained by adding a maximum allowable packet length to the threshold set in the combining threshold control unit 107.

In order to properly perform the collective DMA transfer in the packet processing apparatus of the present embodiment, the transfer management unit 116 (software executed by the processor) needs to secure a buffer area of size N×DB_mux (where DB_mux is the maximum size of a combination packet in the reception side) in the packet memory 101 in advance. This area securing is equivalent to that in the case of the configuration of FIG. 30.

In the present embodiment, for example, when the buffer area is prepared as a continuous area in the packet memory 101, the start address of the buffer area is the start address A #1 in FIG. 2 set by the transfer management unit 116 (software executed by the processor). On the other hand, the final address of the buffer area is the start address A #1+(N×DB_mux)−1. In this case, the start address A #N in FIG. 2 set by the transfer management unit 112 (software executed by the processor) is the start address A #1+(N−1)×DB_mux.

Even when the transfer destination address of a DMA transfer of a combination packet is A #N, such area securing allows the combination packet to be reliably written to a continuous area of size DB_mux ranging from that address A #N to the final address of the buffer area because the continuous area of size DB_mux has been secured in the packet memory 101.

If the area ranging from the address A #N to the final address of the buffer area is smaller than DB_mux, a part of the combination packet to be written may sometimes be written to an area where its writing is forbidden.

When the buffer area secured in the packet memory 101 is not prepared as a continuous area, but for example, as N discrete areas, N areas of size DB_mux are prepared in advance and the transfer management unit 116 (software executed by the processor) sets start addresses of the areas as A #1 to A #N, such that a combination packet can be reliably written to a continuous area of size DB_mux, avoiding the problem that the combination packet is written to an area where its writing is forbidden.

In the packet processing device according to this embodiment, the DMA controller 1111 rewrites the information (the start address, the received data size, and the reception completion flag) of the descriptor 1110 after DMA transfer, whereby a restoration process using software is not required.

When the restoration processing is realized by hardware of the reception processing unit 103, the protocol processing unit 104a, or the combination packet separation unit 108 of FIG. 33, it is necessary to provide means for the packet combining unit 110 to notify the reception processing unit 103, the protocol processing unit 104a, or the combination packet separation unit 108 of FIG. 33 of information required for the restoration processing (the number of packets combined and the size of each packet).

Further, when the restoration processing is realized by hardware of the reception processing unit 103, the protocol processing unit 104a, or the combination packet separation unit 108 of FIG. 33, there is a need to take into account that it is sometimes necessary to hold information required for the restoration processing for a plurality of combination packets until reception processing is activated after a DMA transfer is completed.

In contrast to this, in the packet processing apparatus according to the present embodiment, the restoration process for a combined packet is completed at a time point at which DMA transfer of one combined packet is completed, and thus, information corresponding to a plurality of combined packets does not need to be stored. Thus, the scale of the hardware according to the present embodiment is smaller than that of a case in which the restoration process is implemented by hardware of the reception processing unit 103, the protocol processing unit 104a, or the combination packet separating unit 108 illustrated in FIG. 33.

Writing information required for the restoration processing to a portion of a combination packet may also be applied as the means for the packet combining unit 110 to notify the reception processing unit 103, the protocol processing unit 104a, or the combination packet separation unit 108 of FIG. 33 of information required for the restoration processing. Specifically, a method can be considered in which, for example, a header in which a packet size or the like is written is added in front of each packet combined and the added header is DMA-transferred together with packet data in order to notify of the size of each packet combined.

However, if information required for the restoration processing is written to a portion of a combination packet, a part of the bandwidth of a bus used for the DMA transfer is occupied by the information required for the restoration processing, such that the effective bandwidth originally available for transfer of packet data is reduced, and as a result, a problem arises that the performance of the DMA transfer deteriorates.

In the packet processing apparatus of the present embodiment, such effective bandwidth deterioration does not occur because it is not necessary to write information required for the restoration processing to a combination packet.

The packet processing apparatus of the present embodiment includes the combination packet transfer unit 114 having built-in means which can realize collective DMA transfer in the processing for packet transmission and reads information for restoring a plurality of original packets from a combination packet from the descriptor 1140 and notifies the line handling unit 115a of the read information. Because the combination packet transfer unit 114 and the line handling unit 115a can be implemented by hardware, it is not necessary to execute the restoration processing by software and it is possible to achieve high transmission performance due to the effects of collective DMA transfer.

When transmission performance becomes a bottleneck in a packet processing apparatus that requires both reception processing and transmission processing, the performance of the packet processing apparatus is improved through the improvement of transmission performance using the transmission processing unit 112a, the packet memory 113, the combination packet transfer unit 114, and the line handling unit 115a of the present embodiment.

In order to properly perform the collective DMA transfer on the transmitting side in the packet processing apparatus of the present embodiment, the transfer management unit 116 (software executed by the processor) needs to secure a buffer area of size TDB_mux (where TDB_mux is the maximum size of a combination packet on the transmitting side) in the packet memory 113 in advance.

It is necessary to secure N buffer areas on the receiving side, while N buffer areas are not essential on the transmitting side. The transmission processing unit 112a may be provided with means that requests the protocol processing unit 104a to stop issuing a transmission request when the writable buffer area is exhausted and notifies the protocol processing unit 104a of permission of a transmission request when writing to the buffer area becomes possible.

Although the example of implementing the combination packet transfer unit 111 in hardware has been illustrated in the present embodiment, it is also possible to implement at least a part of processes of the combination packet transfer unit 111 with a processor separate from the processor used for the reception process and software. When at least a part of the processing of the combination packet transfer unit 111 is realized by software in this way, it is also not necessary for the reception processing unit 103 or the protocol processing unit 104a to perform the processing of restoring a plurality of original packets from a combination packet, such that it is possible to achieve high reception performance due to the effects of collective DMA transfer.

When at least a part of the processing of the combination packet transfer unit 111 is realized by software, it is also possible to achieve the advantage of reducing the scale of hardware required for the processing of restoring a plurality of original packets from a combination packet (which is an advantage due to not having to hold information on a plurality of combination packets) and the advantage of not deteriorating the effective bandwidth available for packet data transfer (which is an advantage due to not adding information required for the restoration processing to a portion of a combination packet), similar to when the combination packet transfer unit 111 is realized by hardware.

At least a part of the processing of the combination packet transfer unit 114 may be implemented by software and a processor other than the processor used for the processing of the transmission processing unit 112a. In this case, it is also possible to achieve high transmission performance due to the effects of collective DMA transfer.

As a variation of this embodiment, an area of a rewrite execution flag indicating whether a start address has been rewritten may be added to the descriptor 1110. For example, when the processor that implements the transfer management unit 116 that performs initial setting of the start addresses A #1 to A #N has a cache memory, the start addresses A #1 to A #N written to the descriptor 1110 are copied into the cache memory.

However, when a start address in the descriptor 1110 is rewritten by the DMA controller 1111, corresponding information in the cache memory of the processor that implements the transfer management unit 116 may not be rewritten. Even in such a case, the processor can refer to a rewrite execution flag because the processor reads information in the descriptor 1110 rather than information in the cache memory.

Specifically, the processor reads and uses information in the cache memory upon determining that the start address in the descriptor 1110 has not been rewritten as a result of referring to the rewrite execution flag and temporarily disables the cache and directly reads and uses the start address in the descriptor 1110 upon determining that the start address in the descriptor 1110 has been rewritten.

When start addresses in the descriptor 1110 have been rewritten through the processing of step S414 of FIG. 5, the combination packet transfer unit 111 rewrites the corresponding rewrite execution flags in the descriptor 1110 from "not rewritten" to "rewritten".

As another modification of the present embodiment, the DMA controller 1111 may prepare areas for writing changed start addresses in the descriptor 1110 separately from the areas for start addresses written by the transfer management unit 116 (software executed by the processor). In this case, the reception processing unit 103 (software executed by the processor) refers to the areas where the changed start addresses are written. Also, the processing described with reference to step S414 of FIG. 5 becomes processing of writing changed start addresses rather than processing of rewriting start addresses.

In addition, in this embodiment, a plurality of DMA controllers 1111 and a plurality of descriptors 1110 corresponding to the DMA controllers 1111 may be configured to be mounted. The present reference example may also have a configuration in which the packet combining unit 110 determines the types of packets and groups packets of the same type into a combination packet or a configuration in which a plurality of DMA controllers 1111 and a plurality of descriptors 1110 are selectively used according to the packet type.

With a configuration in which a DMA controller 1111 and a descriptor 1110 are prepared for each packet type and a plurality of DMA controllers 1111 and a plurality of descriptors 1110 are selectively used according to the packet type, it becomes easier to perform different reception processing for each packet type.

In addition, in the present embodiment, a configuration in which a plurality of DMA controllers 1111 and a plurality of descriptors 1110 are selectively used in a divisional manner for each core of the processor in which a plurality of CPU cores are built may be employed, or a configuration in which a plurality of DMA controllers 1111 and a plurality of descriptors 1110 are used in a divisional manner for each virtual machine may be employed.

With the configuration in which a plurality of DMA controllers 111 and a plurality of descriptors 1110 are selectively used for each CPU core or each virtual machine, it is possible to improve the performance of reception processing by software as compared to when there is only one DMA controller or the like.

Further, the present embodiment may have a configuration in which a plurality of DMA controllers 1141 and a plurality of descriptors 1140 corresponding to the DMA controllers 1141 are provided. The present embodiment may also have a configuration in which the transmission processing unit 112*a* determines the types of packets and groups packets of the same type into a combination packet or a configuration in which a plurality of DMA controllers 1141 and a plurality of descriptors 1140 are selectively used according to the packet type.

A DMA controller 1141 and a descriptor 1140 can be prepared for each packet type, and for example, a plurality of DMA controllers 1141 and the like can be selectively used according to the packet type, and further, a threshold TH for high-priority packets can be set smaller than a threshold TH for low-priority packets, whereby the transmission delay of high-priority packets can be made smaller than that of low-priority packets.

The present embodiment may also have a configuration in which a plurality of DMA controllers 1141 and a plurality of descriptors 1140 are selectively used for each core of a processor which has a plurality of CPU cores or a configuration in which a plurality of DMA controllers 1141 and a plurality of descriptors 1140 are selectively used for each virtual machine.

With the configuration in which a plurality of DMA controllers 1141 and a plurality of descriptors 1140 are selectively used for each CPU core or each virtual machine, it is possible to improve the performance of transmission processing by software (such as writing to the packet memory 113) as compared to when there is only one DMA controller or the like.

Second Embodiment

Next, a second embodiment of the present invention will be described. The first embodiment has been described on the assumption that the DMA transfer is used, but even in a packet processing apparatus that does not use DMA transfer, effective throughput of writing into packet memory may increase by writing a combined packet in which a plurality of packets are combined to the packet memory collectively (for example, a case where the packet memory is configured by a Dynamic Random Access Memory (DRAM)).

Figure 18:
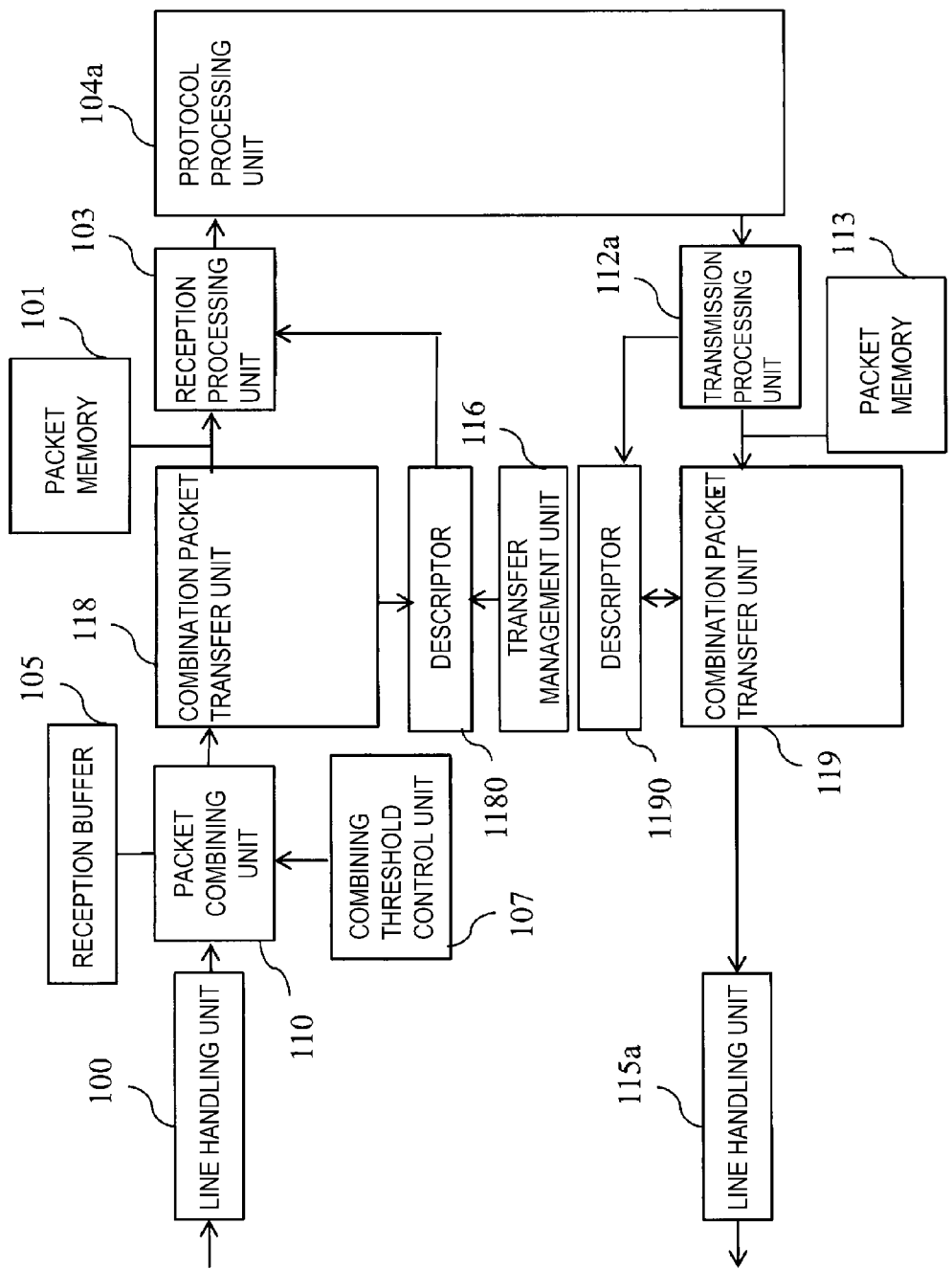
FIG. 18 is a block diagram illustrating a configuration of a packet processing apparatus according to a second embodiment of the present invention.

FIG. 18 is a block diagram illustrating a configuration of a packet processing apparatus according to a second embodiment of the present invention. The packet processing apparatus of FIG. 18 includes a line handling unit 100, a packet memory 101, a reception processing unit 103, a protocol processing unit 104*a*, a reception buffer 105, a combining threshold control unit 107, a packet combining unit 110, a transmission processing unit 112*a*, a packet memory 113, a line handling unit 115*a*, a transfer management unit 116, and combination packet transfer units 118 and 119.

The configuration of FIG. 18 differs from that of FIG. 1 in that the transfer means on the receiving side in FIG. 1 is replaced with writing means implemented by the processor (software) of the packet processing apparatus and the transfer means on the transmitting side in FIG. 1 is replaced with writing means implemented by the processor (software) of the packet processing apparatus. That is, in the present embodiment, the combination packet transfer units 11 and 114 in FIG. 1 are replaced with the combination packet transfer units 118 and 119 implemented by software, respectively.

The line handling units 100 and 115a, the packet memories 101 and 113, the reception processing unit 103, the protocol processing unit 104a, the reception buffer 105, the combining threshold control unit 107, transmission processing unit 112a, and the transfer management unit 116 are equivalent to those in the configuration of FIG. 1.

The packet combining unit 110 of FIG. 18 transfers a packet received by the line handling unit 100 to the reception buffer 105 for packet combining. At this time, the packet combining unit 110 stores a packet received by the line handling unit 100 in the reception buffer 105 such that the received packet and packets already stored in the reception buffer 105 are combined into one combination packet. Then, when the size of the combination packet in the reception buffer 105 has exceeded the threshold set in the combining threshold control unit 107, the packet combining unit 110 issues a request to transfer the combination packet to the packet memory 101.

Here, the packet combining unit 110 may also issue a transfer request when a timeout has occurred (such as when the interval between packets has exceeded a predetermined period) before the size of the combination packet in the reception buffer 105 has exceeded the threshold.

The packet combining unit 110 records the number of packets combined in the reception buffer 105 and the size of each packet and notifies the combination packet transfer unit 113 of information on the number of packets combined and the size of each packet when issuing a request to transfer the combination packet.

The combination packet transfer unit 118 (software executed by the processor) writes a combination packet into which a plurality of packets have been combined to the packet memory 101 and issues a request to activate the reception processing unit 103. The combination packet transfer unit 118 (software executed by the processor) writes information such as the size of each packet to the descriptor 1130 which has been prepared for each packet by the transfer management unit 116 (software executed by the processor) using information on the number of packets combined and the size of each packet of which the packet combining unit 110 has notified.

Figure 19:
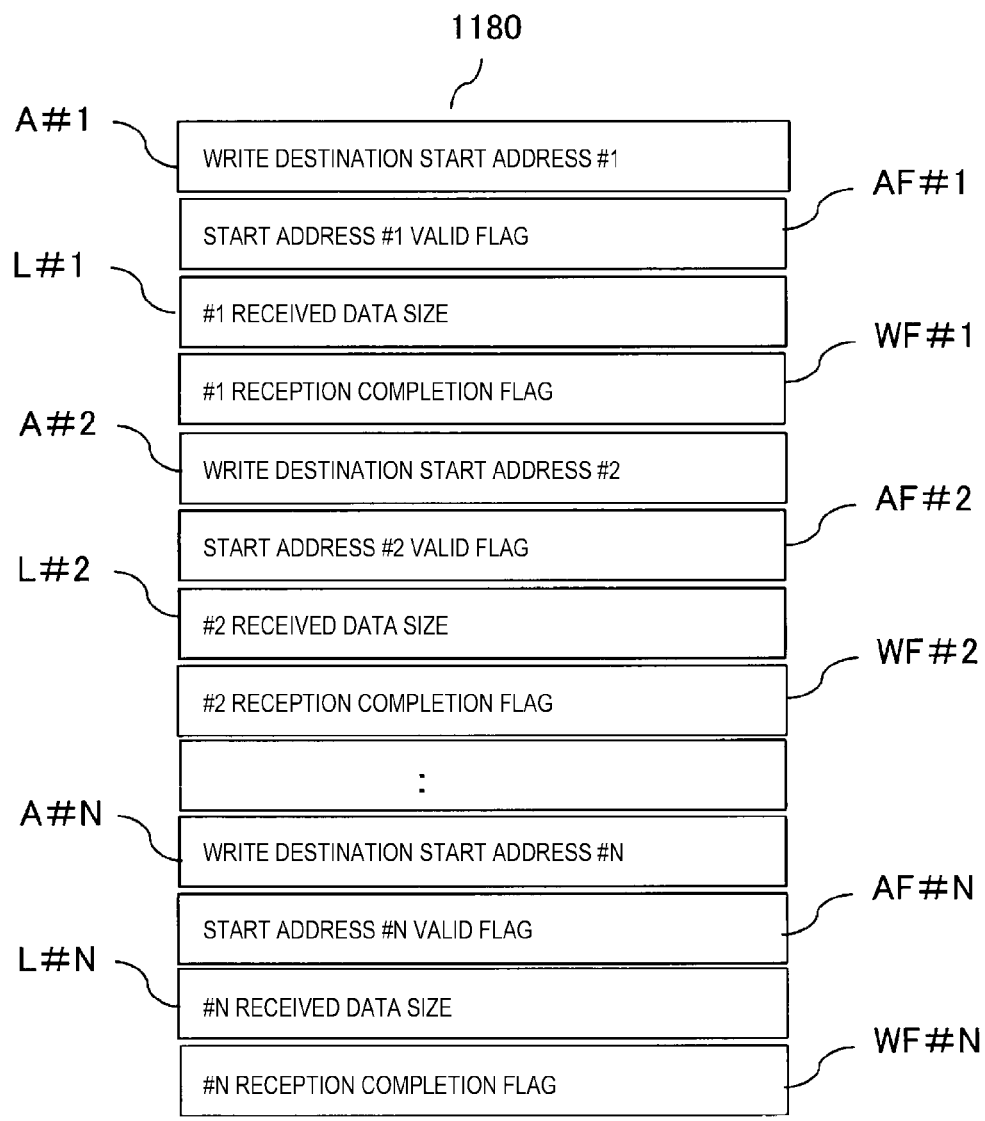
FIG. 19 is a diagram illustrating an outline of a descriptor for reception in the packet processing apparatus according to the second embodiment of the present invention.

As illustrated in FIG. 19, the configuration of the descriptor 1180 is equivalent to that of the descriptor 1110 of the first embodiment. However, the present embodiment differs in that the combination packet transfer unit 118 (software executed by the processor), instead of the combination packet transfer unit 111, performs writing to the descriptor 1180.

The combination packet transfer unit 119 (software executed by the processor) reads a combination packet into which a plurality of packets have been combined from the packet memory 113 and transfers the combination packet to the line handling unit 115a. Further, the combination packet transfer unit 119 (software executed by the processor) notifies the line handling unit 115a of the number of packets combined, the size of each packet, and the like.

Figure 20:
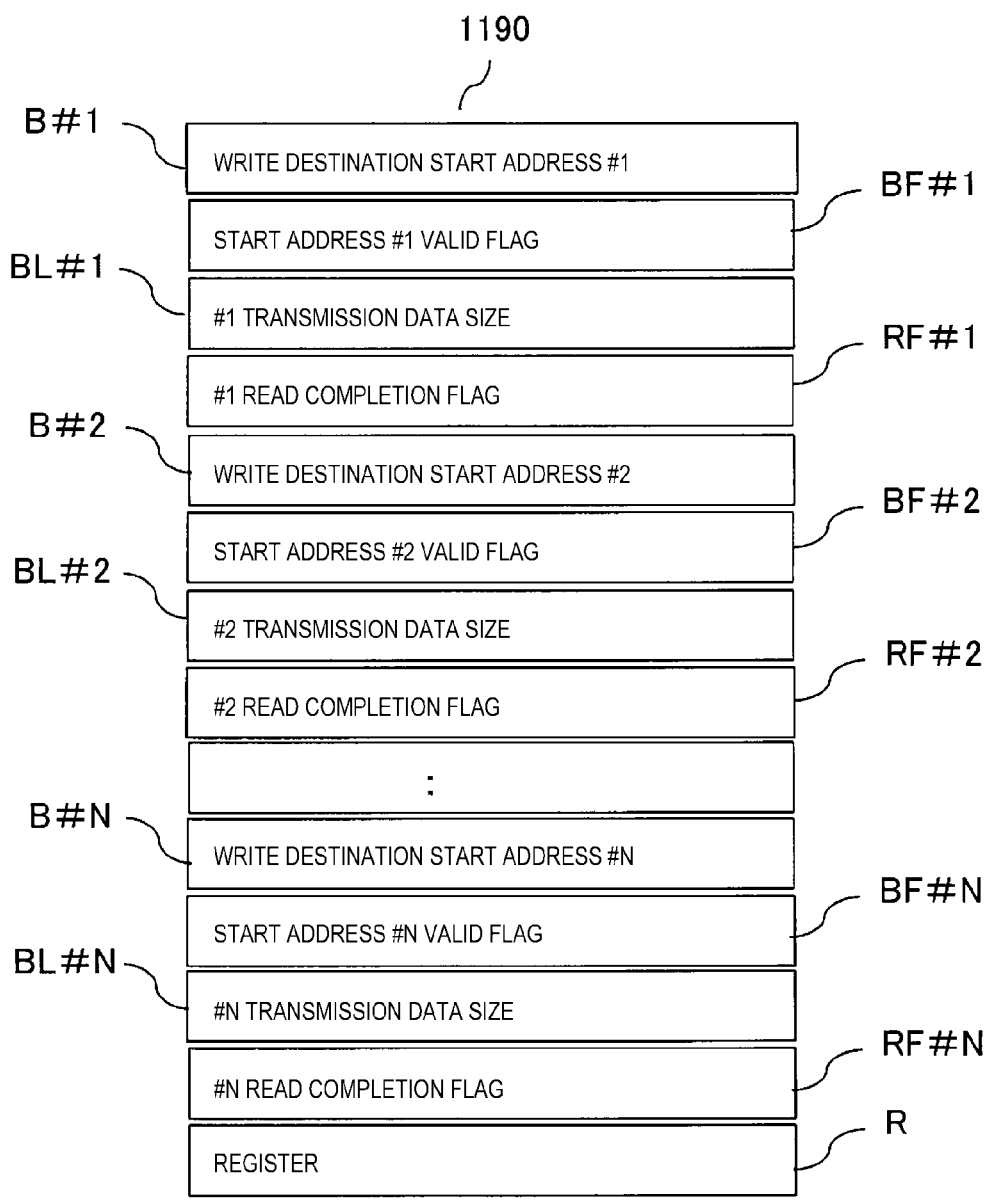
FIG. 20 is a diagram illustrating an outline of a descriptor for transmission in the packet processing apparatus according to the second embodiment of the present invention.

As illustrated in FIG. 20, the configuration of the descriptor 1190 is equivalent to that of the descriptor 1140 of the first embodiment. However, the present embodiment differs in that the combination packet transfer unit 119 (software executed by the processor), instead of the combination packet transfer unit 114, performs writing to the descriptor 1190.

Figure 21:
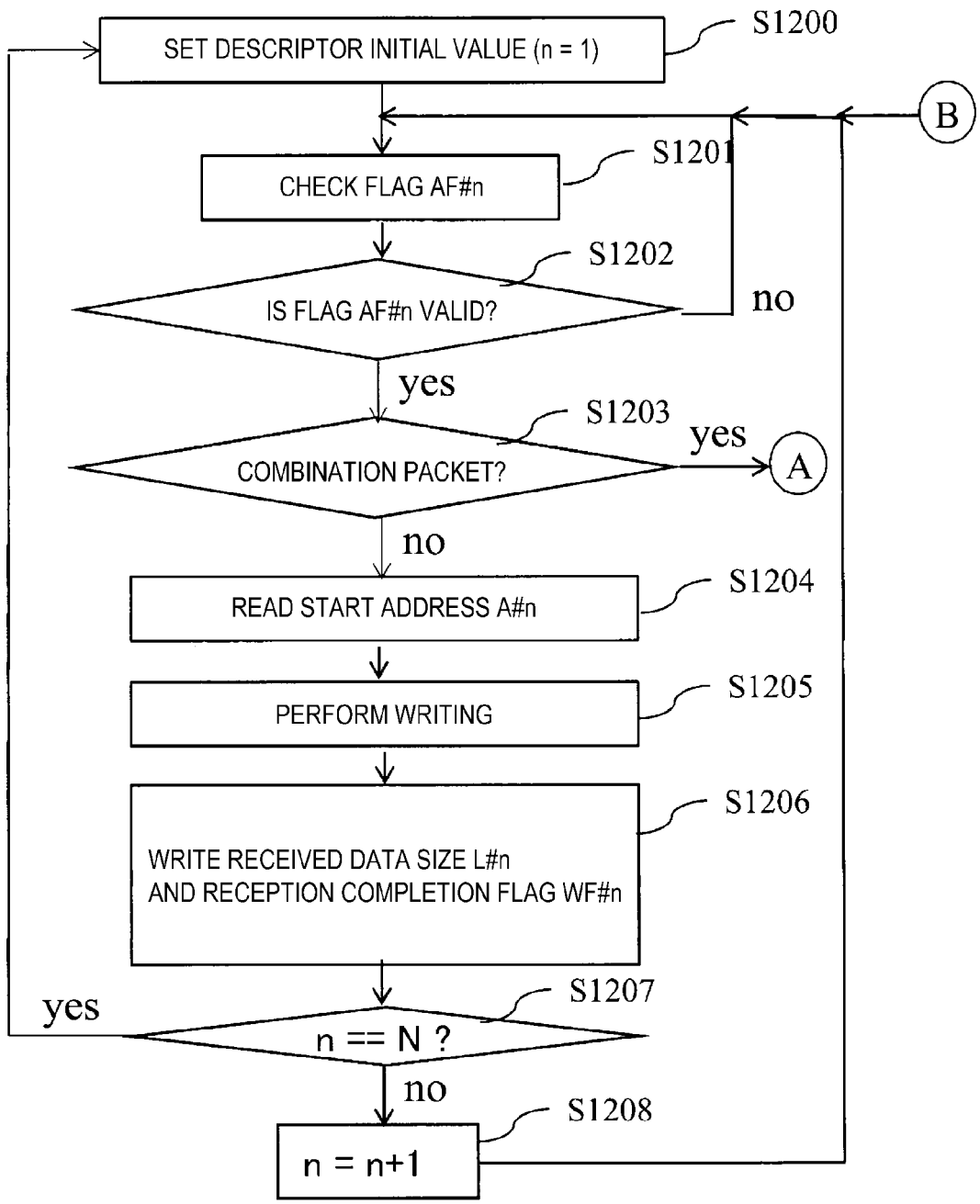
FIG. 21 is a flowchart illustrating an operation of a combination packet transfer unit for reception in the packet processing apparatus according to the second embodiment of the present invention.
Figure 22:
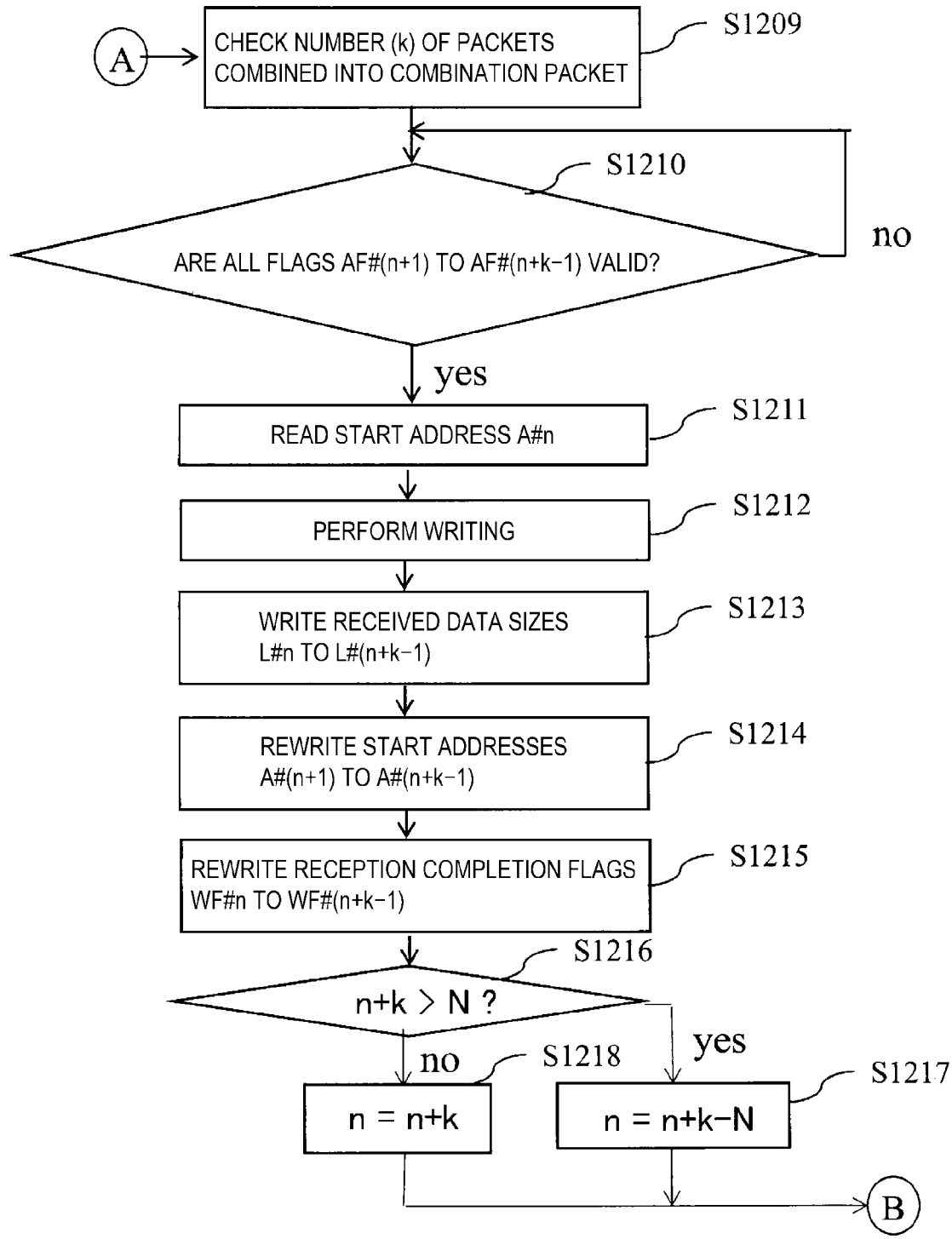
FIG. 22 is a flowchart illustrating an operation of the combination packet transfer unit for reception in the packet processing apparatus according to the second embodiment of the present invention.

FIGS. 21 and 22 are flowcharts illustrating operations of the combination packet transfer unit 118 (software executed by the processor). First, the combination packet transfer unit 118 initializes a variable n to 1 (step S1200 in FIG. 21), and checks a valid flag AF #n in the descriptor 1180 (step S1201 in FIG. 21) after a transfer request is issued from the packet combining unit 110.

When the valid flag AF #n indicates that a start address A #n is "valid" (yes in step S1202 of FIG. 21), the combination packet transfer unit 118 checks information from the packet combining unit 110 and checks whether data to be transferred to the packet memory 101 is a single packet or a combination packet (step S1203 in FIG. 21).

When the data to be transferred to the packet memory 101 is not a combination packet, the combination packet transfer unit 118 reads the start address A #n confirmed as "valid" by the valid flag AF #n from the descriptor 1180 (step S1204 in FIG. 21). Then, the combination packet transfer unit 118 writes the corresponding nth packet in the area starting from the start address A #n of the packet memory 101 (step S1205 in FIG. 21).

After completing this writing, the combination packet transfer unit 118 writes a received data size L #n to the descriptor 1180 and rewrites a reception completion flag WF #n set in the descriptor 1180 from "not completed" to "completed" (step S1206 in FIG. 21). The above processing of steps S1200 to S1206 and steps S1207 and S1208 is equivalent to the processing of steps S400 to S408 of FIG. 4.

On the other hand, when the data to be transferred to the packet memory 101 is a combination packet, the combination packet transfer unit 118 checks the number k of packets combined (step S1209 in FIG. 22) and checks "k−1" valid flags AF #(n+1) to AF #(n+k−1) in the descriptor 1180 (step S1210 in FIG. 22).

When all checked k valid flags are "valid" (yes in step S1210), the combination packet transfer unit 118 reads a start address A #n corresponding to the first valid flag AF #n among the k checked valid flags from the descriptor 1180 (step S1211 in FIG. 22). Then, the combination packet transfer unit 118 writes the corresponding nth packet in the area starting from the start address A #n of the packet memory 101 (step S1212 in FIG. 22).

After completing this writing, the combination packet transfer unit 118 writes to the descriptor 1180 received data sizes L #n to L #(n+k−1) indicating the packet lengths of packets constituting the combination packet written to the packet memory 101 (step S1213 in FIG. 22).

Subsequently, the combination packet transfer unit 118 rewrites "k−1" start addresses A #(n+1) to A #(n+k−1) in the descriptor 1180 according to the packet lengths of the first "k−1" packets among the k packets constituting the combination packet (step S1214 in FIG. 22).

Next, the combination packet transfer unit 118 rewrites reception completion flags WF #n to WF #(n+k−1) corresponding to the packets constituting the combination packet written to the packet memory 101 from "not completed" to "completed" (step S1215 in FIG. 22).

The above processing of steps S1209 to S1215 and steps S1216 to S1218 is equivalent to the processing of steps S409 to S418 of FIG. 5. In steps S1210, S1213 and S1215, processing described in steps S410, S413 and S415 is executed when n=N or when n<N and n+k−1>N.

Figure 23:
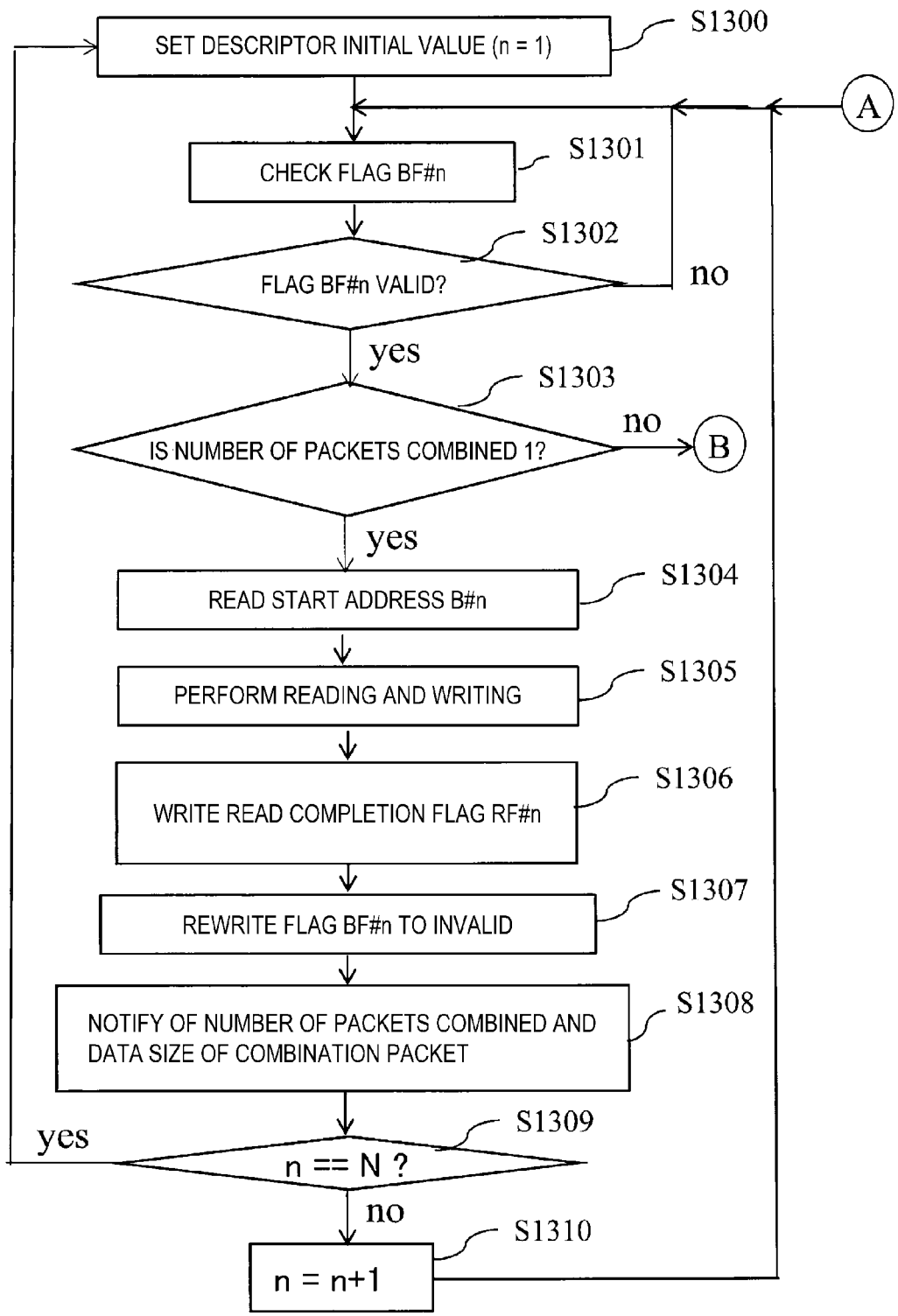
FIG. 23 is a flowchart illustrating an operation of a combination packet transfer unit for transmission in the packet processing apparatus according to the second embodiment of the present invention.
Figure 24:
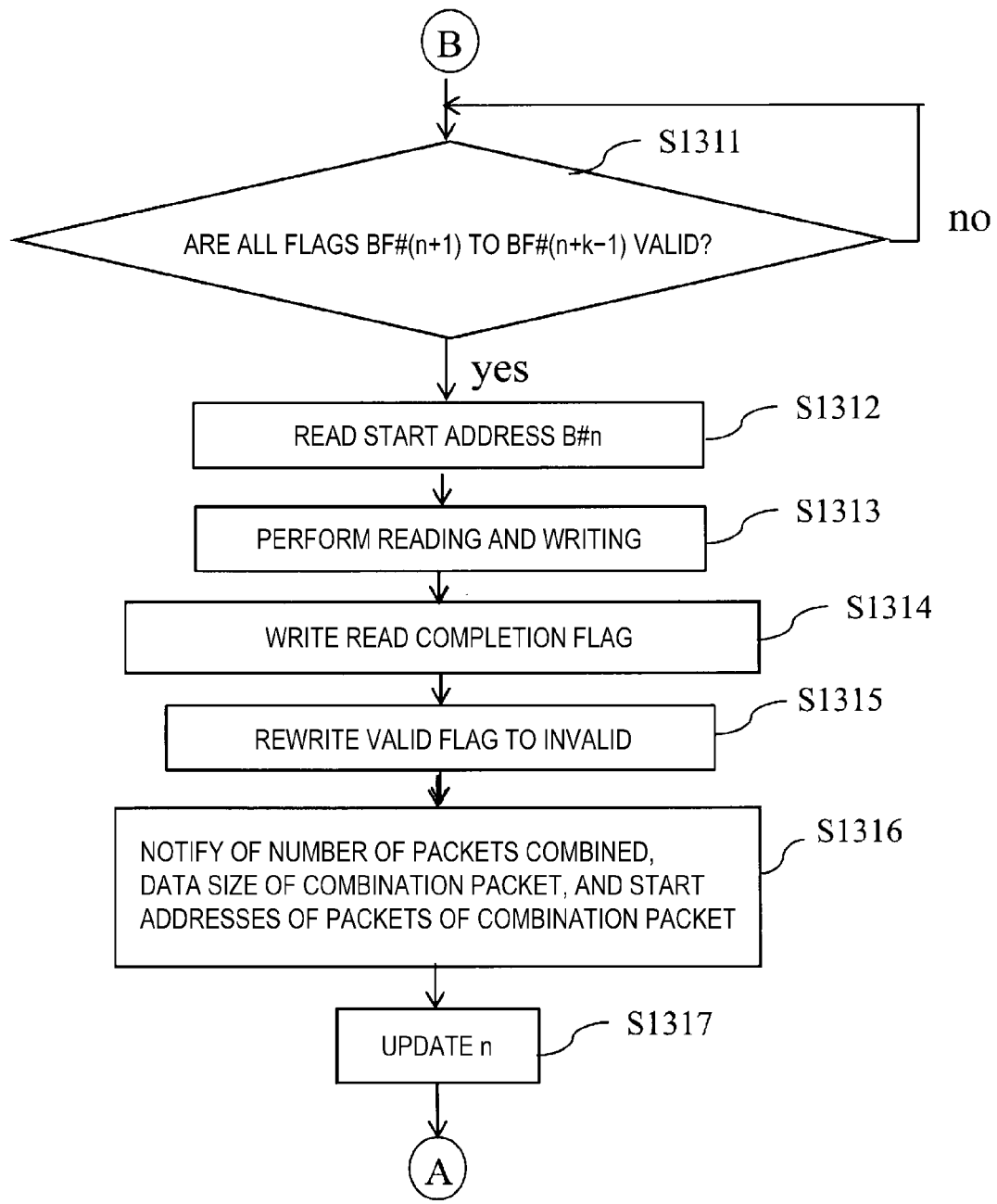
FIG. 24 is a flowchart illustrating an operation of the combination packet transfer unit for transmission in the packet processing apparatus according to the second embodiment of the present invention.
Figure 25:
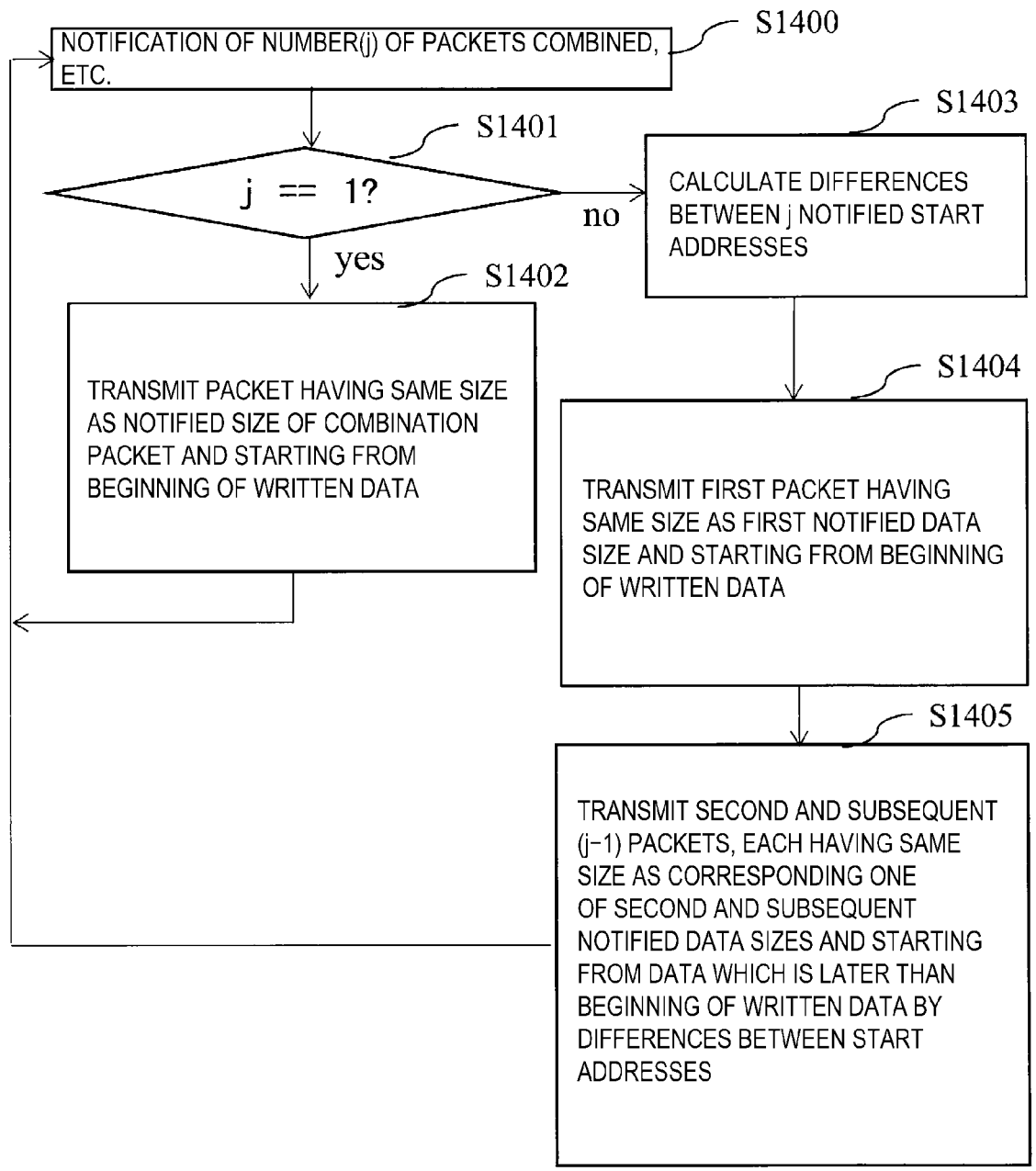
FIG. 25 is a flowchart illustrating an operation of a line handling unit for transmission in the packet processing apparatus according to the second embodiment of the present invention.

FIGS. 23 and 24 are flowcharts illustrating operations of the combination packet transfer unit 119 and FIG. 25 is a flowchart illustrating an operation of the line handling unit 115a.

The combination packet transfer unit 119 initializes the variable n indicating the order of reading and writing from and to the descriptor 1190 to 1 (step S1300 in FIG. 23). The variable n in FIGS. 23 and 24 is a variable that the combination packet transfer unit 119 independently counts and is different from the variable n that the combination packet transfer unit 118 independently counts and the variable n that the transmission processing unit 112a independently counts.

The combination packet transfer unit 119 checks an nth valid flag BF #n in the descriptor 1190 (step S1301 in FIG. 23). When the valid flag BF #n indicates that an nth start address B #n is "valid" (yes in step S1302 of FIG. 23), the combination packet transfer unit 119 reads information (the number j of packets combined and the data size DS of the combination packet) provided from the transmission processing unit 112a from the FIFO or the like and checks whether or not the number j of packets combined is 1 (step S1303 in FIG. 23).

When the number j of packets combined is 1 (yes in step S1303), the combination packet transfer unit 119 reads the nth start address B #n confirmed as "valid" by the corresponding valid flag BF #n from the descriptor 1190 (step S1304 in FIG. 23). Then, the combination packet transfer unit 119 reads an nth packet having a length indicated by the data size DS of the combination packet (information provided from the transmission processing unit 112a) from an area starting from the start address B #n in the packet memory 113 and writes the read nth packet to the line handling unit 115a (step S1305 in FIG. 23). The processing of steps S1306 to S1310 in FIG. 23 is equivalent to the processing of steps S1006 to S1010 in FIG. 15.

When the number j of packets combined is other than 1 (no in step S1303), the combination packet transfer unit 119 checks "j−1" valid flags BF #(n+1) to BF #(n+j−1) in the descriptor 1190 (step S1311 in FIG. 24). When n=N, the combination packet transfer unit 119 checks the valid flags BF #N and BF #1 to BF #(j−1). When n<N and n+j−1>N, the combination packet transfer unit 119 checks the valid flags BF #n, BF #(n+1) to BF #N, and BF #1 to BF #(j−1−(N−n)).

When all j valid flags checked in the processing of steps S1302 and S1311 are "valid" (yes in step S1311), the combination packet transfer unit 119 reads an nth start address B #n corresponding to the first valid flag BF #n among the j checked valid flags from the descriptor 1190 (step S1312 in FIG. 24). Then, the combination packet transfer unit 119 reads a combination packet having a length indicated by the data size DS of the combination packet (information provided from the transmission processing unit 112a) from an area starting from the start address B #n in the packet memory 113 and writes the read combination packet to the line handling unit 115a (step S1313 in FIG. 24). The processing of steps S1314 to S1317 of FIG. 23 is equivalent to the processing of steps S1014 to S1017 of FIG. 16.

Next, upon detecting that the remaining amount of the FIFO for notification from the combination packet transfer unit 119 has changed from 0 to 1 or more, the line handling unit 115a checks information provided from the combination packet transfer unit 119 (the number j of packets combined, the data size DS of the combination packet, the data size of each packet of the combination packet, and the start address of each packet of the combination packet) (step S1400 in FIG. 25) and checks whether or not the number j of packets combined is 1 (step S1401 in FIG. 25).

When the number j of packets combined is 1 (yes in step S1401), the line handling unit 115a sends data starting from the beginning of the data written by the combination packet transfer unit 119 and having the same length as the data size DS of the combination packet of which the combination packet transfer unit 119 has notified (which is the same as the packet size in this case) to the communication line as a transmission packet having the same packet length as the notified data size DS of the combination packet (step S1402 in FIG. 25).

When the number j of packets combined is other than 1 (2 or more), the line handling unit 115a sends data starting from the beginning of the data written by the combination packet transfer unit 119 and having the same length as the data size of the beginning packet of the combination packet to the communication line as a first, initial transmission packet starting from the beginning of the data written by the combination packet transfer unit 119 (step S1404 in FIG. 25).

Further, the line handling unit 115a sends data that has the same length as the data size of the mth of the packets constituting the combination packet (where m is an integer from 2 to j) and starts from a position later than the beginning of the data written by the combination packet transfer unit 119, specifically, a position that is later than the beginning of the written data by a value obtained by subtracting the start address of the beginning packet of the combination packet from the start address of the mth packet, to the communication line as an mth transmission packet starting from that position (step S1405 in FIG. 25). The line handling unit 115a sequentially performs the processing of step S1405 for each mth packet of the combination packet. The line handling unit 115a returns to step S1400 after the processing of step S1405 is completed.

In this way, the packet processing apparatus of the present embodiment is provided with a unit (combination packet transfer unit 118) which is capable of implementing collective writing and writes into the descriptor 1180, information for restoring the combined packet to the plurality of original packets. According to the present embodiment, execution of the reception processing unit 103 of the restoration process, the protocol processing unit 104a, or the combination packet separating unit 108 illustrated in FIG. 33 is not necessary, and high reception performance owing to effects of collective writing can be implemented.

Further, in the present embodiment, the software for the reception processing unit 103 in the configuration of FIG. 27 can be used as it is in the packet processing apparatus of the present embodiment.

The packet processing apparatus of the present embodiment includes means (the combination packet transfer unit 119) which can realize collective reading from the packet memory 113 and collective writing to the line handling unit 115a in the processing for packet transmission and reads information for restoring a plurality of original packets from a combination packet from the descriptor 1190 and notifies the line handling unit 115a of the read information. According to the present embodiment, it is possible to achieve high transmission performance due to the effects of collective reading and collective writing.

When transmission performance becomes a bottleneck in a packet processing apparatus that requires both reception processing and transmission processing, the performance of the packet processing apparatus is improved through the improvement of transmission performance using the transmission processing unit 112a, the packet memory 113, the combination packet transfer unit 119, and the line handling unit 115a of the present embodiment.

In order to properly perform the collective writing described with reference to FIGS. 21 and 22 in the packet processing apparatus of the present embodiment, the transfer management unit 116 (software executed by the processor) needs to secure a buffer area of size N×DB_mux (where DB_mux is the maximum size of a combination packet on the receiving side) in the packet memory 101 in advance. This area securing is equivalent to that in the case of the configuration of FIGS. 30 and 1.

In order to properly perform the collective reading and collective writing on the transmitting side in the packet processing apparatus of the present embodiment, the transfer management unit 116 (software executed by the processor) needs to secure a buffer area of size TDB_mux (where TDB_mux is the maximum size of a combination packet on the transmitting side) in the packet memory 113 in advance. This area securing is equivalent to that in the case of the configuration of FIG. 1.

It is necessary to secure N buffer areas on the receiving side, while N buffer areas are not essential on the transmitting side. The transmission processing unit 112a may be provided with means that requests the protocol processing unit 104a to stop issuing a transmission request when the writable buffer area is exhausted and notifies the protocol processing unit 104a of permission of a transmission request when writing to the buffer area becomes possible.

In the packet processing apparatus of the present embodiment, the combination packet transfer unit 118 rewrites information of the descriptor 1180 (such as start addresses, received data sizes, and reception completion flags) after collective writing is completed, thus eliminating the need for the restoration processing.

Figure 34:
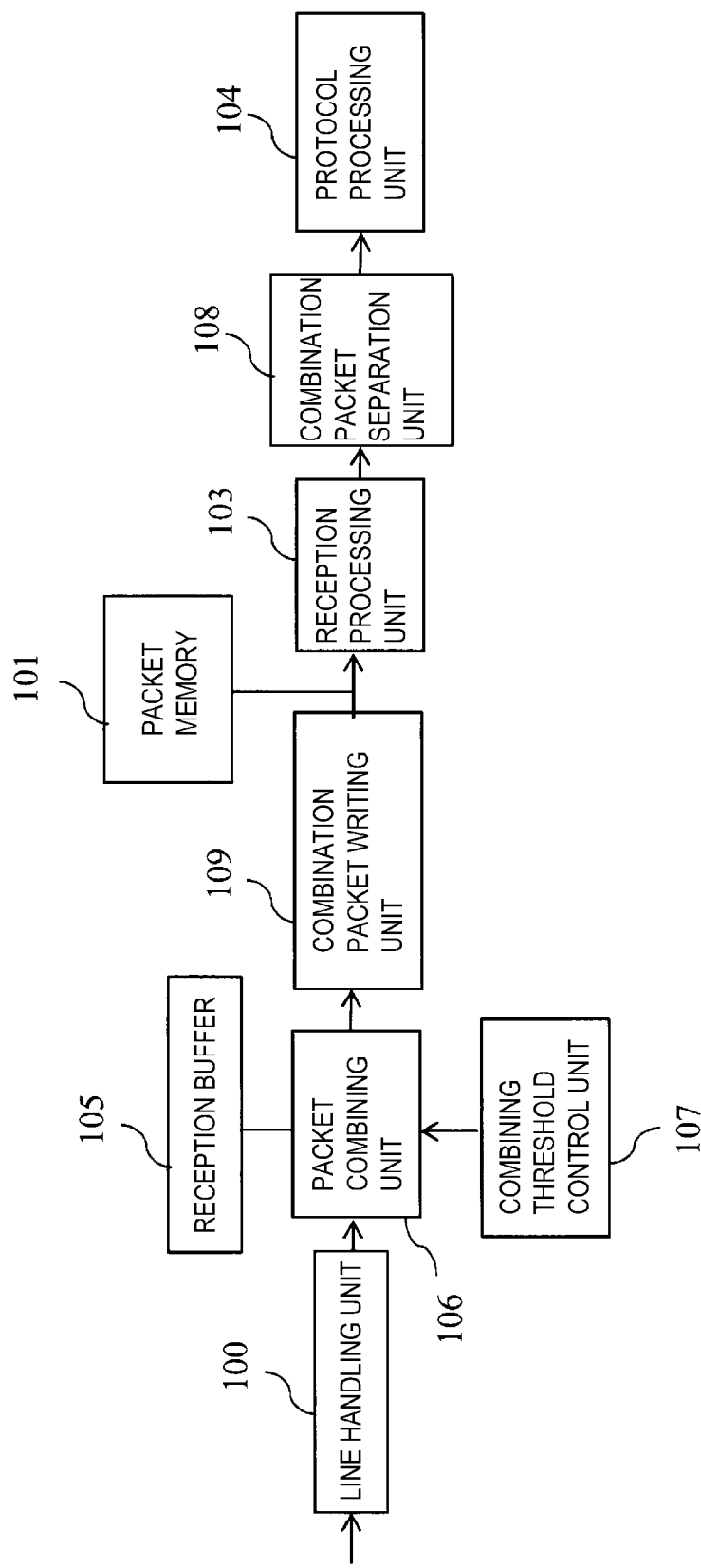
FIG. 34 is a block diagram illustrating another configuration of a packet processing apparatus of the related art.

When the restoration processing is realized by the reception processing unit 103, the protocol processing unit 104a, or the combination packet separation unit 108 of FIG. 34, it is necessary to provide means for the packet combining unit 110 to notify the reception processing unit 103, the protocol processing unit 104a, or the combination packet separation unit 108 of FIG. 34 of information required for the restoration processing (the number of packets combined and the size of each packet).

Further, when the restoration processing is realized by the reception processing unit 103, the protocol processing unit 104a, or the combination packet separation unit 108 of FIG. 34, there is a need to take into account that it is sometimes necessary to hold information required for the restoration processing for a plurality of combination packets until reception processing is activated after collective writing is completed.

In contrast to this, in the packet processing apparatus according to the present embodiment, the restoration process for a combined packet is completed at a time point at which collective writing of one combined packet is completed, and thus, information corresponding to a plurality of combined packets does not need to be stored. Thus, the scale of the hardware according to the present embodiment is smaller than that of a case in which the restoration process is implemented using the reception processing unit 103, the protocol processing unit 104a, or the combination packet separating unit 108 illustrated in FIG. 34. The same is true for comparison when the processing of restoring a plurality of original packets from a combination packet is implemented by software.

For example, when all components other than the packet memory 101 and the line handling unit 100 are realized by software in the configuration of FIG. 34, it is necessary to hold information required for the restoration processing for a plurality of combination packets (the number of packets combined and the size of each packet) in the packet memory 101 or the like.

On the other hand, when all components other than the packet memory 101, the line handling unit 100, the packet memory 113, and the line handling unit 115a are realized by software in the configuration of the present embodiment, it is not necessary to hold information on a plurality of combination packets (the number of packets combined and the size of each packet). That is, it is only necessary to hold information (the number of packets combined and the size of each packet) required for the restoration processing for only one combination packet in the packet memory 101 or the like.

Namely as compared to the configuration of FIG. 34, the configuration of the present reference example can reduce the capacity (the number of writable bits) of the packet memory 101 or the like for use in holding information required for the restoration processing (the number of packets combined and the size of each packet), thus reducing the scale of required hardware.

Writing information required for the restoration processing to a portion of a combination packet may also be applied as the means for the packet combining unit 110 to notify the reception processing unit 103, the protocol processing unit 104a, or the combination packet separation unit 108 of FIG. 34 of information required for the restoration processing. Specifically, a method can be considered in which, for example, a header in which a packet size or the like is written is added in front of each packet combined and the added header is written together with packet data in order to notify of the size of each packet combined. However, in this case, a part of the bandwidth of a bus used for the collective writing is occupied by the information required for the restoration processing, such that the effective bandwidth originally available for writing of packet data is reduced, and as a result, the performance of the collective writing deteriorates.

In the packet processing apparatus of the present embodiment, information required for the restoration processing can be held in a memory other than the packet memory 101 which does not use the bus to which the packet memory 101 is connected (a memory which permits only writing by the packet combining unit 110 and reading by the combination packet transfer unit 118), such that the deterioration of the effective bandwidth described above does not occur.

As a modification of the present embodiment, areas for rewrite execution flags indicating whether or not start addresses have been rewritten may be added to the descriptor 1180, similar to the first embodiment. In this case, upon rewriting start addresses in the descriptor 1180 through the processing of step S1214 of FIG. 22, the combination packet transfer unit 118 changes the corresponding rewrite execution flags in the descriptor 1180 from "not rewritten" to "rewritten".

The combination packet transfer unit 118 may also prepare areas for writing changed start addresses in the descriptor 1180 separately from the areas for start addresses written by the transfer management unit 116 (software executed by the processor), similar to the first embodiment.

The present embodiment may also have a configuration in which the packet combining unit 110 determines the types of packets and groups packets of the same type into a combination packet or a configuration in which a plurality of descriptors 1180 are selectively used according to the packet type. With a configuration in which a descriptor 1180 is prepared for each packet type and a plurality of descriptors 1180 are selectively used according to the packet type, it becomes easier to perform different reception processing for each packet type.

The present embodiment may also have a configuration in which a plurality of descriptors 1180 are selectively used for each core of a processor which has a plurality of CPU cores or a configuration in which a plurality of descriptors 1180 are selectively used for each virtual machine. The configuration in which a plurality of descriptors 1180 are selectively used for each CPU core or each virtual machine improves the performance of write and read processing by software as compared to when there is only one descriptor 1180 or the like.

The present embodiment may also have a configuration in which the transmission processing unit 112a determines the types of packets and groups packets of the same type into a combination packet or a configuration in which a plurality of descriptors 1190 are selectively used according to the packet type. A descriptor 1190 can be prepared for each packet type, and for example, a plurality of descriptors 1190 can be selectively used according to the priority of a packet, and further, a threshold TH for high-priority packets can be set smaller than a threshold TH for low-priority packets, whereby the transmission delay of high-priority packets can be made smaller than that of low-priority packets.

The present embodiment may also have a configuration in which a plurality of descriptors 1190 are selectively used for each core of a processor which has a plurality of CPU cores or a configuration in which a plurality of descriptors 1190 are selectively used for each virtual machine.

With the configuration in which a plurality of descriptors 1190 are selectively used for each CPU core or each virtual machine, it is possible to improve the performance of transmission processing by software (such as the processing of writing to the packet memory 113 and the processing of reading from the packet memory 113) as compared to when there is only one descriptor 1190.

In the packet processing apparatus of the second embodiment, the packet memories 101 and 113, the reception processing unit 103, the protocol processing unit 104a, the transfer management unit 116, the transmission processing unit 112a, and the combination packet transfer units 118 and 119 can be realized by a computer including a processor, a storage device, and an interface and a program that controls these hardware resources. Also, part of the processing of the combination packet transfer units 111 and 114 can be realized by a computer as described above.

Figure 26:
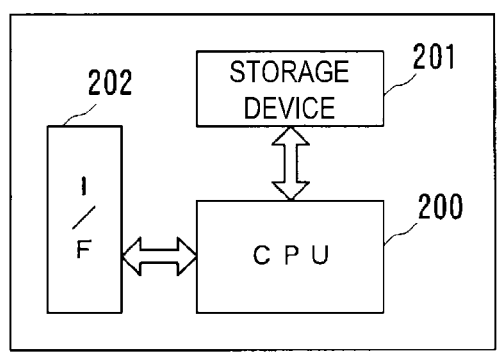
FIG. 26 is a block diagram illustrating an exemplary configuration of a computer that realizes the packet processing apparatus according to the second embodiment of the present invention.

An exemplary configuration of the computer is illustrated in FIG. 26. The computer includes a central processing unit (CPU) 200, a storage device 201, and an interface device 202. In such a computer, a program for realizing the packet processing method of embodiments of the present invention is stored in the storage device 201. The CPU 200 executes the processes described in the second embodiment in accordance with the program stored in the storage device.

INDUSTRIAL APPLICABILITY

Embodiments of the present invention can be applied to a technology for performing protocol processing, transfer processing, or the like of communication data.

REFERENCE SIGNS LIST 100, 115 Line handling unit
101, 113 Packet memory
103 Reception processing unit
104a Protocol processing unit
105 Reception buffer
107 Combination threshold control unit
110 Packet combining unit
111, 114, 118, 119 combination packet transfer unit
112 Transmission processing unit
116 Transfer management unit
1110, 1140, 1180, 1190 Descriptor
1111, 1141 DMA controller.

The invention claimed is:

1. A packet processing apparatus comprising:
a first packet memory configured to store a packet to be transmitted;
a first packet combiner configured to:
concatenate a plurality of packets to be transmitted to generate a first combination packet; and
write the first combination packet to the first packet memory;
a first line handler configured to send a packet to be transmitted to a communication line; and
a first combination packet transferor configured to:
DMA-transfer the first combination packet from the first packet memory to the first line handler; or
read the first combination packet from the first packet memory and write the first combination packet to the first line handler through one or more processors;
wherein the first packet combiner is further configured to write first information on a respective address in the first packet memory of a respective beginning of each of the plurality of packets of the first combination packet to a first descriptor, the first descriptor being a predetermined data area in one or more memories; and
wherein the first line handler is configured to separate the first combination packet into the plurality of packets and send the plurality of packets to the communication line.

2. The packet processing apparatus according to claim 1, wherein:
the first packet combiner is configured to notify the first combination packet transferor of second information corresponding to the plurality of packets of the first combination packet;
the first combination packet transferor is further configured to notify the first line handler of third information on the plurality of packets of the first combination packet based on the first information and the second information; and
the first line handler is configured to:
separate the first combination packet into the plurality of packets based on the third information; and
send the plurality of packets to the communication line.

3. The packet processing apparatus according to claim 2, wherein:
the second information includes information on a number of packets constituting the first combination packet and a data size of the first combination packet; and
the third information includes information on the number of packets constituting the first combination packet, the data size of the first combination packet, and the respective address in the first packet memory of the respective beginning of each of the plurality of packets of the first combination packet.

4. The packet processing apparatus according to claim 1, further comprising:
a second line handler configured to receive a packet from the communication line;

a second packet combiner configured to concatenate a second plurality of packets received from the communication line to generate a second combination packet;
a second packet memory configured to store a packet received from the communication line; and
a second combination packet transferor configured to:
DMA-transfer the second combination packet to the second packet memory; or
write the second combination packet to the second packet memory through the one or more processors; and
wherein the second combination packet transferor is configured to write fourth information on a respective address in the second packet memory of a respective beginning of each of the second plurality of packets of the second combination packet to a second descriptor, the second descriptor being a predetermined data area in the one or more memories.

5. The packet processing apparatus according to claim 4, wherein a processor of the one or more is configured to read a packet stored in the second packet memory based on the fourth information written to the second descriptor and perform processing on the packet read by the one or more processors.

6. A packet processing method comprising:
concatenating a plurality of packets to be transmitted to generate a first combination packet;
writing the first combination packet to a first packet memory;
writing first information on a respective address in the first packet memory of a respective beginning of each of the plurality of packets of the first combination packet to a first descriptor, the first descriptor being a predetermined data area in one or more memories;
DMA-transferring the first combination packet to a first line handler or reading the first combination packet from the first packet memory and writing the first combination packet to the first line handler through one or more processors; and
separating the first combination packet into the plurality of packets and sending the plurality of packets from the first line handler to a communication line.

7. The packet processing method according to claim 6, further comprising:
concatenating a second plurality of packets received from the communication line to generate a second combination packet;
DMA-transferring the second combination packet to a second packet memory, from which packet reading is performed by a processor of the one or more processors that performs processing on a packet received from the communication line, or writing the second combination packet to the second packet memory through the one or more processors; and
writing information on a respective address in the second packet memory of a respective beginning of each of the second plurality of packets of the second combination packet to a second descriptor, the second descriptor being a predetermined data area in the one or more memories.

8. A packet processing apparatus comprising:
a first packet memory configured to store a packet to be transmitted;
a first packet combiner configured to:
concatenate a plurality of packets to be transmitted to generate a first combination packet; and
write the first combination packet to the first packet memory;
a first line handler configured to send a packet to be transmitted to a communication line; and
a first combination packet transferor configured to transfer the first packet memory to the first liner handler;
wherein the first packet combiner is further configured to write first information on a respective address in the first packet memory of a respective beginning of each of the plurality of packets of the first combination packet to a first descriptor, the first descriptor being a predetermined data area in one or more memories; and
wherein the first line handler is configured to separate the first combination packet into the plurality of packets and send the plurality of packets to the communication line.

9. The packet processing apparatus according to claim 8, wherein the first combination packet transferor is configured to DMA-transfer the first combination packet from the first packet memory to the first line handler.

10. The packet processing apparatus according to claim 8, wherein the first combination packet transferor is configured to read the first combination packet from the first packet memory and write the first combination packet to the first line handler through one or more processors.

11. The packet processing apparatus according to claim 8, wherein:
the first packet combiner is configured to notify the first combination packet transferor of second information corresponding to the plurality of packets of the first combination packet;
the first combination packet transferor is further configured to notify the first line handler of third information on the plurality of packets of the first combination packet based on the first information and the second information; and
the first line handler is configured to:
separate the first combination packet into the plurality of packets based on the third information; and
send the plurality of packets to the communication line.

12. The packet processing apparatus according to claim 11, wherein:
the second information includes information on a number of packets constituting the first combination packet and a data size of the first combination packet; and
the third information includes information on the number of packets constituting the first combination packet, the data size of the first combination packet, and the respective address in the first packet memory of the respective beginning of each of the plurality of packets of the first combination packet.

13. The packet processing apparatus according to claim 8, further comprising:
a second line handler configured to receive a packet from the communication line;
a second packet combiner configured to concatenate a second plurality of packets received from the communication line to generate a second combination packet;
a second packet memory configured to store a packet received from the communication line; and
a second combination packet transferor configured to:
DMA-transfer the second combination packet to the second packet memory; or
write the second combination packet to the second packet memory through one or more processors; and
wherein the second combination packet transferor is configured to write fourth information on a respective address in the second packet memory of a respective beginning of each of the second plurality of packets of the second combination packet to a second descriptor, the second descriptor being a predetermined data area in the one or more memories.

14. The packet processing apparatus according to claim 13, wherein the one or more processors are further configured to read a packet stored in the second packet memory based on the fourth information written to the second descriptor and perform processing on the packet read by the one or more processors.

* * * * *